US012662261B2

(12) United States Patent
Beddard

(10) Patent No.: US 12,662,261 B2
(45) Date of Patent: Jun. 23, 2026

(54) JOINT ASSEMBLY

(71) Applicant: Lonsdale Technologies Ltd., Hereford (GB)

(72) Inventor: Paul Beddard, Hereford (GB)

(73) Assignee: Lonsdale Technologies Ltd., Hereford (GB)

( * ) Notice: Subject to any disclaimer, the term of this patent is extended or adjusted under 35 U.S.C. 154(b) by 0 days.

(21) Appl. No.: 18/866,776

(22) PCT Filed: May 15, 2023

(86) PCT No.: PCT/GB2023/051269
§ 371 (c)(1),
(2) Date: Nov. 18, 2024

(87) PCT Pub. No.: WO2023/223006
PCT Pub. Date: Nov. 23, 2023

(65) Prior Publication Data
US 2025/0304290 A1     Oct. 2, 2025

(30) Foreign Application Priority Data

May 20, 2022    (GB) ...................................... 2207431
Mar. 24, 2023    (GB) ...................................... 2304329

(51) Int. Cl.
*B64G 6/00* (2006.01)
(52) U.S. Cl.
CPC ..................................... *B64G 6/00* (2013.01)
(58) Field of Classification Search
CPC ....... B64G 6/00; A41D 13/0005; B63C 11/10;
F16L 27/04; A62B 17/001; A62B 17/008;
B64D 10/00; B64D 2010/005
See application file for complete search history.

(56) References Cited

U.S. PATENT DOCUMENTS 3,329,967 A * 7/1967 Martinez ................. B63C 11/10
138/120
3,428,961 A   2/1969 Schueller
(Continued)

FOREIGN PATENT DOCUMENTS

JP        2016210366 A  * 12/2016
WO    WO 2010/028504 A1    3/2010

OTHER PUBLICATIONS

Search Report issued for International Patent Application No. PCT/GB2023/051269, dated Sep. 22, 2023, ISA/EP, 3 pages.

*Primary Examiner* — Khoa D Huynh
*Assistant Examiner* — Erick I Lopez
(74) *Attorney, Agent, or Firm* — Haynes and Boone, LLP; Mark A. Tidwell

(57)            ABSTRACT

The present disclosure relates to a joint assembly configured to define a tubular body having a first end, a second end and a passage therebetween. The tubular body is configured for articulation between a first state in which the first end and second end are in a first orientation with respect to one another, and a second state in which the first end and second end are in a second orientation with respect to one another. The body comprises a flexible bladder arranged between opposing supports, each of the bladder and the supports being ring-shaped so as to define an aperture, the respective apertures forming part of the passage. The bladder defines a chamber, and the chamber is partially filled with a fluid which moves within the chamber during articulation of the tubular body from said first state to said second state in order to maintain a constant internal volume of the joint assembly.

20 Claims, 29 Drawing Sheets

(56)                    References Cited

U.S. PATENT DOCUMENTS

| 3,559,209 | A | * | 2/1971 | Vail | B64G 6/00 |
| | | | | | 128/201.19 |
| 4,164,042 | A | * | 8/1979 | Carnegie | B63B 3/13 |
| | | | | | 2/2.15 |
| 6,000,059 | A | | 12/1999 | Abts | |
| 2003/0097701 | A1 | | 5/2003 | Graziosi et al. | |

* cited by examiner

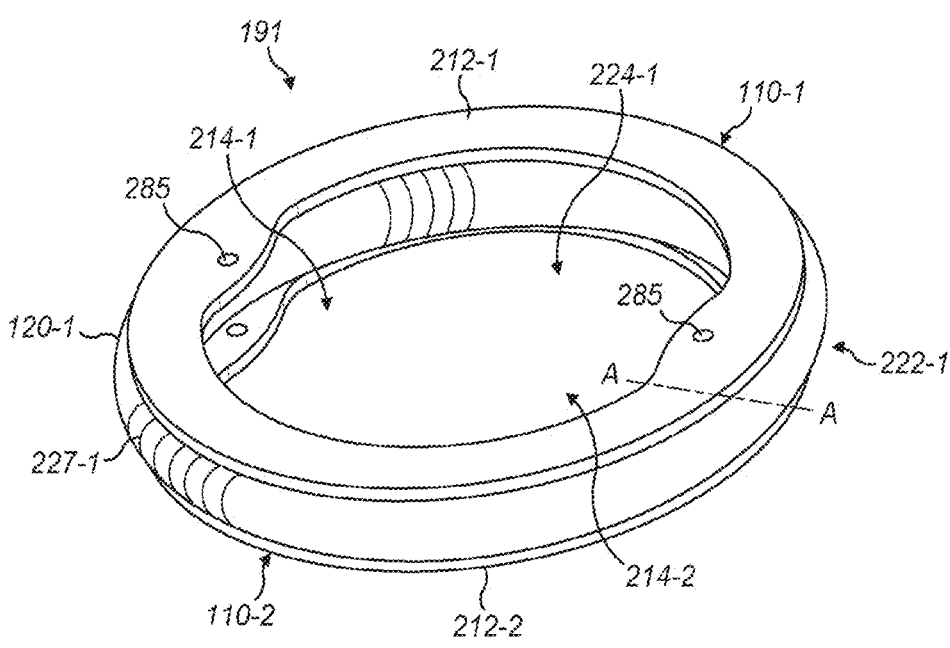
*FIG. 2A*
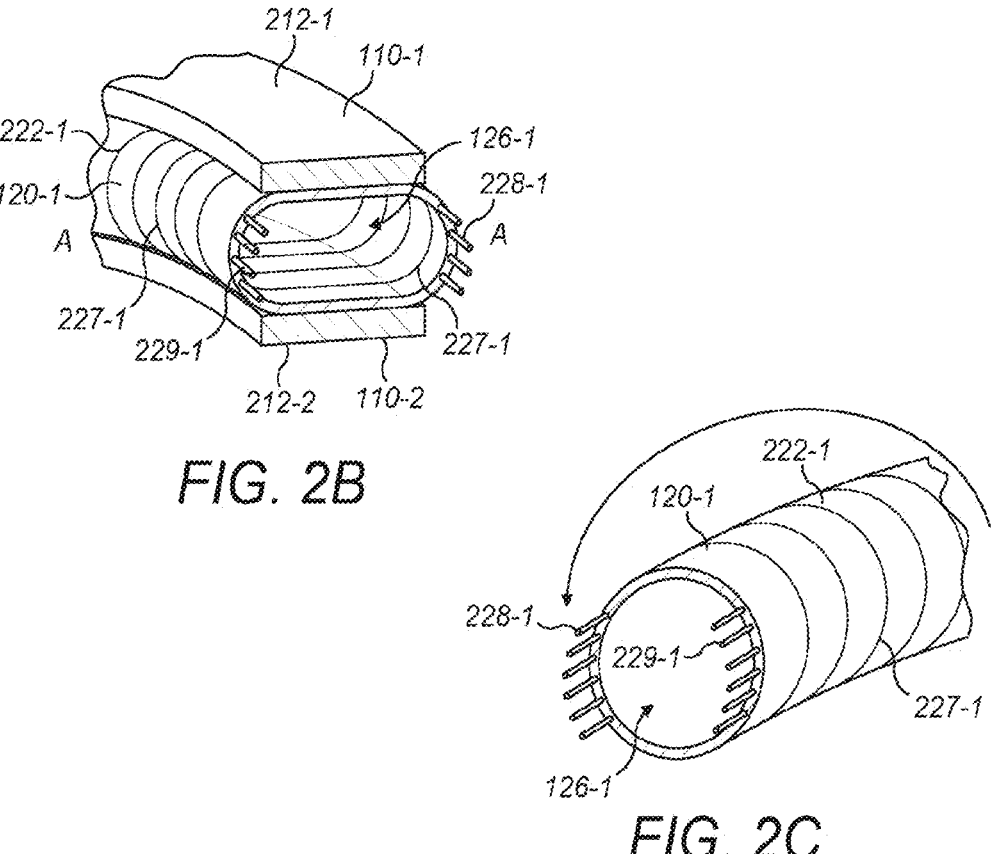
*FIG. 2B*
*FIG. 2C*

JOINT ASSEMBLY

PRIORITY CLAIM

The present application is a U.S. National Stage patent application of International Patent Application No. PCT/GB2023/051269, filed May 15, 2023, which claims priority to United Kingdom Patent Application No. 2304329.2, Mar. 24, 2023, and United Kingdom Patent Application No. 2207431,4, filed May 20, 2022, the benefit of which is claimed and the disclosures of which are incorporated herein by reference in their entirety.

TECHNICAL FIELD

The present disclosure relates to a joint assembly, more particularly, but not exclusively to a constant volume joint assembly, such as of the kind which may be suitable for use in pressured and/or vacuum environments.

BACKGROUND

Extravehicular activity (EVA) suits provide life support systems to allow humans to be in low pressure environments, such as the vacuum of space. Amongst other things, EVA suits provide a pressurised atmosphere for the user. However, the flexible joint portions of EVA suits (e.g. finger, ankle, shoulder, wrist, knee portions etc.) present challenges for EVA suit designers and their users. In a conventional joint portion of EVA suits, the volume of space within the joint will change as the joint is articulated. For example, bending the joint will cause material of the joint at the inside of the bend to crumple or bend. Material on the outside of the bend may flatten. Consequently, the volume inside the joint, and therefore the total volume within the EVA suit, may reduce as the joint bends and increase again when the joint straightens.

In use, the pressure difference between the inside of an EVA suit and outside the EVA suit is extreme. The significant pressure difference means that changing the volume within the EVA suit takes significant work and energy, primarily from the user. As such, it can be extremely difficult and tiring for a user of an EVA suit to move the joints of the EVA suit, because moving the joints requires that the volume of the joint, and therefore the volume within the EVA suit, to change. This puts significant stress on the user, and also limits the amount of time that a user can spend in the EVA suit. As a result, complex tasks which require multiple outings in the EVA suit to accomplish (e.g. building a space station) take longer to complete. Since time spent in the vacuum of space or other remote environments is limited by the resources transported to the environment (e.g. oxygen, food, water, etc.), the increase in time to complete complex tasks in the EVA suit may result in an increase in the number of trips to/from the remote environment (e.g. more rocket launches). This may result in a corresponding increase in fossil fuel usage and emissions.

Attempts to circumvent this problem involve pressurising the internal volume of the EVA suit at the lowest possible pressure that is suitable for humans, for example around 3-4 PSI (absolute). This is significantly lower than the 1 atmosphere of pressure that humans are accustomed to on Earth (~14.7 PSI). To ensure that the user can breathe at the low pressure, significantly high oxygen levels are maintained within the pressurised internal volume of the EVA suit. However, such attempts lead to overuse of oxygen resources. Since oxygen resources in the vacuum of space or other remote environments are limited by the amount of resources transported to the environment (e.g. on rockets or the like), overuse of oxygen resources may result in an increase in the required number of re-supply trips (e.g. additional rocket launches). This may result in a corresponding increase in fossil fuel usage and emissions. Furthermore, since the EVA suit cannot be pressurised at 1 atmosphere of pressure, the amount of time that the user can spend in the EVA suit is still limited.

SUMMARY OF THE DISCLOSURE

The present disclosure relates to a joint assembly. The joint assembly is ideally suited for use in a pressurised system, such as an EVA suit, which is to be placed in a low pressure or vacuum environment (e.g. in a space environment beyond the earth's atmosphere). The joint assembly may enable improvements to a user's experience in the EVA suit, in comparison to existing joint portions of EVA suits. In particular, the joint assembly may reduce the amount of effort required to manoeuvre a user's digit or limb within an EVA suit, which may allow the user to spend longer within said EVA suit.

In a first aspect of the present disclosure, there is provided a joint assembly, optionally for use in an extravehicular activity (EVA) suit (e.g. an EVA suit joint assembly for receiving a limb or digit). The joint assembly comprises or is configured to define a tubular body having a first end, a second end and a passage therebetween. The passage may optionally be configured for receiving said limb or digit.

The tubular body may optionally be configured for articulation (e.g. upon movement of said limb or digit) between a first state in which the first end and second end are in a first orientation with respect to one another, and a second state in which the first end and second end are in a second orientation with respect to one another.

Advantageously, a joint assembly is provided which can be articulated between a resting and a bent state.

Optionally, the passage may define a sleeve for receiving said limb or digit.

The body may optionally comprise a flexible bladder arrangement.

The bladder arrangement may optionally comprise a bladder which may define a chamber. The chamber may optionally be devoid of gas. The chamber may optionally be partially filled with a fluid (e.g. a non-gaseous fluid) which moves within the chamber during articulation of the tubular body from said first state to said second state (e.g. upon movement of said limb or digit).

The flexible bladder arrangement may optionally be ring-shaped so as to define an aperture, e.g. wherein said aperture forms part of the passage, so a limb or digit may extend through said aperture.

The flexible bladder arrangement may be optionally positioned between opposing supports. Optionally, the bladder arrangement and the supports are ring-shaped so as to each define an aperture, wherein the respective apertures form part of the passage, e.g. wherein said apertures form part of the passage, so a limb or digit may extend through said apertures.

In exemplary embodiments, the bladder comprises a membrane that defines the chamber. The membrane may optionally be flexible and inextensible. Advantageously, the bladder will not stretch or deform, for example when used in pressured and/or vacuum environments.

In exemplary embodiments, the membrane comprises a plurality of reinforcing fibres arranged to prevent the membrane from expanding or stretching. Advantageously, the bladder has an improved tensile strength and is less likely to rupture or burst, for example when used in pressured and/or vacuum environments.

In exemplary embodiments, at least some of the reinforcing fibres extend in a toroidal and/or circumferential direction around the bladder.

In exemplary embodiments, at least some of the fibres extend along an outer circumference of the bladder.

In exemplary embodiments, at least some of the fibres extend along an inner circumference of the bladder.

In exemplary embodiments, at least some of the fibres extend along a side or circumference of the bladder that is between the inner circumference and the outer circumference.

In exemplary embodiments, at least one of the fibres is arranged to define a coil or coiled configuration around the chamber (e.g. extending in a poloidal and toroidal manner).

Advantageously, the reinforcing fibres can be used to improve the tensile strength of the membrane and therefore the bladder, in different planes or directions.

In exemplary embodiments, the fluid is a non-gaseous fluid. For example, the non-gaseous fluid may comprise a liquid, gel, paste or cream. Optionally, the partially-filled chamber is devoid of gas. Advantageously, the bladder is less likely to expand or burst in a low pressured e.g. vacuum environment.

In exemplary embodiments, the bladder arrangement is configured for self-healing if the bladder becomes torn.

In exemplary embodiments, the fluid comprises a thermally-insulating medium. Optionally, the thermally-insulating medium comprises microballoons, optionally glass microballoons. Advantageously, the thermally-insulating medium inhibits transfer of heat through the bladder arrangement.

In exemplary embodiments, the fluid comprises a self-healing fluid. For example, a fluid configured to change from a fluid state to a non-fluid state when exposed to an environment outside of the bladder arrangement, or a fluid containing particles configured to block any opening which forms in the bladder.

An example self-healing fluid is a silicon resin with an inhibitor which evaporates or sublimes when exposed to a vacuum. Another example self-healing fluid is a liquid containing microballoons filled with a curing agent (e.g. an amine based curing agent). A further example self-healing fluid is a resin (e.g. short-oil alkyd) with a suitable solvent that evaporates when exposed to a vacuum, leaving behind a resin matrix which forms a sealing gel.

Preferable self-healing liquids may comprise an acrylic resin or condensation polymer diluted with acrylic monomers. Such self-healing liquids may, upon damage of the membrane, initiate a mechanism of further polymerisation of the membrane.

In some embodiments, catalysts, monomers and cross-linkers are encapsulated within either the fluid or the membrane and upon disruption from exposure to vacuum, these molecules in any combination can initiate further polymerisation of the membrane, i.e. "self-healing" of the membrane. In some embodiments, damage to the membrane can initiate the "self-healing" procedure via radical polymerisation or release of an encapsulated catalyst within the membrane itself.

In such embodiments, polymers can be provided in the fluid or within the membrane so that, in an undamaged state of the membrane, the reagents are in a stable state and not active.

In other words, the self-healing may be initiated by: reagents trapped within the membrane; reagents encapsulated within the fluid; inert reagents within the fluid; and/or by the membrane itself initiating polymerisation from damaged ends of the membrane (e.g. ionic or radical polymerisation).

Advantageously, self-healing allows any tears or cuts in the bladder to be fixed automatically which increases the reliability of the joint assembly. This is particularly beneficial when the joint assembly is located within an EVA suit, since any failure in the joint assembly could result in extravehicular activity being stopped prematurely.

In exemplary embodiments, the fluid has a vapour pressure such that the fluid will not vaporise or expand when the joint assembly is placed in a vacuum. Advantageously, the fluid will not turn into a gas when the joint assembly is in a vacuum environment. Moreover, the chamber of the bladder will not expand, thereby maintaining proper operation of the joint assembly In exemplary embodiments, the vapour pressure of the fluid is 10-10 to 10-7 torr at a temperature of 20 degrees Celsius.

In exemplary embodiments, the chamber is partially filled with the fluid such that a volume of the chamber is less than a maximum volume of the chamber. The fluid thus has the ability to displace around the chamber.

In exemplary embodiments, the fluid is substantially inexpansible. The fluid thus may not expand when the joint assembly is in a low pressure environment, such as a vacuum.

In exemplary embodiments, the bladder arrangement is sealingly coupled with the supports. Advantageously, an internal volume of the joint assembly can be pressurised, e.g. at up to 1 atmosphere of pressure, or more.

In exemplary embodiments, the tubular body has a longitudinal axis. During articulation from said first state to said second state, the body may bend to define an internal curvature and an external curvature. Each support may have a circumference or perimeter, wherein a first section of the circumference or perimeter is intended to be proximal the internal curvature and a second section of the circumference or perimeter opposite the first section of the circumference or perimeter is intended to be proximal the external curvature. Each support may be of non-uniform width in a longitudinal direction of the tubular body, wherein a width of each support at said first section is smaller than a width of each support at said second section. Advantageously, the range of bending of the joint assembly may be improved. The joint assembly may be also biased to bend in a predetermined direction.

In exemplary embodiments, the width of each support tapers from a first width at said first section to a second width at said second section.

In exemplary embodiments, the joint assembly is configured such that when the first end is moved relatively to the second end to bend the joint assembly, the body contracts at an inside of the bend and expands at an outside of the bend, via deformation of the bladder arrangement.

In exemplary embodiments, the joint assembly is configured so as to maintain an interior volume of the body between the first end and the second end at a substantially constant volume during articulation of the tubular body from said first state to said second state, via deformation of the bladder arrangement.

In exemplary embodiments, the joint assembly is configured such that when the first end is moved relatively to the second end to bend the joint assembly, the bladder arrangement is compressed by the supports at an inside of the bend, and the bladder arrangement is decompressed at the outside of the bend.

In exemplary embodiments, the joint assembly is configured such that when the first end is moved relatively to the second end to bend the joint assembly, the bladder arrangement is compressed by the supports at an outside of the bend, and the bladder arrangement is decompressed at the inside of the bend.

In exemplary embodiments, a first one of the supports comprises a first interlocking region. A second one of the supports may comprise a second interlocking region. The bladder arrangement may be configured for cooperation with said first and second interlocking regions, for location of the bladder arrangement between the first and second supports. Advantageously, the support elements may be better secured to one another.

Such an interlocking arrangement is particularly beneficial when the joint assembly is used in a pressurised EVA suit. In particular, the interlocking regions provide a failsafe arrangement which inhibits de-pressurisation of the EVA suit. In more detail, when the joint assembly is used in a pressurised EVA suit, the first and second interlocking regions of the respective supports are urged towards each other by pressure inside the joint assembly. If the bladder arrangement becomes torn then it will not be able to contain the fluid inside. The first and second interlocking regions of the respective supports will therefore be urged closer together and this inhibits de-pressurisation of the EVA suit. In such a situation, the torn bladder will act as a conformable seal between the first and second interlocking regions of the respective supports, which further inhibits de-pressurisation of the EVA suit.

In exemplary embodiments, the first interlocking region comprises a first lip that runs around the aperture of the first support and may extend over an external surface of the first support. The second interlocking region may comprise a second lip that runs around the aperture of the second support and may extend over an internal surface of the second support.

In exemplary embodiments, the bladder arrangement has a cross-section defining first and second grooves or recesses. Advantageously, in use, the bladder is more efficiently compressed to achieve more efficient and/or greater fluid displacement within the bladder.

In exemplary embodiments, said first lip is located in said first groove or recess and/or said second lip is located in said second groove or recess in use.

In exemplary embodiments, the bladder has a H-shaped cross-section in use. The H-shaped cross-section may optionally be defined by first and second grooves or recesses on opposing sides of the bladder arrangement, the first and second grooves or recesses each facing one of the opposing supports.

In exemplary embodiments, the flexible bladder arrangement comprises an annular septum arranged within the bladder to separate an interior of the bladder into first and second chambers. Each of the first and second chambers may be devoid of gas and partially filled with a non-gaseous fluid which moves within the respective chamber during articulation of the tubular body from said first state to said second state.

In exemplary embodiments, the flexible bladder arrangement comprises a first bladder which defines a first chamber and a second bladder which defines a second chamber, wherein an annular septum is arranged between the first and second bladders. Each of the first and second chambers may be devoid of gas and partially filled with a non-gaseous fluid which moves within the respective chamber during articulation of the tubular body from said first state to said second state. Optionally, the annular septum is a separate element (i.e. separable and not integrally coupled with the first and second bladders). Optionally, the annular septum comprises separate first and second septum portions.

Advantageously, the annular septum helps to control deformation of the bladder arrangement.

In exemplary embodiments, the tubular body has a longitudinal axis; wherein, during articulation from said first state to said second state, the body bends to define an internal curvature and an external curvature. The annular septum may have a circumference or perimeter, wherein a first section of the circumference or perimeter is intended to be proximal the internal curvature and a second section of the circumference or perimeter opposite the first section of the circumference or perimeter is intended to be proximal the external curvature. The annular septum may be of non-uniform width in a longitudinal direction, with a width of said first section being smaller than a width of said second section. In exemplary embodiments, the width of the annular septum tapers from said first section to said second section. Advantageously, the range of bending of the joint assembly may be improved. The joint assembly may be also biased to bend in a predetermined direction.

In exemplary embodiments, the annular septum comprises a first septum portion and a second septum portion. The first and second septum portions may be separate elements spaced apart from each other. Advantageously, such an arrangement facilitates altering the separation between the first and second bladders around their circumference (e.g. by altering the spacing between the first and second septum portions), which may help to bias the associated joint assembly to bend in a predetermined direction.

In exemplary embodiments, the tubular body has a longitudinal axis; wherein, during articulation from said first state to said second state, the body bends to define an internal curvature and an external curvature. The annular septum may have a circumference or perimeter, wherein a first section of the circumference or perimeter is intended to be proximal the internal curvature and a second section of the circumference or perimeter opposite the first section of the circumference or perimeter is intended to be proximal the external curvature. The spacing between the first and second septum portions of the annular septum may be of non-uniform spacing in a longitudinal direction, with a spacing of said first section being smaller than a spacing of said second section. In exemplary embodiments, the spacing between the first and second septum portions of the annular septum tapers from said first section to said second section. In some embodiments, the first and second septum portions may converge to a single septum portion at said second section (i.e. the spacing at second section may be zero). Advantageously, the range of bending of the joint assembly may be improved. The joint assembly may be also biased to bend in a predetermined direction.

In exemplary embodiments, the joint assembly further comprises an annular brace arranged radially inside the flexible bladder arrangement to limit inward radial deformation of the flexible bladder arrangement during articulation of the tubular body from said first state to said second state. Advantageously, the annular brace helps to control deformation of the bladder arrangement.

In exemplary embodiments, the flexible bladder arrangement comprises a first bladder which defines a first chamber and a second bladder which defines a second chamber, wherein an annular septum is arranged between the first and second bladders, and wherein the annular septum and annular brace are integrally coupled (e.g. formed as a single piece or fixedly connected directly to each other).

In exemplary embodiments, the joint assembly comprises one or more longitudinal strengthening elements which are connected to and extend at least partially over and/or through the bladder arrangement and/or the supports. Advantageously, the one or more longitudinal strengthening elements help to stabilise the joint assembly.

In exemplary embodiments, the one or more longitudinal strengthening elements are configured to inhibit separation of the bladder arrangement and the supports and/or to limit flexing of the joint assembly in one or more directions.

In exemplary embodiments, the or each longitudinal strengthening element extends along substantially the full length of the tubular body.

In exemplary embodiments, the bladder comprises an internal membrane. Optionally, the internal membrane is annular and runs parallel to inner and outer circumferences of the bladder to split the chamber into a plurality of sub-chambers. Optionally, the internal membrane is sealed against two internal sides of the bladder. Optionally, the internal membrane is a sub-bladder which is sealed against two internal sides of the bladder in order to provide three separate sub-chambers within the bladder (i.e. a first sub-chamber provided between an outer circumference of the internal membrane, and an outer circumference of the bladder; a second sub-chamber provided between an inner circumference of the internal membrane and an inner circumference of the bladder; and a third sub-chamber provided inside the internal membrane). Optionally, each of the sub-chambers is devoid of gas and partially filled with a non-gaseous fluid which moves within the respective sub-chamber during articulation of the tubular body from said first state to said second state.

Such an arrangement provides multiple benefits. For example, the internal membrane provides a back-up layer in the event of a cut or tear in the bladder, which provides even greater safety from a single point of failure. In other words, when the bladder arrangement is used in a joint assembly for an EVA suit, there can be no catastrophic single point of failure if the bladder is torn. In some embodiments, there are four redundant membranes (i.e. a radially outer surface of the bladder, a radially outer surface of the internal membrane, a radially inner surface of the internal membrane, and a radially inner surface of the bladder). Furthermore, the sub-chambers may contain different fluids which react when mixed together to form a self-healing fluid. In this way, if a bladder and its internal membrane are both torn, the tear may be "self-healed" by the reaction resulting from the mixing fluids in the respective sub-chambers, which re-seals the bladder.

The internal membrane may be formed in a similar way to the bladder (e.g. the internal membrane may be reinforced in a similar way). In other words, the internal membrane may comprise a plurality of reinforcing fibres arranged to prevent the internal membrane from expanding or stretching. In exemplary embodiments, at least some of the reinforcing fibres extend in a toroidal or circumferential direction around the internal membrane. In exemplary embodiments, at least some of the fibres extend along an outer circumference of the internal membrane. In exemplary embodiments, at least some of the fibres extend along an inner circumference of the internal membrane. In exemplary embodiments, at least some of the fibres extend along a side or circumference of the internal membrane that is between the inner circumference and the outer circumference. In exemplary embodiments, at least one of the fibres is arranged to define a coil or coiled configuration around the internal membrane (e.g. extending in a poloidal and toroidal manner).

In some embodiments, multiple bladders and/or bladder arrangements may be radially stacked (i.e. with one radially inside the other) in order to provide similar effects of having redundant layers and/or containing different types of fluid which react in the event of a tear to "self-heal" the bladder(s).

In exemplary embodiments, the body comprises a plurality of said flexible bladder arrangements (e.g. arranged in series). The plurality of flexible bladder arrangements may optionally be interspersed between a plurality of supports. Advantageously, the joint assembly can have varying lengths depending on the intended use.

In exemplary embodiments, the passage is configured for receiving part of a human body, e.g. a limb or a digit. Advantageously, the joint assembly can be used as a joint, for example, in an EVA suit. Optionally, the passage defines a sleeve for receiving said part of a human body.

In exemplary embodiments, the joint assembly is configured for articulation between the first state and the second state upon movement of said part of the human body.

In exemplary embodiments, the joint assembly is configured such that when the body is articulated from the first state to the second state, the bladder moves or transforms from a first deformed state to a second deformed state.

In a second aspect of the present disclosure, there is provided a glove for an extravehicular activity (EVA) suit, the glove comprising one or more joint assemblies of the first aspect.

In exemplary embodiments, the passageway is configured for receiving a finger or thumb, wherein the joint assembly is configured for articulation between the first state and the second state upon movement of the finger or thumb. Advantageously, a user of the glove is able to flex the joint by moving their finger or thumb. Optionally, the passageway defines a sleeve for receiving said finger or thumb.

In a third aspect of the present disclosure, there is provided an arm portion for an extravehicular activity (EVA) suit, the arm portion comprising one or more joint assemblies of the first aspect.

In exemplary embodiments, the passageway is configured for receiving an arm or elbow, wherein the joint assembly is configured for articulation between the first state and the second state upon movement of the arm or elbow. Advantageously, a user of the arm portion is able to flex the joint by moving their arm/elbow. Optionally, the passageway defines a sleeve for receiving said arm or elbow.

In a fourth aspect of the present disclosure, there is provided an extravehicular activity (EVA) suit comprising one or more joint assemblies of the first aspect.

BRIEF DESCRIPTION OF THE DRAWINGS

Examples of the present disclosure are now described with reference to the accompanying drawings, in which:

FIGS. 2A-2C show views of a section of a joint assembly according to embodiments of the present disclosure;

DETAILED DESCRIPTION

Figures 1A, 1B:
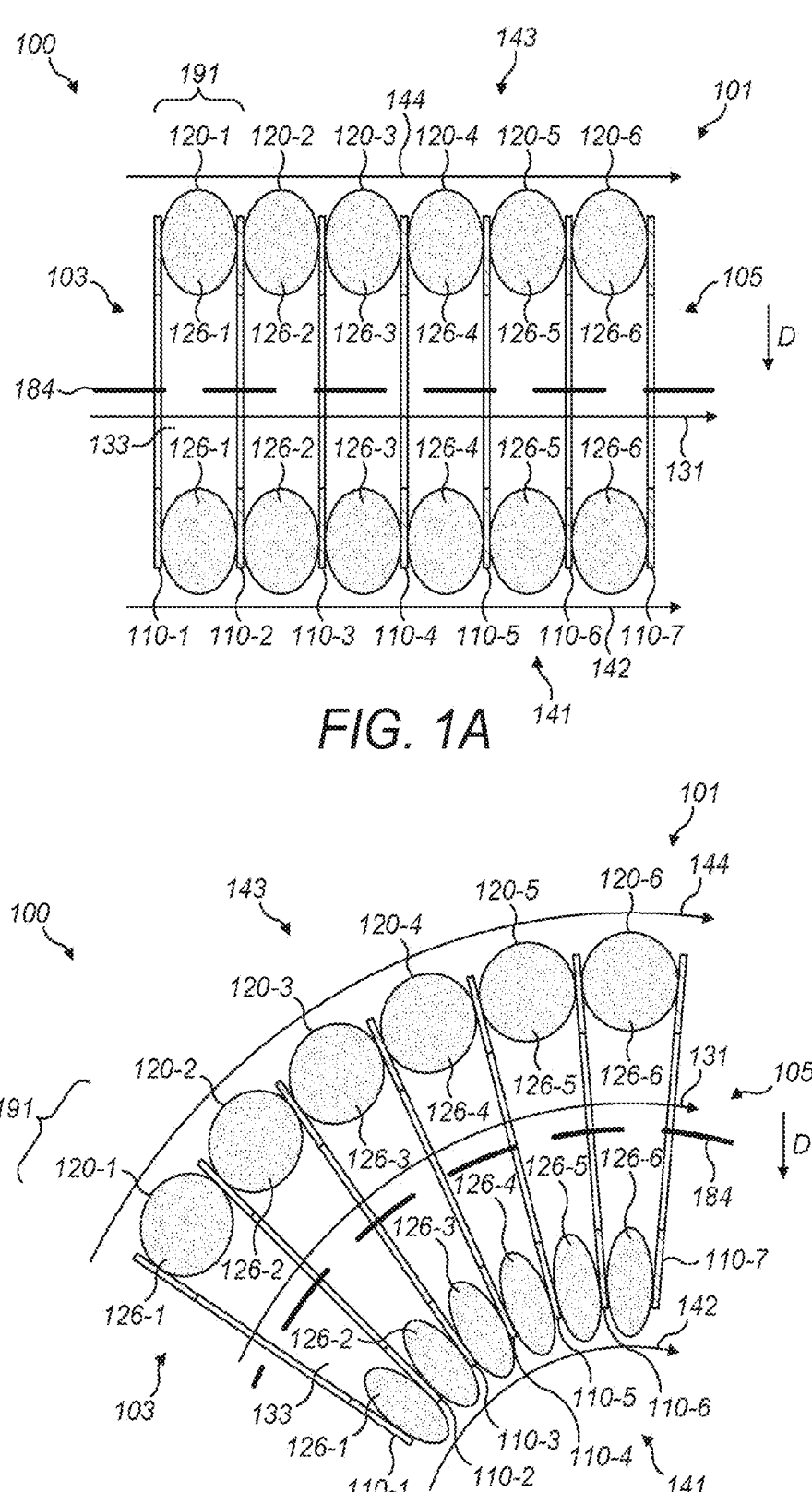
FIGS. 1A-1D shows views of a joint assembly according to embodiments of the present disclosure.
Figure 1C:
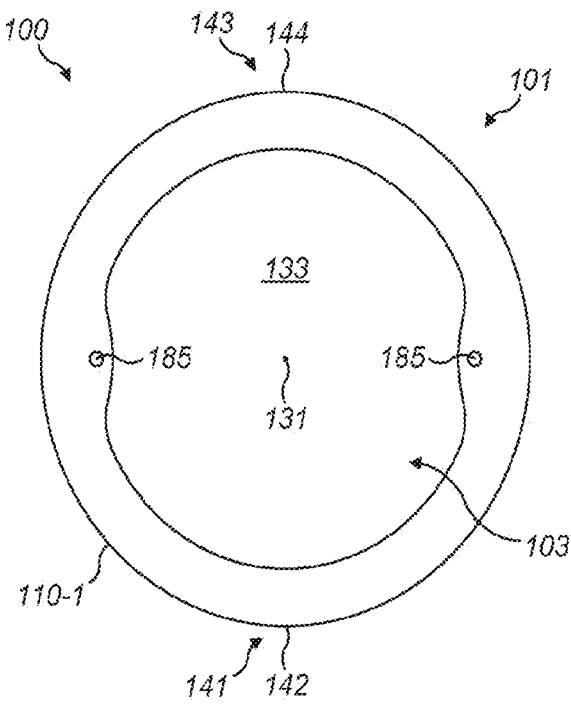
Figure 1D:
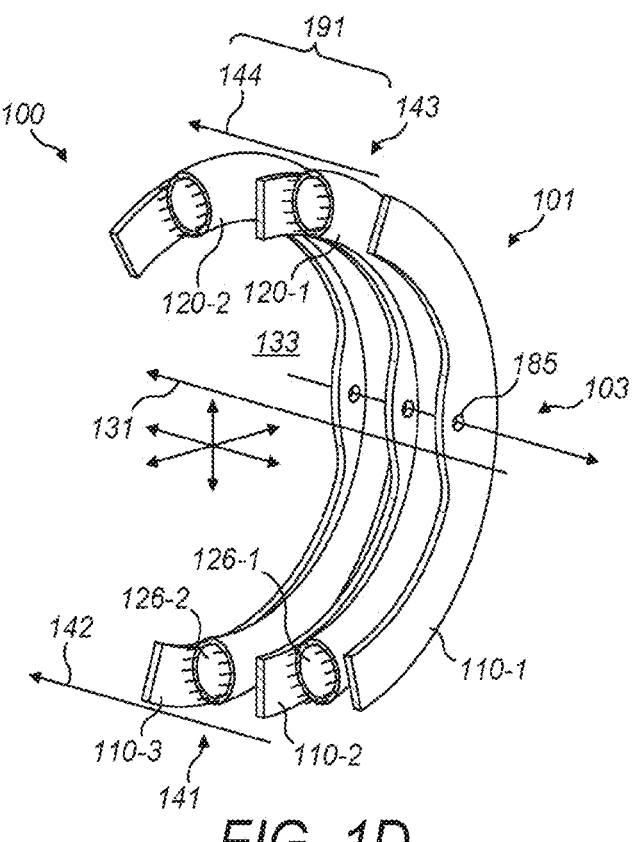

FIGS. 1A-1D illustrate a joint assembly 100 according to an embodiment of the present disclosure. FIG. 1A illustrates a cross sectional side view of the joint assembly 100 in a resting state (e.g. unbent, extended, or straight), whereas FIG. 1B illustrates a cross sectional side view of the joint assembly 100 in a bent or deflected state. FIG. 1C illustrates an end view of the joint assembly 100. FIG. 1D illustrates a cross sectional perspective view of (part of) the joint assembly 100, in the resting state. The joint assembly 100 is configured for articulation between at least the resting state and the bent state.

The joint assembly 100 has a body 101. The body 101 is substantially tubular, e.g. so as to define a sleeve. The body 101 has a first end 103 and a second end 105. The body 101 has a passage 131 that extends between the first end 103 and the second end 105. The passage 131 defines an interior volume 133 of the body 101. The interior volume 133 is between the first end 103 and the second end 105 of the body 101. In the resting state shown in FIG. 1A, the first end 103 and the second end 105 are in a first orientation with respect to one another. In the first orientation, the first end 103 and the second end 105 are substantially coaxial. In the bent state shown in FIG. 1B, the first end 103 and the second end 105 are in a second orientation with respect to one another. In the second orientation, the first end 103 and the second end 105 are not longer coaxial with one another (i.e. the first 103 and second 105 ends are deflected and/or their respective axis are deflected relative to one another). The joint assembly 100 is configured for articulation between the resting and bent states.

The body 101 has a longitudinal axis in the direction of the passage 131. The body 101 also has a line or length 142 on an external surface of the body 101. The line 142 extends across the surface between the first end 103 and the second end 105 of the body. The body also has a line or length 144 on the external surface of the body 101. The line 142 extends across the surface between the first end 103 and the second end 105 of the body 101. The lines 142 and 144 are substantially parallel to the longitudinal axis. The line 142 is on an opposite side of the body 101 to the line 144. In the resting state of FIG. 1A, the lines 142 and 144 have substantially the same length. As shown in FIG. 1B and discussed further below, when the joint assembly 100 is in the bent state, the body 101 bends to define an external curvature at an outside of the bend 143, and an internal curvature at an inside of the bend 141. In particular, the line 144 is at the outside of the bend 143 and the line 144 bends to define the external curvature. The line 142 is at the inside of the bend 141 and the line 142 bends to define the internal curvature. When the joint assembly 100 is articulated to the bent state, the line 142 shortens and the line 144 lengthens.

The body 101 is formed of a series of support elements 110-1, 110-2, 110-3, 110-4, 110-5, 110-6, 110-7, and a series of ring or torus shaped, flexible bladders 120-1, 120-2, 120-3, 120-4, 120-5, 120-6. Each of the bladders 120-1 to 120-6 has a central aperture. Each of the support elements 110-1 to 110-7 is of annular form and so also has a central aperture. The bladders 120-1 to 120-6 and the support elements 110-1 to 110-7 are arranged in series and in an alternating fashion to form the body 101, with the support elements 110-2 to 110-6 serving as spacers between adjacent bladders. In other words, each bladder 120-1 to 120-6 is arranged between a cooperating pair of, or opposing ones of, the support elements 110-1 to 110-7.

The central apertures of the support elements 110-1 to 110-7 and the central apertures of the bladders 120-1 to 120-6 form or define the passage 131. The passage 131 extends through the central apertures of the support elements 110-1 to 110-7 and the central apertures of the bladders 120-1 to 120-6. In the resting state as shown in FIG. 1A, the apertures of the support elements 110-1 to 110-7 and the bladders 120-1 to 120-6 are substantially coaxial or coaligned. As shown between FIGS. 1A and 1B, neither the support elements nor the bladders substantially protrude into or obstruct the passage when the joint is articulated between the resting and bent states. As such the passage 131 is configured for receiving a human body part (e.g. the passage may be a sleeve for a human body part). The human body part can be a limb (e.g. arm, leg, neck, etc) or digit (e.g. finger, thumb, toe etc.). The joint assembly 100 is configured for articulation, e.g. between the resting and bent states, upon movement of the body part.

The joint assembly is configured such that a seal is formed between the bladders 120-1 to 120-6 and the adjacent or opposing support elements. For example, the bladders are sealingly coupled with the opposing supports, e.g. using a suitable adhesive. As such, the bladders may be considered as sealing rings.

Each bladder 120-1 to 120-6 defines a respective chamber 126-1 to 126-6. Each chamber is partially filled with a fluid, such that the fluid will move or displace within the chamber during articulation of the joint assembly 100 between the resting state and the bent state. Each chamber has a maximum fill capacity. The maximum fill capacity corresponds to the most that the chamber can be filled before the bladder ruptures or otherwise deforms. The maximum fill capacity may correspond to a maximum volume of the chamber. The chamber is only partially filled with the fluid. In particular, the chamber holds an amount of fluid that is below the maximum fill capacity. The chamber is devoid of any other substance. As such, the volume of the chamber is less than the maximum volume of the chamber. The fluid is sealed within the chamber. The fluid can therefore move or displace around the chamber when an external force or pressure is applied to the bladder.

Accordingly, when the joint assembly 100 is articulated from the resting state to the bent state, the first end 103 moves relative to the second end 105, e.g. in the direction D. In particular, the first end 103 and the second end 105 move from being in an orientation in which they are substantially coaxial, to an orientation where they are not coaxial (i.e. their axes are angled with respect to one another). Each bladder is compressed by the adjacent supports proximal to the line 142 (i.e. at the inside of the bend 141). Each bladder is decompressed by the adjacent supports, or pressure is relieved by the adjacent supports, proximal to the line 144 (i.e. at the outside of the bend 143). The body 101 therefore contracts at the inside of the bend 141, i.e. the length of the line 142 decreases. The body 101 expands or lengthens at the outside of the bend 143, i.e. the length of the line 144 increases. The body 101 is therefore enabled to articulate between the resting and bent states. The interior volume 133 of the body 101 between the first end 103 and the second end 105 may also maintain a substantially constant volume as the joint assembly 100 is articulated.

As the joint assembly 100 moves from the resting state to the bent state, each bladder can be considered as deforming or transforming from a first deformed state to a second deformed state. The cross section of the bladder changes or deforms between the first deformed state and the second deformed state. In particular, in the resting state of the assembly 100 as shown in FIG. 1A, the bladders are in a first deformed state. In the first deformed state, each of the bladders has a substantially circular or elliptical cross section. The bladders are not compressed in the first deformed state, and so the first deformed state of the bladder may correspond to a resting, passive or natural state of the bladder. In the bent state of the assembly 100 as shown in FIG. 1B, the bladders transform or deform into the second deformed state. In the second deformed state, the cross section of each bladder at the inside 141 of the bend changes to a flatter or more squashed elliptical shape. This is because the bladders are compressed by the opposing supports at the inside 141 of the bend. Furthermore, the cross section of each bladder at the outside 143 of the bend changes to be a rounder/larger circular or elliptical shape. This is because pressure is relieved on the bladders at the outside 143 of the bend. The body 101 is therefore enabled to articulate between the resting and bent states.

Preferably, the chamber is filled to approximately 50% of its maximum fill capacity (i.e. the volume of the chamber is about 50% of the maximum volume). A 50% fill amount may allow the joint assembly 100 to achieve an optimal range of movement. However, the bladder 120-1 can be filled to any level between 10% and 90%.

The fluid is preferably a non-gaseous fluid. For example, the fluid may be a liquid, gel, paste or cream. The chamber of each bladder is preferably devoid of any other substance, e.g. gas such as air. The fluid optionally has a low vapour pressure. The fluid optionally has a vapour pressure low enough such that the fluid will not expand or vaporise (e.g.

turn into gas) when the bladder is placed in a vacuum. The fluid optionally has a vapour pressure of approximately 10-10 to 10-7 torr at 20° C., in some embodiments. The fluid is preferably incompressible and/or inexpansible. The fluid may be a non-Newtonian liquid. The fluid may be, for example, an oil. The fluid may be any silicon based oil. The fluid may be a vacuum oil such as an oil from Apiezon®.

In some embodiments, the fluid may include a thermally-insulating medium, for example, having microballoons, e.g. microballons made of glass.

In some embodiments, the fluid may be a self-healing fluid. For example, a fluid configured to change from a fluid state to a non-fluid state when exposed to the external environment outside of the bladder arrangement, or a fluid containing particles configured to block any opening which forms in the bladder.

Reference is now made to FIGS. 2A-2C, which illustrates a section 191 of the joint assembly 100 in more detail. The section 191 includes the bladder 120-1 arranged between the supports 110-1 and 110-2. FIG. 2A shows a perspective view of the section 191. FIG. 2B shows a cross sectional perspective view of the section 191. FIG. 2C illustrates the cross sectional perspective view of FIG. 2B without the supports 110-1 and 110-2.

The annular support 110-1 has a rim 212-1 and a central aperture 214-1. The annular support 110-2 has a rim 212-2 and a central aperture 214-2. The bladder 220-1 has a central aperture 224-1. As shown, the bladder 120-1 is arranged between the supports 110-1 and 110-2 such that the passage 131 may extend through the apertures 214-2, 214-1 and 224-1. In particular, the bladder 120-1 is positioned between the rim 212-1 of the support 120-1 and the rim 212-2 of the support 120-2. The bladder 120-1 is sealingly coupled to the rim 212-1 and the rim 212-2 along the entire circumference of the rims. The bladder 120-1 is preferably adhered between the rims 212-1 and 212-2, for example using a suitable adhesive. The annular supports 110-1 and 110-2 are substantially rigid.

The supports 110-1/110-2 may be made of a polymer, or more particularly a reinforced polymer. Alternatively or additionally, the supports may be made of a metal. More particularly, the supports may be made of a lightweight metal such as a metal alloy, e.g. titanium. Titanium may be particularly advantageous because it is both lightweight and strong. Furthermore, titanium has relatively low thermal conductivity in comparison to other metals (e.g. titanium is a good insulator in comparison to other metals). Therefore, where the joint assembly is used in an EVA suit, titanium may be particularly advantageous for shielding the user of the EVA suit from the harsh environments of space. In some examples, the supports 110-1 and 110-2 can be made from a plastic reinforced with carbon fibre. The supports 110-1 and 110-2 of the present embodiment have substantially uniform width in a longitudinal direction of the body 101 (i.e. the direction of the passage 131).

The bladder 120-1 has a body formed of a membrane 222-1. The membrane 222-1 defines the chamber 126-1 of the bladder 120-1. The chamber 126-1 may be considered as a channel, (e.g. an endless channel) of the bladder 120-1. The membrane 222-1 seals the chamber 126-1 of the bladder 120-1. As discussed above, the chamber 126-1 is partially filled with the fluid.

The membrane 222-1 is flexible and substantially inextensible (e.g. unstretchable). The membrane 222-1 may also be substantially inelastic. The flexibility of the membrane 222-1 may allow the fluid within the bladder 120-1 to displace around the chamber 126-1 when pressure is applied to the bladder 120-1. The inextensibility of the membrane 222-1 may ensure that the membrane 222-1 does not stretch or deform when a pressure on the outside of the bladder 120-1 is less than a pressure inside the chamber 126-1, for example when the bladder 120-1 is placed in a vacuum. The membrane 222-1 also has a high enough tensile strength such that the bladder 120-1 will not rupture or otherwise deform when the pressure inside the chamber 126-1 is greater than a pressure outside of the bladder 120-1. More particularly, the membrane 222-1 has a high enough tensile strength such that the bladder 120-1 will not rupture or otherwise deform when placed in a vacuum. Preferably, the membrane 222-1 comprises a flexible polymer, such as a rubber. For example, the membrane 222-1 may be a silicone rubber. In the present embodiment, as shown in FIGS. 2B-2C, the bladder 120-1 can have a circular or oval cross section. Preferably, the membrane 222-1 has a thickness of below 0.2 mm, preferably about 0.05 mm. However, it will be appreciated that any thickness may be used.

The membrane 222-1 includes sets of reinforcing fibres 227-1, 228-1 and 229-1. The reinforcing fibres 227-1, 228-1, 229-1 are formed or disposed within a substrate of the membrane 222-1. The reinforcing fibres 227-1, 228-1, 229-1 are arranged to prevent the membrane from expanding or stretching. The reinforcing fibres 227-1, 228-1, 229-1 may further increase the tensile strength of the membrane 222-1, whilst maintaining flexibility of the membrane 222-1. The reinforcing fibres can be arranged to reinforce the membrane/improve its tensile strength in certain planes or directions of the bladder. At least one of the reinforcing fibres extends in a poloidal and toroidal manner around the bladder 120-1, and some of the reinforcing fibres extend in a toroidal or circumferential direction around the bladder 120-1. The set of fibres 227-1 extend in a poloidal and toroidal direction around the bladder 120-1. The set of fibres 227-1 are therefore arranged to define a coil or are in a coiled configuration around the chamber 126-1. The fibres 228-1 extend along an outer circumference of the bladder 120-1 e.g. in a toroidal direction. The outer circumference is the side of the bladder that faces the exterior of the joint assembly 100. The fibres 229-1 extend along an inner circumference of the bladder 120-1, e.g. in a toroidal direction. The inner circumference is the side of the bladder that faces the interior volume 133 of the joint assembly 100. The fibres 227-1, 228-1, 229-1 preferably comprise a synthetic fibre, such as an Aramid fibre.

The cross section of the chamber 126-1 preferably has a diameter of between 2-10 mm. However, it will be appreciated that the chamber 126-1 may have any other diameter or dimensions, depending on the specific implementation.

It will be appreciated that although only the section 191 of the joint assembly 100 is shown in FIGS. 2A-2C, similar features will apply to other sections of the joint assembly 100, e.g. to a section including the supports 110-2/110-3 and the bladder 120-2, a section including the supports 110-3/110-4 and the bladder 120-3, a section including the supports 110-4/110-5 and the bladder 120-4, a section including the supports 110-5/110-6 and the bladder 120-6 and a section including the supports 110-6/110-7 and the bladder 120-6. However, the description of those sections is not repeated for brevity.

It will be appreciated that each of the bladders 120-2 to 120-6 of the joint assembly 100 may have substantially the same features and characteristics of the bladder 120-1 described above. In some embodiments, the bladders 120-1 to 120-6 are identical. However, in other embodiments, the bladders 120-1 to 120-6 need not be identical, and may differ by one or more of size, dimensions, material, fill level etc.

It will be appreciated that each of the supports 110-3 to 110-7 may have substantially the same features and characteristics of the supports 110-1 and 110-2 described above. In some embodiments, the supports 110-1 to 110-7 are identical. However, in other embodiments, the supports 110-1 to 110-7 need not be identical, and may differ by one or more of size, dimensions, material etc.

With reference to FIGS. 1A-1B and in particular the section 191 of the body 101, when the joint assembly 100 articulates from a resting state to a bent state, the first end 103 moves relative to the second end 105. Consequently, the support 110-1 moves relative to the support 110-2, e.g. in the direction D. In particular, the support 110-1 and the support 110-2 move from being in an orientation in which they are substantially coaxial, to an orientation where they are not coaxial. As a result, the fluid in the bladder 120-1 is displaced within the chamber 126-1. In particular, as the joint assembly 100 is bent, the support 110-1 (more particularly the rim 212-1) will attempt to move closer to the support 110-2 (more particularly the rim 212-2) at the inside of the bend 141 (i.e. proximal to the line 142). The support 110-1 will also attempt to move further or apart from the support 110-2 at the outside of the bend 143 (i.e. proximal to the line 144). The supports 110-1 and 110-2 therefore exert pressure on the bladder 120-1 at the inside of the bend 141. The supports 110-1 and 110-2 also relieve pressure on the bladder 120-1 at the outside of the bend 143. The bladder 120-1 is compressed by the supports 110-1 and 110-2 at the inside of the bend 141 (i.e. proximal to the line 142). The bladder 120-1 is decompressed by the supports 110-1 and 110-2, or pressure is relieved by the supports, at the outside of the bend 143 (i.e. proximal to the line 144). The fluid will therefore displace around the chamber 126-1, from the inside of the bend to the outside of the bend (i.e. from the line 142 towards the line 144). Consequently, the section 191 of the body 101 contracts at the inside of the bend 141, i.e. the distance between the supports 110-1 and 110-2 at the line 142 decreases. The section 191 of the body 101 expands or lengthens at the outside of the bend 143, i.e. the distance between the supports 110-1 and 110-2 at the line 144 increases. The section 191 of the body 101 is therefore enabled to articulate between resting and bent states. The interior volume of the section 191 between the supports 110-1 and 110-2 may also maintain a substantially constant volume as the joint assembly 100 is articulated.

The other sections of the joint assembly 100 (i.e. the other bladders and their adjacent support elements) will behave similarly to the first section 191 as described above. Therefore the body 101 will increase in length at the outside of the bend 143 (i.e. the line 144 will increase in length). The body will decrease in length at the inside of the bend 141 (i.e. the line 142 will decrease in length). As such, the body 101 is therefore enabled to articulate between the resting and bent states. Furthermore, the interior volume 133 of the joint assembly 100 may maintain a substantially constant volume as the joint assembly 100 is articulated.

Advantageously, the joint assembly 100 can be used in pressurised systems for use in low pressure environments, such as in a vacuum. For example, the joint assembly 100 may be part of an EVA (extravehicular activity) suit for use in low pressure or vacuum environments. As mentioned above, the bladders may be sealed and/or adhered to the adjacent spacers which may allow the interior volume 133 of the joint assembly 100 to be pressurised. The internal volume 133 may be pressurised at a pressure that is greater than the pressure outside of the EVA suit and the joint assembly 100 (e.g. a vacuum). As such, the internal volume 133 may have a positive pressure. Since the joint assembly 100 may maintains a substantially constant volume between a resting and a bent position, a user of the EVA suit does not have to use significant energy in order to bend the joint 100. Therefore the internal volume 133 may be pressurised to pressures greater than 3-4 PSI, e.g. up to 1 atmosphere of pressure. This also means that the EVA suit does not need an oxygen rich atmosphere. As such, this may increase the amount of time a user can spend in the EVA suit by lowering the risk to the user's health and improving the user's comfort. This may also save on valuable oxygen resources. Moreover, the bladders 120-1 to 120-6 are made suitable for use in a vacuum or low pressure environments. The bladders are substantially inexpansible or unstretchable with a suitable amount of tensile strength, such that they will not stretch or rupture in a vacuum. It will be understood that because the bladders 120-1 to 120-6 define inner and outer surfaces, there can be no catastrophic single point of failure in the joint assembly 100. In other words, when the joint assembly 200 is used in an EVA suit, even if the outer surface of a bladder 120-1 to 120-6 is torn, the inner surface of the bladder 120-1 to 120-6 provides a redundant barrier which inhibits de-pressurisation of the EVA suit. Moreover, under normal working conditions, the fluid in the bladders has a vapour pressure such that the fluid will not change states, e.g. to a gas, during use in a vacuum. As such, the bladder will not "balloon" or expand in a vacuum. Rather, the volume of the chamber of the bladder remains below the maximum interior volume or fill capacity of the chamber, ensuring proper functioning of the joint assembly.

It will be appreciated that the joint assembly 100 is shown as being bent in one direction D for illustrative purposes only, and that the joint assembly 100 may deflect in any direction from the rest state.

Figure 3A:
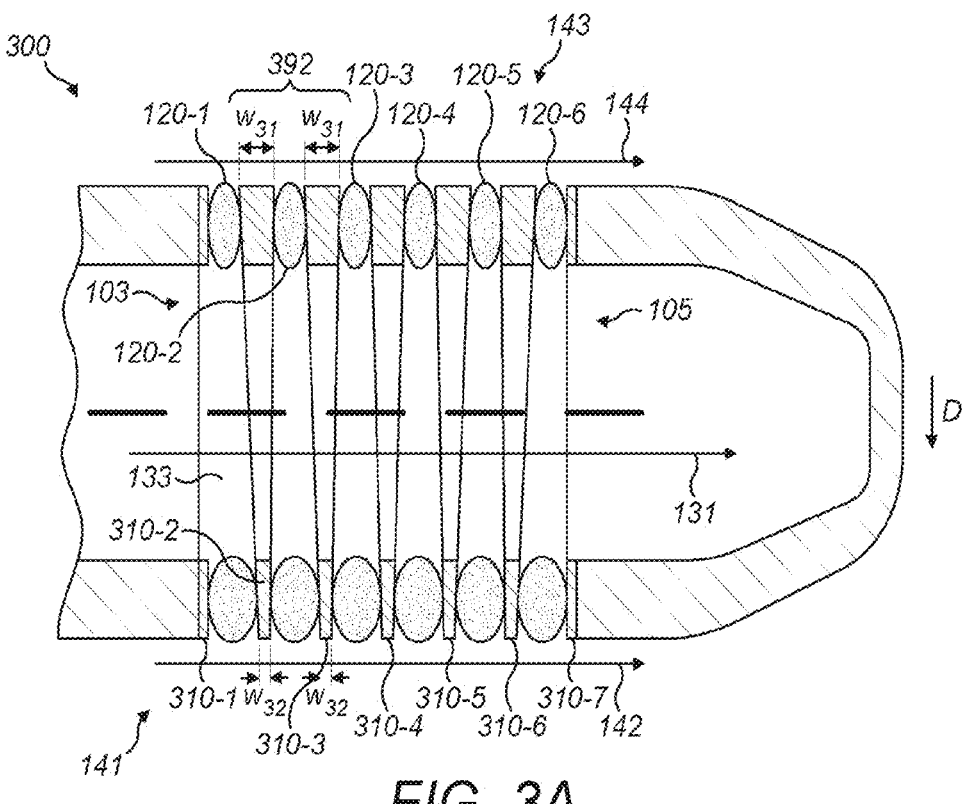
FIG. 3A-3B show views of another joint assembly according to embodiments of the present disclosure.
Figure 3B:
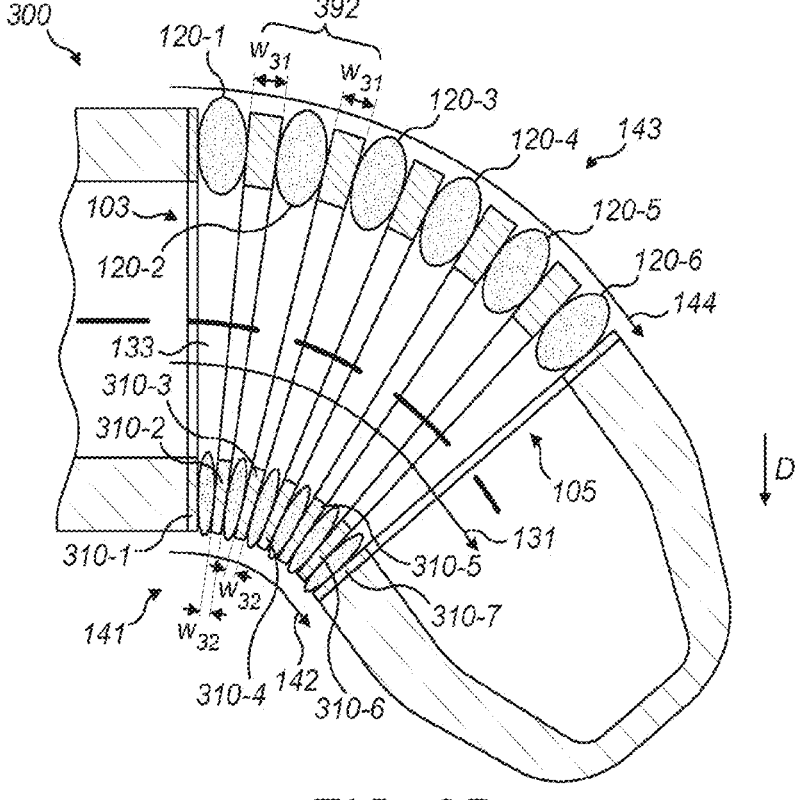

FIGS. 3A-3B illustrate a joint assembly 300 according to another embodiment of the present disclosure. FIG. 3A illustrates a cross sectional side view of the joint assembly 300 in a resting state (e.g. unbent, extended or straight). FIG. 3B illustrates a cross sectional side view of the joint assembly 300 in a bent or deflected state.

The joint assembly 300 substantially corresponds to the joint assembly 100. For example, the joint assembly 300 has a body 101. The body 101 is substantially tubular. The body has a first end 103 and a second end 105. The body 101 has a passage 131 that extends between the first end 103 and the second end 105. The passage 131 defines an interior volume 133 of the body 101. The body 101 is configured for articulation between the first (e.g. resting) state in which the first end 103 and the second end 105 are in the first orientation with respect to one another, and the second (e.g. bent) state in which the first end 103 and the second end 105 are in the second orientation with respect to one another. The body 101 comprises flexible bladders 120-1, 120-2, 120-3, 120-4, 120-5, 120-6, each being arranged between opposing support elements 310-1, 310-2, 310-3, 310-4, 310-5, 310-6, 310-7. Each of the flexible bladders and the support elements are ring shaped so as to define a central aperture, the respective apertures forming part of the passage 131. The passage is configured for receiving a human body part (e.g. the passage defines a sleeve for receiving said human body part). The joint assembly 300 is configured for articulation between the first and the second states upon movement of the body part. Each of the bladders 120-1 to 120-6 have a chamber that is partially filled with a fluid that can move within the chamber during articulation of the body 101 between the first and the second states. Each bladder comprises a membrane that defines the chamber, the membrane being flexible and substantially inextensible. The membrane comprises a plurality of reinforcing fibres arranged to prevent the membrane from expanding or stretching. At least some of the reinforcing fibres extend in a toroidal or circumferential direction around the bladder. At least one of the fibres is arranged to define a coil or coiled configuration around the chamber (e.g. extending in a poloidal and toroidal manner). The fluid in the chamber is, in this embodiment, a liquid, gel, paste or cream. The partially-filled chamber may be devoid of gas. The fluid may have a vapour pressure such that the fluid will not vaporise or expand when the joint assembly is placed in a vacuum. The vapour pressure of the fluid may be, in some embodiments, 10-10 to 10-7 torr at a temperature of 20 degrees Celsius. Each bladder is sealingly coupled with the opposing supports. The joint assembly 300 is configured such that when the first end 103 is moved relatively to the second end 105 to bend the joint assembly 300, each bladder is compressed by the opposing supports at an inside of the bend 141, and the bladder is decompressed at the outside of the bend 143. The body 101 contracts at an inside of the bend 141 and expands at an outside of the bend 143, via deformation of the bladders. The joint assembly 300 may maintain an interior volume of the body 101 between the first end and the second end at a substantially constant volume, via deformation of the bladders. It will be appreciated that all of the corresponding features between the joint assembly 100 and the joint assembly 300 are not repeated here for brevity.

The joint assembly 300 differs from the joint assembly 100 in that the supports 310-2 to 320-6 have a non-uniform width. Each support 310-2 to 310-6 has a circumference or perimeter. A first section of the support is proximal to the line 142 (i.e. proximal to the inside of the bend 141 or the internal curvature of the body 101 in the bent state). A second section of the support is proximal to the line 144 (i.e. proximal to the outside of the bend 143 or the external curvature of the body 101 in the bent state). Each support 310-2 to 310-6 has a width in a longitudinal direction of the body 101 (i.e. in the direction of the passage 131). The width of each support is non-uniform. In particular, the second section has a width that is greater than a width of the second section. The width may taper from the width at the second section to the width at the first section of the support.

As shown in FIG. 3A, a section 392 of the body 101 includes the supports 310-2 and 310-3 and the bladder 120-2. The supports 310-1 and 310-2 have a width W31 proximal to the line 144 and a width w32 proximal to the line 142, where w32 is less than w31. The widths of the supports may taper from the line 144 to the line 142. Therefore, in the resting state, the distance between the supports 310-2 and 310-3 proximal to the line 144 is less than the distance between the spacers 310-2 and 310-3 proximal to the line 142. Consequently, in the resting state, the bladder 120-2 is relatively more compressed proximal to the line 144 and the bladder 120-2 relatively less compressed or more expanded proximal to the line 142. As such, in the joint assembly 300, the bladder 120-2 is biased in the resting state, since the bladder 120-2 experiences different levels of compression between the lines 142 and 144. Meanwhile, in the joint assembly 100, the bladders may be considered neutral in the resting position, since the bladders experience a consistent level of compression between the lines 144 and 142 in the resting state.

With reference to the section 392, when the joint assembly 300 articulates from a resting state to a bent state, the first end 103 moves relative to the second end 105. Consequently, the support 310-2 moves relative to the support 310-3, e.g. in the direction D. In particular, the support 310-2 and the support 310-3 move from being in an orientation in which they are substantially coaxial, to an orientation where they are not coaxial. As a result, the fluid in the bladder 120-2 is displaced within the chamber 126-1. In particular, as the joint assembly 100 is bent, the support 310-2 will attempt to move closer to the support 310-3 at the inside of the bend 141 (i.e. proximal to the line 142). The support 310-2 will also attempt to move further or apart from the support 310-3 at the outside of the bend 143 (i.e. proximal to the line 144). The supports 310-2 and 310-3 therefore exert pressure on the bladder 120-2 at the inside of the bend 141. The supports 310-2 and 310-3 also relieve pressure on the bladder 120-2 at the outside of the bend 143. The bladder 120-2 is compressed by the supports 310-2 and 310-3 at the inside of the bend 141 (i.e. proximal to the line 142). The bladder 120-2 is decompressed by the supports 310-2 and 310-3, or pressure is relieved by the supports, at the outside of the bend 143 (i.e. proximal to the line 144). The fluid will therefore displace around the chamber 126-1, from the inside of the bend to the outside of the bend (i.e. from the line 142 towards the line 144). Consequently, the section 392 of the body 101 contracts at the inside of the bend 141, i.e. the distance between the supports 310-2 and 310-3 at the line 142 decreases. The section 392 of the body 101 expands or lengthens at the outside of the bend 143, i.e. the distance between the supports 310-2 and 310-3 at the line 144 increases. The section 392 of the body 101 is therefore enabled to articulate between resting and bent states. The interior volume of the section 392 between the supports 310-2 and 310-3 may also maintain a substantially constant volume as the joint assembly 300 is articulated.

Due to the tapered widths of the spacers 310-2 and 310-3, there is a greater amount of fluid in the bladder 120-2 proximal to the line 142 in the resting state in FIG. 3A. Furthermore, the supports 310-2 and 310-3 start off at a relatively greater distance apart at the line 142, and a relatively smaller distance apart at the line 144, in the resting state in FIG. 3A. This allows the supports 310-2 and 310-3 to be deflected from one another by a greater degree, thereby allowing for a greater degree of bending or deflection between the supports 310-2 and 310-3.

The other sections of the joint assembly 300 (i.e. the other bladders and their adjacent support elements) may behave similarly to the section 392 described above. Therefore, the joint assembly 300 can achieve a greater degree of bending in comparison to the joint assembly 100. Moreover, the joint assembly 300 may only bend in the direction of the tapering, e.g. in the "down" direction D in FIGS. 3A and 3B, which can be useful in some applications. For example, this can be useful for implementing joints of an EVA suit that naturally will only bend in one direction, such as finger joints. The supports 310-1 and 310-7 at the ends 103 and 105 of the body 101 may correspond to the supports 110-1 and 110-7 of the joint assembly 100 and have a substantially uniform width. However, the bladders 120-1 and 120-6 may still contribute to the above beneficial effect, since one of the opposing supports (namely 310-2 and 310-6 respectively) have a non-uniform width.

In some examples, the supports 310-2 to 310-6 have the same widths w31 and w32 and therefore the same tapering characteristics. However, it will be appreciated that the spacers 320-2 to 320-6 may have different widths and differential levels of tapering. As such, the spacers 320-2 to 320-6 need not be identical.

Figure 4A:
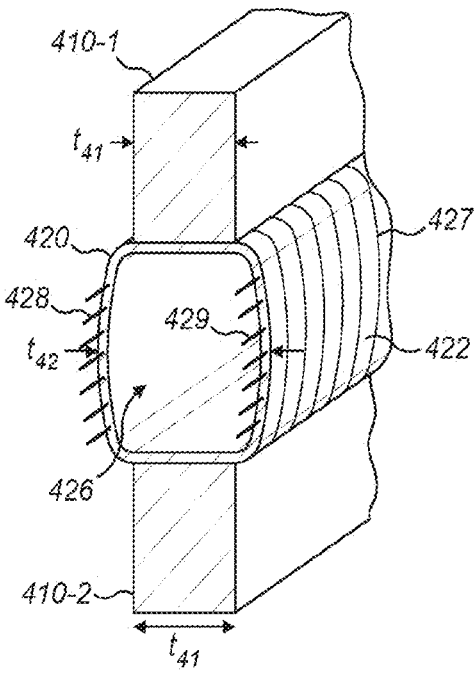
FIGS. 4A-4D show views of a ring-shaped or torus bladder according to embodiments of the present disclosure.
Figure 4B:
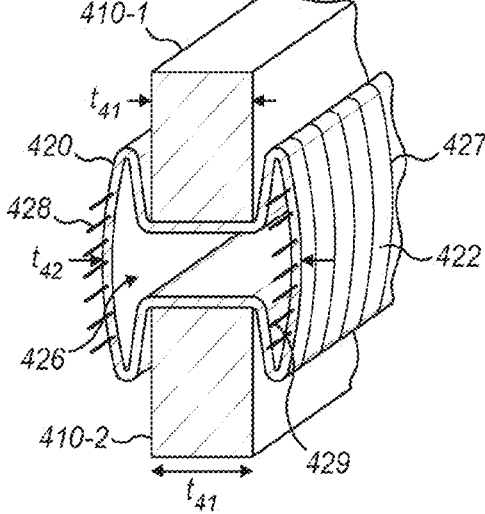
Figure 4C:
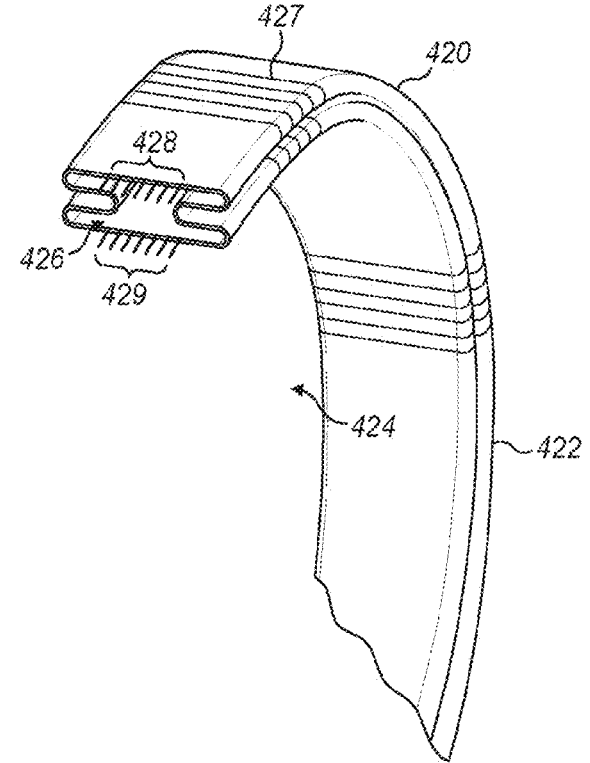
Figure 4D:
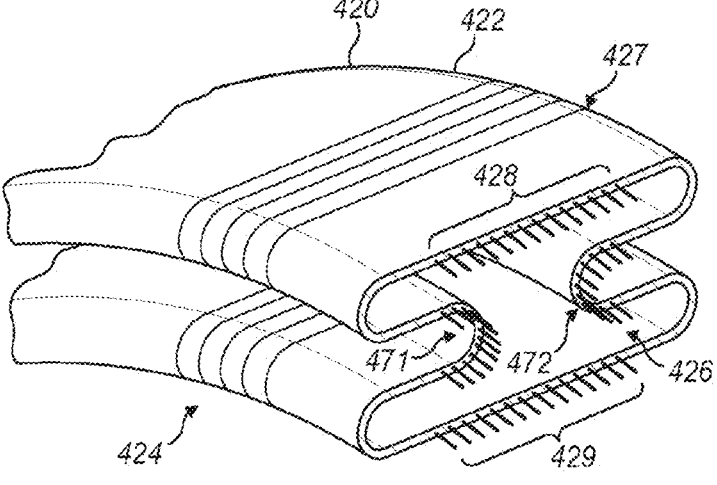

FIGS. 4A-4D illustrate cross sectional views of a bladder 420 according to another embodiment of the present disclosure. FIG. 4A shows a cross sectional perspective view the bladder 420 in an uncompressed position. FIG. 4B shows a cross sectional perspective view of the bladder 420 in a compressed position. FIGS. 4C and 4D show cross sectional perspective views of the bladders in a compressed position.

The bladder 420 substantially corresponds to the bladder(s) previously described above. In particular, the bladder 420 is a flexible bladder. The bladder 420 is ring shaped so as to define an aperture 424. The bladder 420 defines a chamber 426. The chamber 426 is partially filled with a fluid which can move within the chamber in use. The bladder 420 has a membrane 422 that defines the chamber 426. The membrane 422 is flexible and substantially inextensible. The membrane 422 has sets of reinforcing fibres 427, 428, 429 arranged to prevent the membrane from expanding or stretching. At least some of the fibres 428/429 extending in a toroidal or circumferential direction around the bladder 420. At least one of the fibres 427 is arranged to define a coil or coiled configuration around the chamber 422. E.g. the fibres 427 may extend in a poloidal and toroidal manner. The fluid is, in this embodiment, a liquid, gel, paste or cream. The partially filled chamber 420 may be devoid of gas. The fluid may have a vapour pressure such that the fluid will not vaporise or expand when the joint assembly is placed in a vacuum. The vapour pressure of the fluid may be, in some embodiments, 10-10 to 10-7 torr at a temperature of 20 degrees Celsius. It will be appreciated that all corresponding features are not repeated here for brevity.

The bladder 420 differs from the previously described bladder(s) in that the bladder 420 has first and second grooves or recesses on opposing sides of the bladder 420 in use. Moreover, the bladder 420 achieves a H shaped cross section in use.

As shown in FIG. 4A, the bladder 420 may have a substantially square or rectangular cross section. Preferably, the square or rectangle has curved edges. The bladders of the present disclosure may alternatively have a different cross sectional shape including square, rectangular, circular, oval or otherwise. Nevertheless, a rectangular or square cross section may be preferred in some applications, as described below.

As shown in FIGS. 4A and 4B, the bladder 420 can be arranged between opposing support elements 410-1 and 410-2. In use, as shown in FIG. 4B, the bladder 420 will adopt a "H" shaped cross section when compressed by the support elements 410-1 and 410-2. The "H" shaped cross section may help to achieve greater fluid displacement and therefore improved functionality when the bladder 420 is compressed during use. The "H" shape is defined by first and second grooves or recesses on opposing sides of the bladder 420.

When the bladder 420 is used, the adjacent support elements 410-1 and 410-2 preferably have a radial thickness t41 that is less than or equal to a radial thickness t42 of the bladder 420. The radial thickness refers to a radial direction of a tubular body of a joint assembly in which the bladder and support elements are used. For example, each support element can have an edge that runs around the aperture of the support element. The bladder 420 can be arranged between the edges of the opposing support elements. This may allow the bladder 420 to better achieve a H-shaped cross section when compressed by the support elements.

In some examples, the bladder 420 may readily adopt the "H" shaped cross section after being partially filled with the fluid. In other words, the partially filled property of the bladder 420 may cause the bladder 420 to readily adopt the "H" shaped cross section in a resting position.

Optionally, as shown in FIG. 4D, the membrane 422 may include additional sets of reinforcing fibres 471 and 472. The fibres 471 and 472 may be formed or disposed within the membrane 422. Each set of fibres 471, 472 runs or extends along a circumference or side of the bladder that is between the inner and outer circumference of the bladder. In particular, the fibres 471 extend along a circumference of the bladder 420 that is adjacent to the support 410-1. The fibres 472 extend along a circumference of the bladder 420 that is adjacent to the support 410-2. Advantageously, the fibres 472 and 471 may help a joint assembly maintain structural integrity when used in a low pressure environment, such as in a vacuum.

In some examples, as shown in FIGS. 4C and 4D, the sets of fibres 428, 429, 471, 472 do not reach the corners of the bladder. Rather, the sets of fibres 428, 429, 471, 472 may be substantially in the centre of the respective side of the bladder 420 along which they extend.

The cross section of the chamber 426 has a width in the longitudinal direction of the body of the joint assembly when used in a joint assembly (i.e. in the direction of the passage), and a thickness or height in a radial direction of the body. Preferably, the width is approximately 5-20 mm (preferably 10 mm) and the thickness is approximately 1-10 mm (preferably 2 mm). However, it will be appreciated that the chamber 426 may have any other cross sectional size, depending on the specific implementation.

Figure 15:
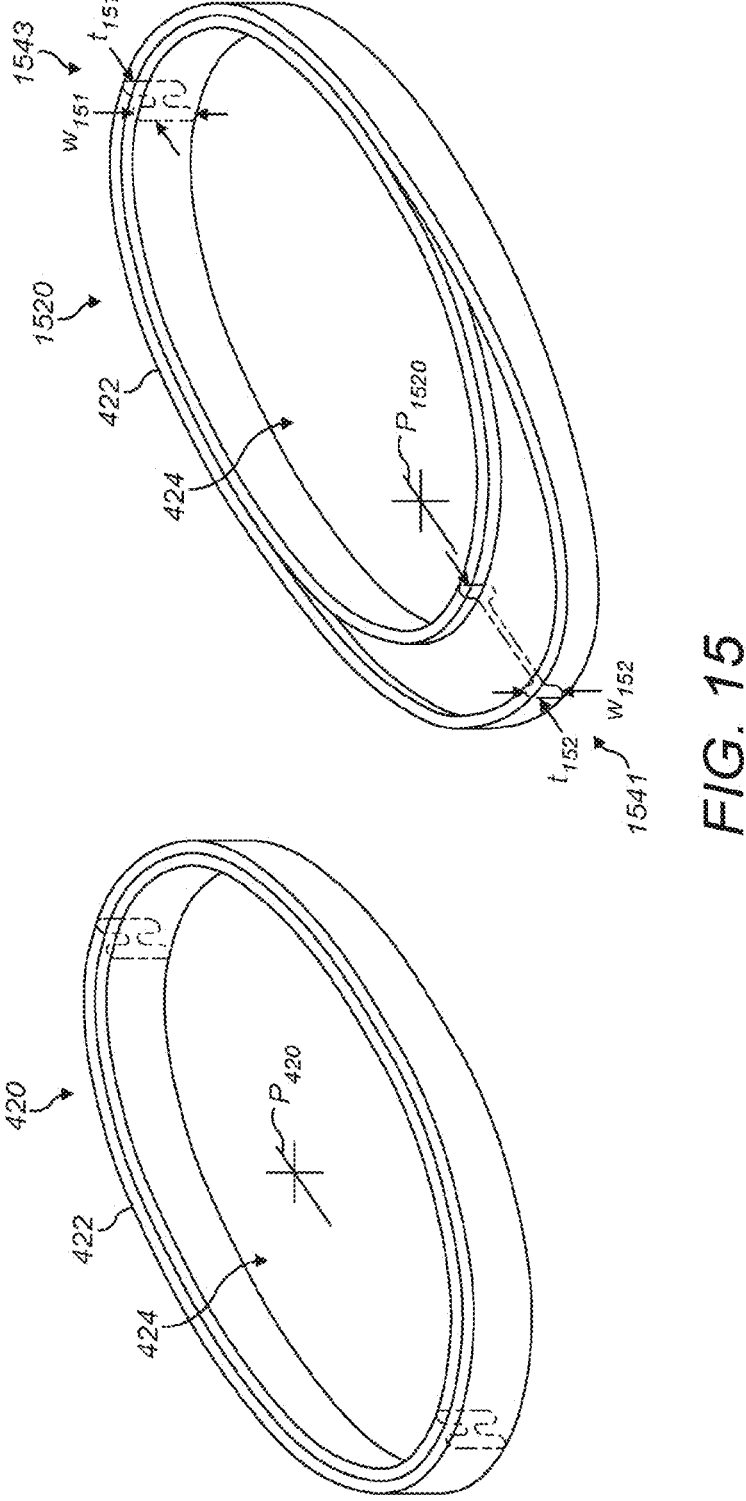
FIG. 15 shows a comparison between ring-shaped or torus bladders according to embodiments of the present disclosure.

In some examples, the bladder may have a non-uniform cross section (e.g. in a resting state). Reference is made to FIG. 15, which shows a comparison between the bladder 420 and a bladder 1520 according to an embodiment of the present disclosure. The bladder 1520 substantially corresponds to the bladder 420 previously described above. As shown, the bladder 420 has substantially uniform cross section about the circumference of the bladder 420. The bladder 1520 differs from the bladder 420 in that the bladder 1520 has a non-uniform cross section. The width of the bladder 1520 tapers from a width w151 on a first side 1543 of the bladder 1520 to a width w152 on a second side 1541 of the bladder 1520, whereby w152 is less than w151. The radial thickness of the bladder 1520 tapers from a thickness t152 on the second side 1541 of the bladder 1520 to a thickness t151 on the first side 1543 of the bladder 1520, whereby t152 is greater than t151. The "H" shape cross-section therefore goes from relatively thin and tall on the side 1543 to being relatively wide and short on the side 1541. As a result, a virtual pivot point P1520 of the bladder 1520 is relatively closer to the second side 1541 of the bladder 1520. In comparison, the virtual pivot point P420 of the bladder 420 is in the centre of the bladder 420. Advantageously, the non-uniformity of the radial thickness and/or width of the bladder 1520 may enable for compensation of 1st or 2nd order errors in the constant volume properties of the joint assembly, thereby further improving the constant volume properties of the joint assembly. In some examples, in use with joint assemblies of the present disclosure, the sides 1543 and 1541 may be proximal to the lines 144 and 142 of the joint assembly respectively. However, the sides 1543 and 1541 can correspond to any opposing lines of the joint assembly body, depending on the type of compensation required.

Figure 5A:
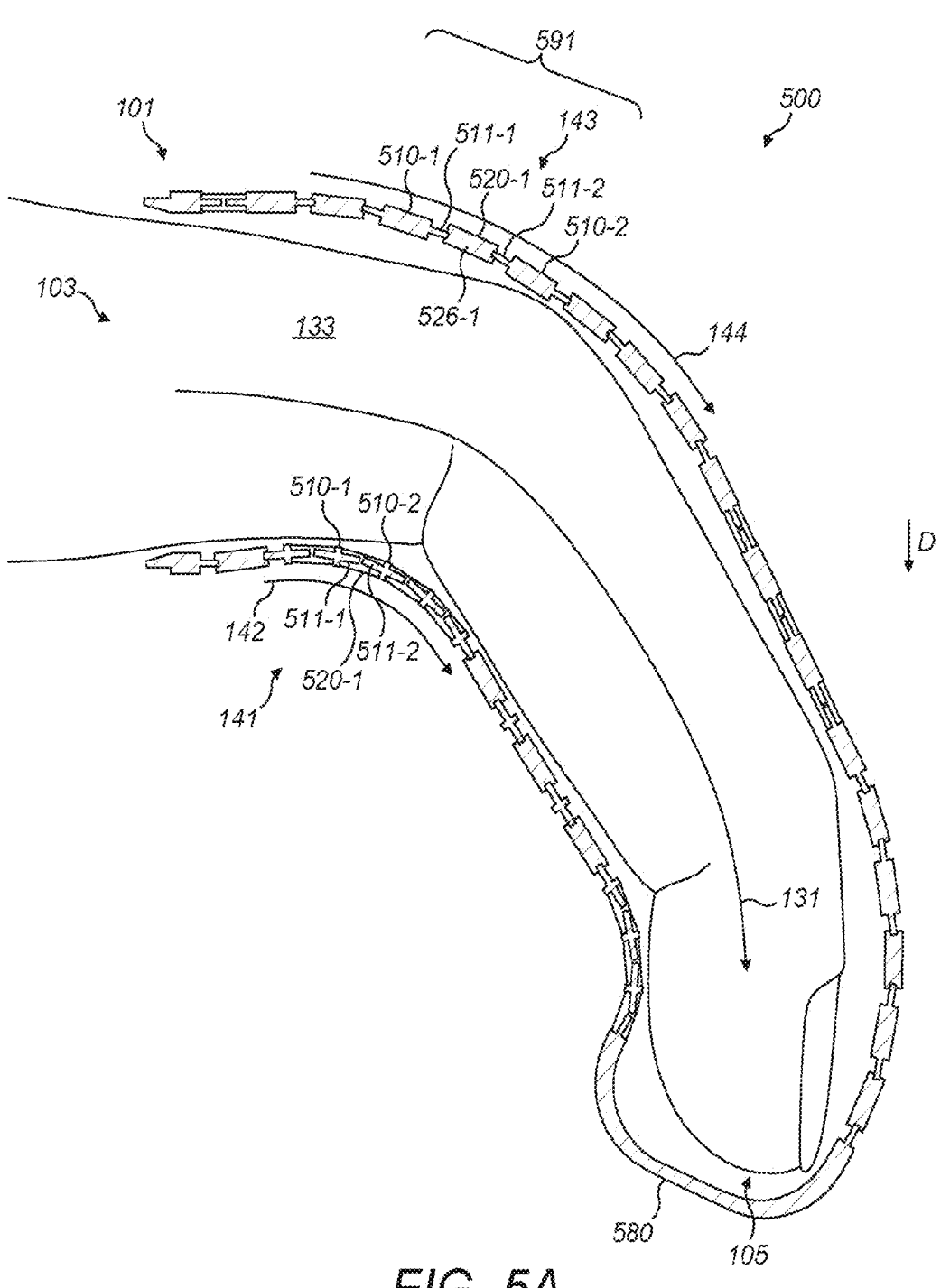
FIGS. 5A-5D show views of another joint assembly according to embodiments of the present disclosure.
Figure 5B:
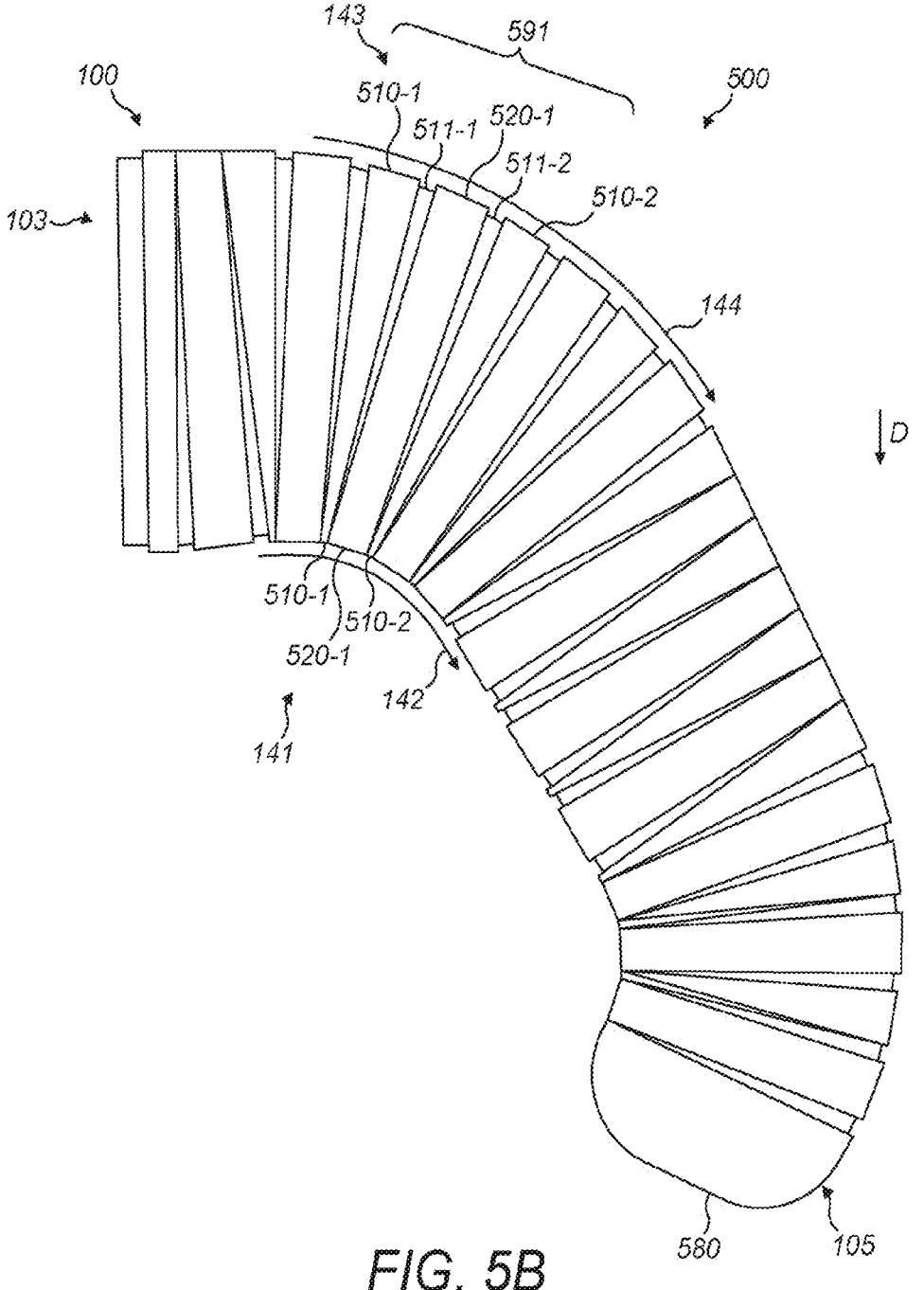
Figure 5D:
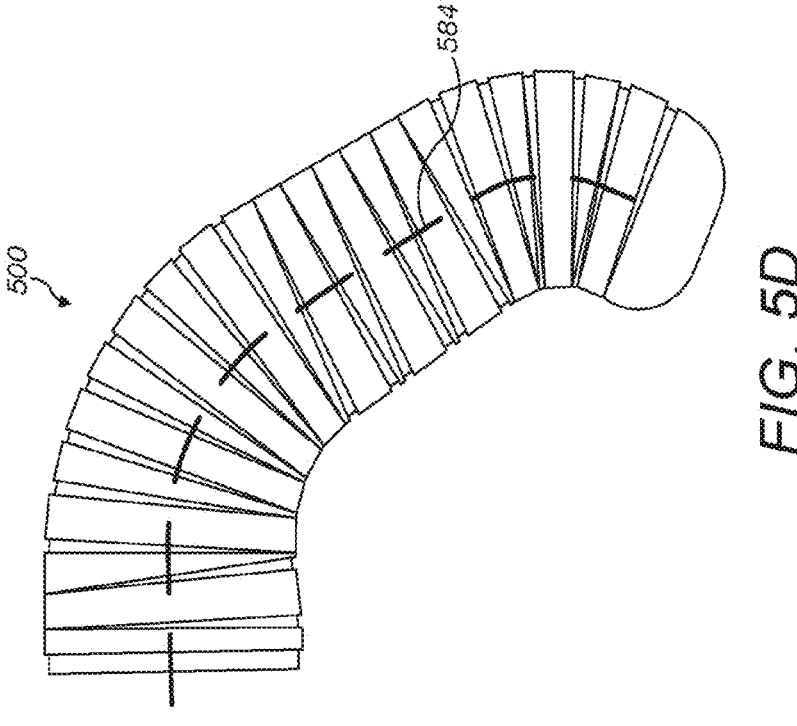
Figure 5C:
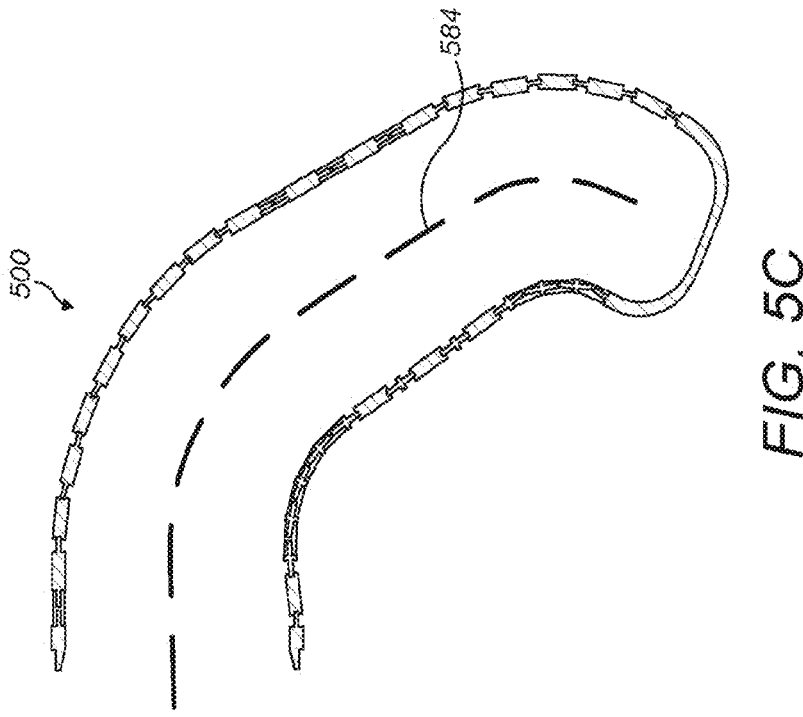

FIGS. 5A-5B illustrate a joint assembly 500 according to another embodiment of the present disclosure. FIG. 5A illustrates a cross sectional side view of the joint assembly

500 in a bent or deflected state. FIG. 5B illustrates an external side view of the joint assembly 500 in the bent state.

The joint assembly 500 substantially corresponds to the joint assembly 300. For example, the joint assembly 500 has a body 101. The body 101 is substantially tubular. The body has a first end 103 and a second end 105. The body 101 has a passage 131 that extends between the first end 103 and the second end 105. The passage 131 defines an interior volume 133 of the body 101. The body 101 is configured for articulation between the first (e.g. resting) state in which the first end 103 and the second end 105 are in the first orientation with respect to one another, and the second (e.g. bent) state in which e first end 103 and the second end 105 are in the second orientation with respect to one another. The body 101 comprises flexible bladders including the bladder 520-1, each being arranged between opposing support elements including the support elements 510-1 and 510-2. Each of the flexible bladders and the support elements are ring shaped so as to define a central aperture, the respective apertures forming part of the passage 131. The passage 131 is configured for receiving a human body part (e.g. the passage 131 defines a sleeve for a human body part). The joint assembly 500 is configured for articulation between the first and the second states upon movement of the body part. Each of the bladders have a chamber (e.g. chamber 526-1 of the bladder 520-1) that is partially filled with a fluid that can move within the chamber during articulation of the body 101 between the first and the second states. Each bladder comprises a membrane that defines the chamber, the membrane being flexible and substantially inextensible. The membrane comprises a plurality of reinforcing fibres arranged to prevent the membrane from expanding or stretching. At least some of the reinforcing fibres extend in a toroidal or circumferential direction around the bladder. At least one of the fibres is arranged to define a coil or coiled configuration around the chamber (e.g. extending in a poloidal and toroidal manner). The fluid in the chamber is a liquid, gel, paste or cream. The partially-filled chamber may be devoid of gas. The fluid may have a vapour pressure such that the fluid will not vaporise or expand when the joint assembly is placed in a vacuum. The vapour pressure of the fluid may be, in some embodiments, 10-10 to 10-7 torr at a temperature of 20 degrees Celsius. Each bladder is sealingly coupled with the opposing supports. The joint assembly 500 is configured such that when the first end 103 is moved relatively to the second end 105 to bend the joint assembly 500, each bladder is compressed by the opposing supports at an inside of the bend 141, and the bladder is decompressed at the outside of the bend 143. The body 101 contracts at an inside of the bend 141 and expands at an outside of the bend 143, via deformation of the bladders. The joint assembly 500 may maintain an interior volume of the body 101 between the first end and the second end at a substantially constant volume, via deformation of the bladders. Each support element has a circumference or perimeter. A first section of the circumference or perimeter is intended to be proximal the internal curvature (i.e. to the line 142) and a second section of the circumference or perimeter opposite the first section of the circumference or perimeter is intended to be proximal the external curvature (i.e. to the line 144). Each support is of non-uniform width in a longitudinal direction, with a width of said first section being smaller than a width of said second section. The width of the support may taper from said first section to said second section. It will be appreciated that all of the corresponding features between the joint assembly 100 and the joint assembly 500 are not repeated here for brevity.

The joint assembly 500 differs from the joint assembly 100 in that each bladder, including the bladder 510-1, may have a cross-section defining first and second recesses or recesses on opposite sides in use. As such the bladders may have a H shaped cross section in use. The bladders substantially correspond to the bladder 420 shown in FIGS. 4A-4D and described above, and their features are not repeated here for brevity.

Furthermore, the supports of the joint assembly 500 differ from that of the joint assembly 300 in that the supports of the joint assembly 500 include an edge. The support has an edge on each side of the support (i.e. each side of the rim of the support). Each edge runs around the aperture of the respective support. The thickness of the edge in the radial direction of the body 101 is less than the thickness of the chamber of the adjacent bladder in the radial direction of the body 101. This may enable the bladder to adopt a "H" cross section when the bladder is compressed by the edges of the adjacent spacers.

As shown in FIGS. 5A-5B, a section 591 of the body 101 includes the bladder 520-1 arranged between the support 510-1 and the support 510-2. The support 510-1 includes an edge 511-1. The edge 511-1 runs around the periphery of the aperture of the support 510-1. The edge 511-1 has a radial thickness that is less than the radial thickness of the bladder 520-1. The support 510-1 also includes another similar edge on the other side of the support 510-1 to interact with another bladder. The support 510-2 includes an edge 511-2. The edge 511-2 runs around the periphery of the aperture of the support 510-2. The edge 511-1 also has a radial thickness that is less than the radial thickness of the bladder 520-1. The support 510-2 also includes another similar edge on the other side of the support 510-2 to interact with another bladder. The edge 511-1 is located in a first groove of the bladder 520-1 and the edge 511-2 is located in the second groove of the bladder 520-1.

When the joint assembly 500 articulates from a resting state to a bent state, the first end 103 moves relative to the second end 105. Consequently, the support 510-1 moves relative to the support 510-2, e.g. in the direction D. In particular, the support 510-1 and the support 510-2 move from being in an orientation in which they are substantially coaxial, to an orientation where they are not coaxial. As a result, the fluid in the bladder 520-1 is displaced within the chamber 526-1. In particular, as the joint assembly 100 is bent, the edge 511-1 will attempt to move closer to the edge 511-2 at the inside of the bend 141 (i.e. proximal to the line 142). The edge 511-1 will also attempt to move further or apart from the edge 511-2 at the outside of the bend 143 (i.e. proximal to the line 144). The edges 511-1 and 511-2 therefore exert pressure on the bladder 520-1 at the inside of the bend 141. The edges 511-1 and 511-2 also relieve pressure on the bladder 520-1 at the outside of the bend 143. The bladder 520-1 is compressed by the edges 511-1 and 511-2 at the inside of the bend 141 (i.e. proximal to the line 142). The bladder 520-1 is decompressed by the edges 511-1 and 511-2, or pressure is relieved by the edges, at the outside of the bend 143 (i.e. proximal to the line 144). The fluid will therefore displace around the chamber 526-1, from the inside of the bend to the outside of the bend (i.e. from the line 142 towards the line 144). Consequently, the section 591 of the body 101 contracts at the inside of the bend 141, i.e. the distance between the edges 511-1 and 511-2 at the line 142 decreases. The section 591 of the body 101 expands or lengthens at the outside of the bend 143, i.e. the distance between the edges 511-1 and 511-2 at the line 144 increases. The section 591 of the body 101 is therefore enabled to articulate between resting and bent states. The interior volume of the section 591 between the supports 510-1 and 510-2 may also maintain a substantially constant volume as the joint assembly 500 is articulated.

The other bladders and the adjacent spacers of the joint assembly 500 may behave similarly to the section 591 described above. Therefore, the body 101 will increase in length on the outside 143 of the bend and decrease in length on the inside 141 of the bend. As such, the joint assembly 500 is enabled to articulate between resting and bent states. The entire interior volume 133 of the joint assembly 500 may maintain a substantially constant volume as the joint assembly 500 is bent.

As the joint assembly 500 moves from the resting state to the bent state, each bladder can be considered as deforming or transforming from a first deformed state to a second deformed state. The cross section of the bladder changes or deforms between the first deformed state and the second deformed state. In particular, in the resting state of the assembly 500, the bladders are in a first deformed state. In the first deformed state, each bladder may have a substantially square or rectangular cross section, e.g. as shown in FIG. 4A. The bladders may not be compressed by support elements in the first deformed state, and so the first deformed state of the bladder may correspond to a resting, passive or natural state of the bladder. In the bent state of the assembly 500, the bladders transform or deform into the second deformed state. In the second deformed state, the cross section of each bladder at the inside 141 of the bend changes to have a H shaped cross section (i.e. a square or rectangular cross section with grooves on either side). This is because the bladders are compressed by the edges of the opposing supports at the inside 141 of the bend. Furthermore, in the second deformed state, the cross section of each bladder at the outside 143 of the bend maintains a square or rectangular cross section, since pressure is relieved on the bladders at the outside 143 of the bend. The body 101 is therefore enabled to articulate between the resting and bent states.

Alternatively, each bladder may have a H shaped cross section (i.e. a square or rectangular cross section with grooves on either side) in the first deformed state as previously described above, and as shown in FIGS. 4B-4D. In the second deformed state, the bladders may have a more defined H shape cross section at the inside 141 of the bend (i.e. the grooves may deepen). Furthermore, in the second deformed state, the bladders may have a less defined H shape cross section at the outside 143 of the bend (i.e. the grooves may become more shallow). The body 101 is therefore enabled to articulate between the resting and bent states.

It will be appreciated that the joint assembly 500 may be implemented without tapered support elements. For example, each annular spacer may have substantially uniform width and the joint assembly 500 may bend in any direction from the resting position.

The joint assembly 500 can optionally include a cap 580 at the second end 105 of the body 101, which may allow the joint assembly 500 to be used as a joint for extremities of an EVA suit, such as fingers.

Figure 6A:
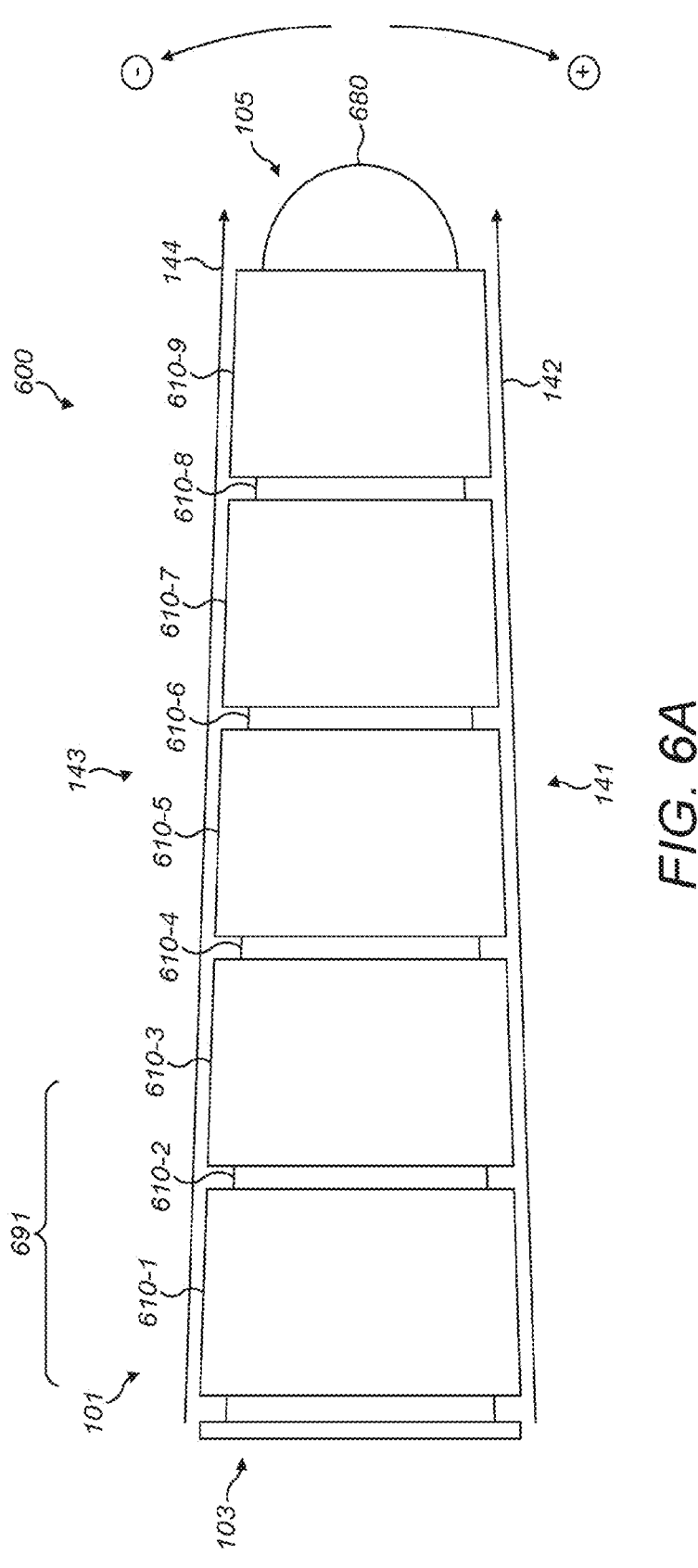
FIGS. 6A-6E show views of another joint assembly according to embodiments of the present disclosure.
Figure 6B:
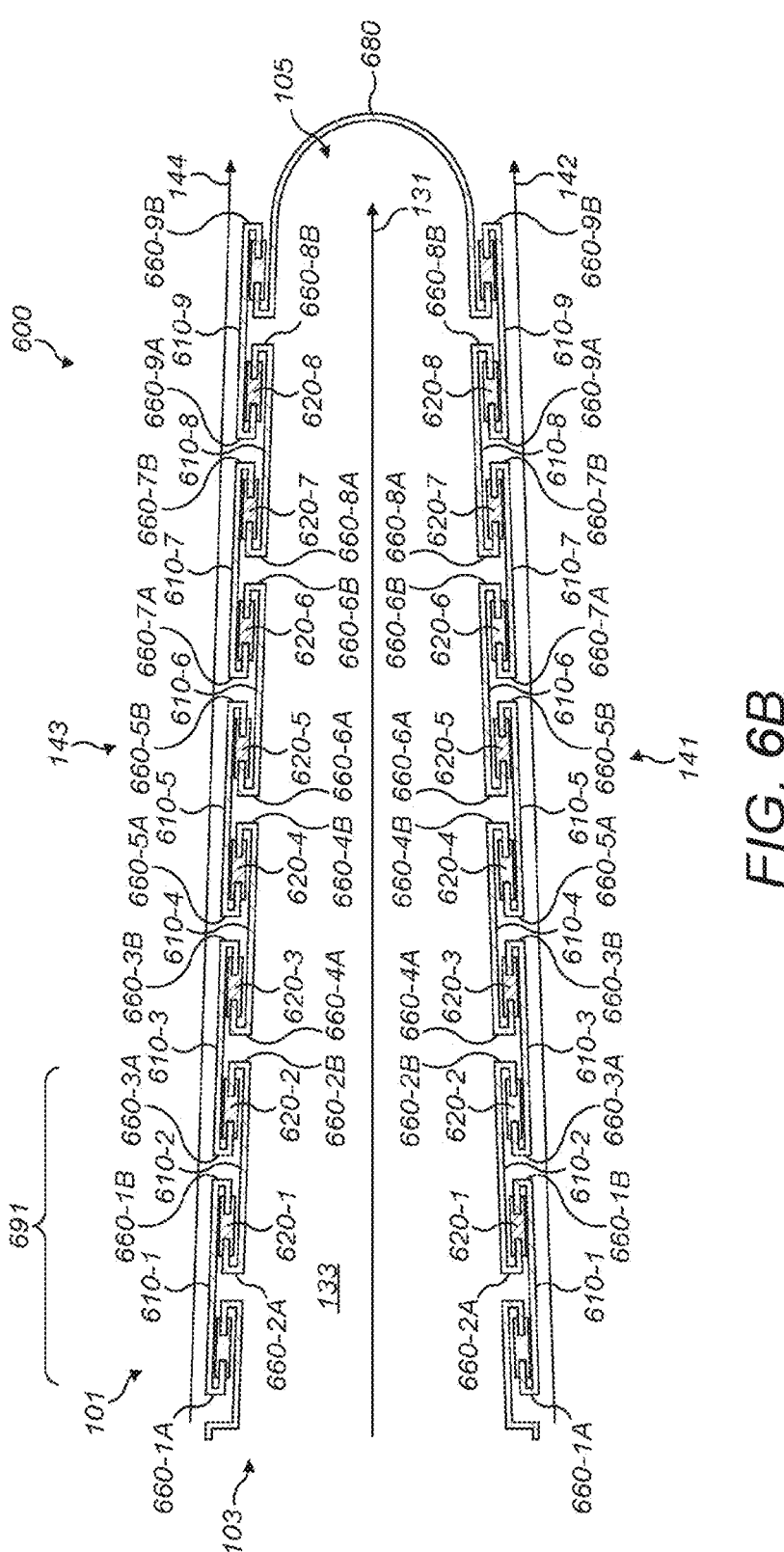
Figure 6C:
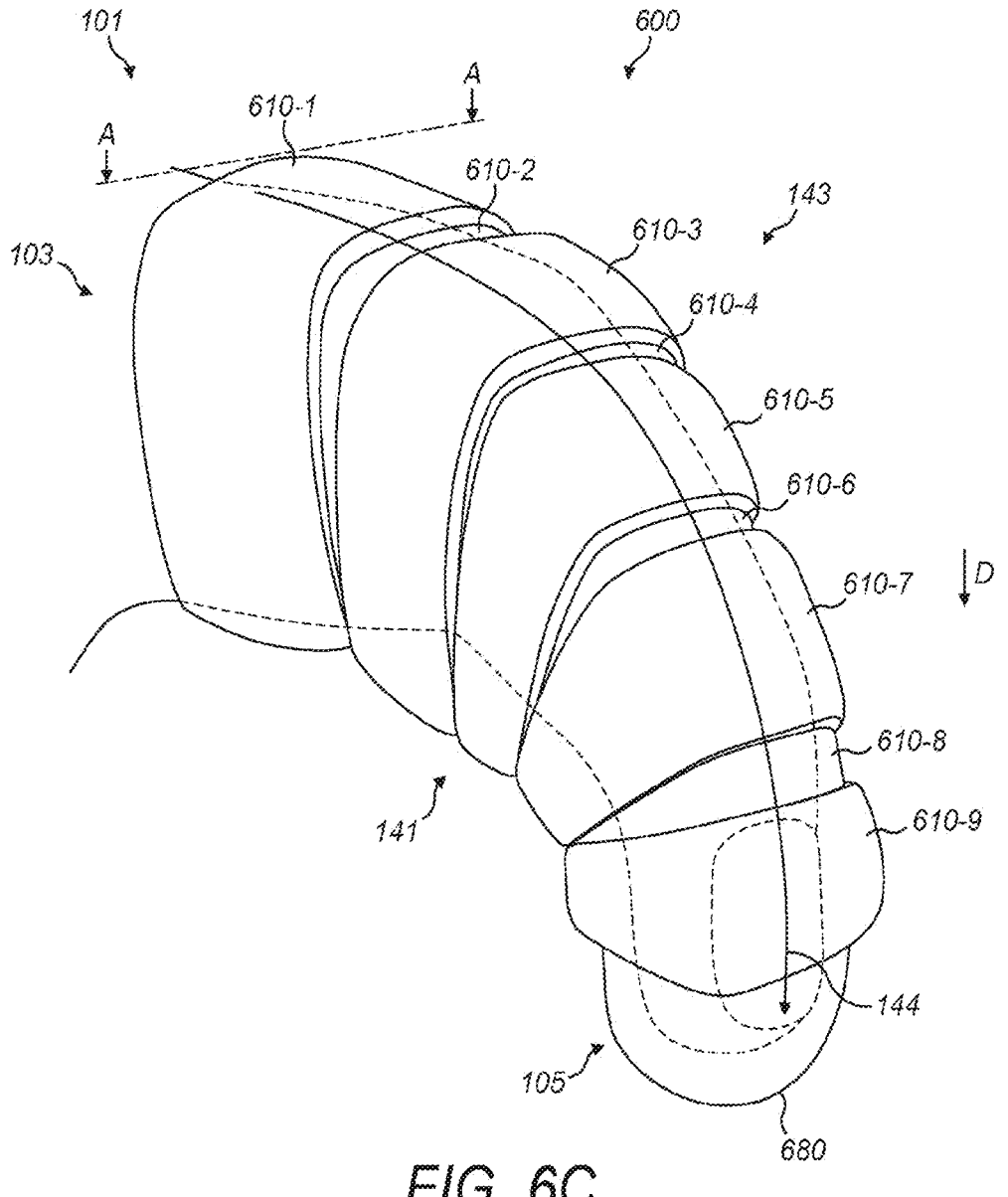
Figure 6D:
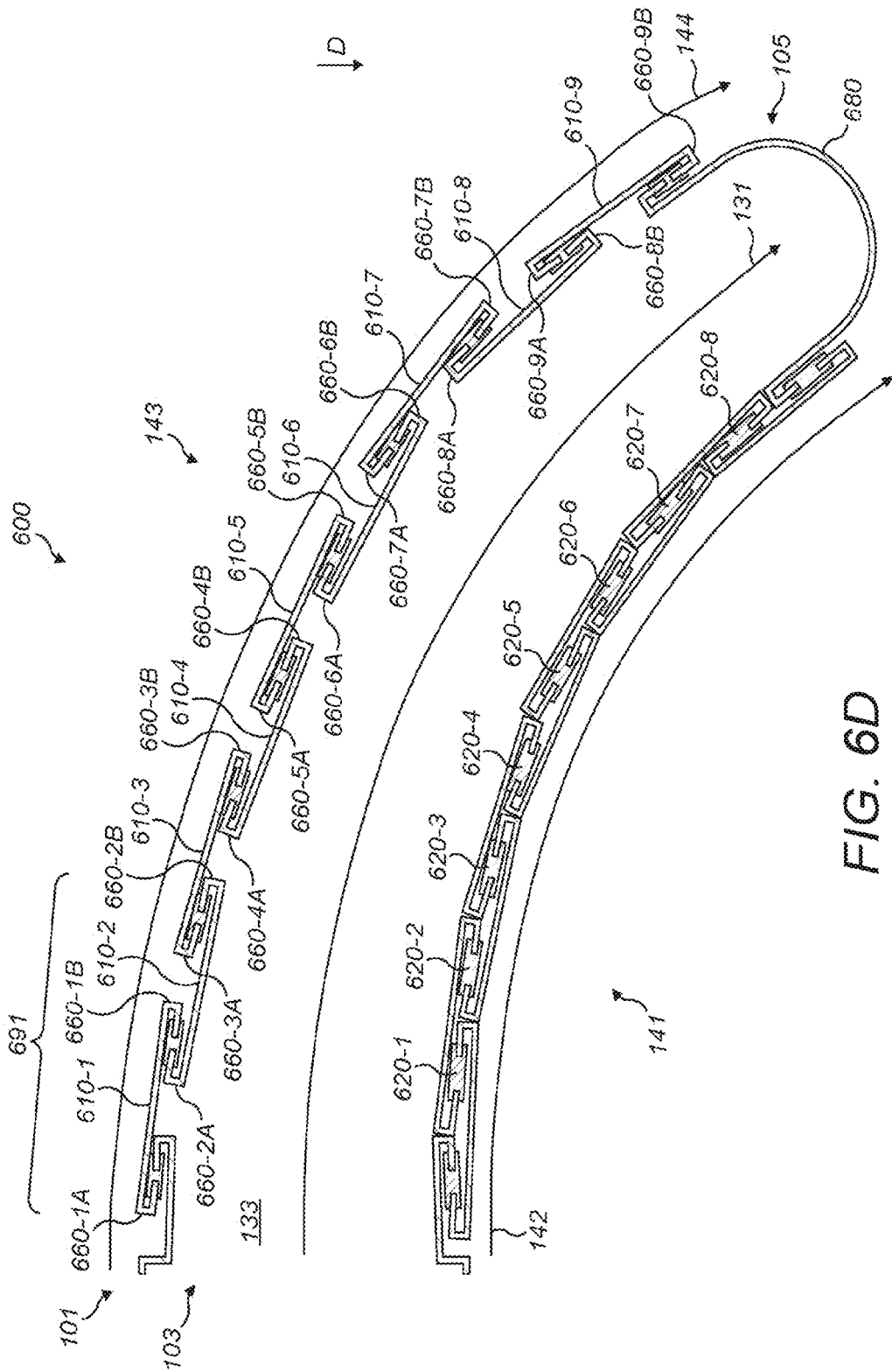
Figure 6E:
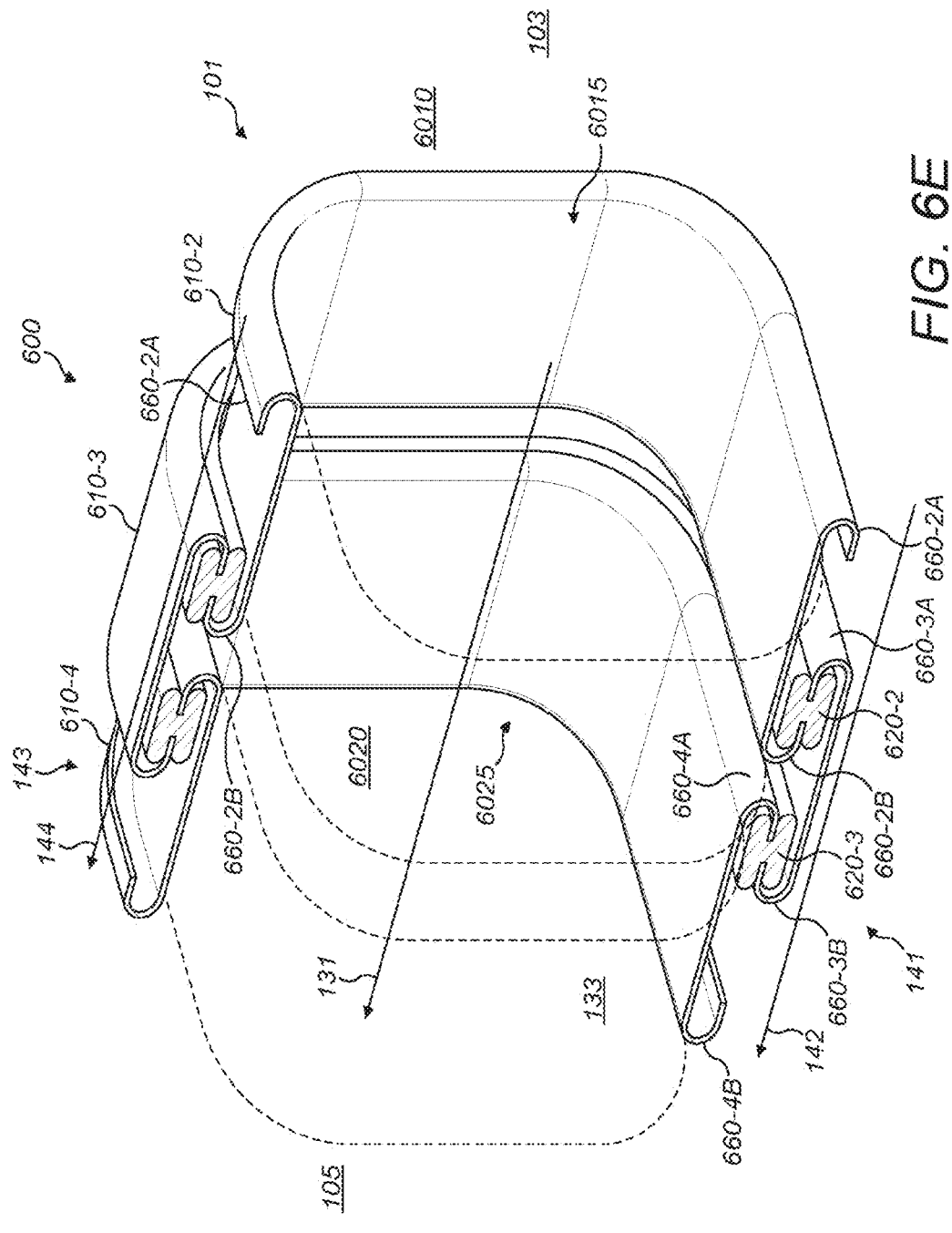

FIGS. 6A-6E illustrate a joint assembly 600 according to another embodiment of the present disclosure. FIG. 6A shows an external side view of the joint assembly 600 in a resting state (e.g. unbent, extended or straight). FIG. 6B shows a cross sectional side view of the joint assembly 600 in the resting state. FIG. 6C shows an external perspective view of the joint assembly 600 in a bent or deflected state. FIG. 6D shows a cross sectional side view of the joint assembly 600 in the bent state. FIG. 6E shows a cross sectional perspective view of part of the joint assembly 600, in the resting state.

The joint assembly 600 substantially corresponds to the joint assembly 100. For example, the joint assembly 600 has a body 101. The body 101 is substantially tubular. The body has a first end 103 and a second end 105. The body 101 has a passage 131 that extends between the first end 103 and the second end 105. The passage 131 defines an interior volume 133 of the body 101. The body 101 is configured for articulation between the first (e.g. resting) state in which the first end 103 and the second end 105 are in the first orientation with respect to one another, and the second (e.g. bent) state in which e first end 103 and the second end 105 are in the second orientation with respect to one another. The body 101 comprises flexible bladders 620-1, 620-2, 620-3, 620-4, 620-5, 620-6, 620-7, 620-8, each being arranged between opposing support elements 610-1, 610-2, 610-3, 610-4, 610-5, 610-6, 610-7, 610-8, 610-9. Each of the flexible bladders and the support elements are ring shaped so as to define a central aperture, the respective apertures forming part of the passage 131. The passage 131 is configured for receiving a human body part (e.g. the passage 131 defines a sleeve for said human body part). The joint assembly 600 is configured for articulation between the first and the second states upon movement of the body part. Each of the bladders 620-1 to 620-8 have a chamber that is partially filled with a fluid that can move within the chamber during articulation of the body 101 between the first and the second states. Each bladder comprises a membrane that defines the chamber, the membrane being flexible and substantially inextensible. The membrane comprises a plurality of reinforcing fibres arranged to prevent the membrane from expanding or stretching. At least some of the reinforcing fibres extend in a toroidal or circumferential direction around the bladder. At least one of the fibres is arranged to define a coil or coiled configuration around the chamber (e.g. extending in a poloidal and toroidal manner). The fluid in the chamber is a liquid, gel, paste or cream. The partially-filled chamber may be devoid of gas. The fluid may have a vapour pressure such that the fluid will not vaporise or expand when the joint assembly is placed in a vacuum. The vapour pressure of the fluid may be, in some embodiments, 10-10 to 10-7 torr at a temperature of 20 degrees Celsius. Each bladder is sealingly coupled with the opposing supports. The joint assembly 600 is configured such that the body 101 contracts at an inside of the bend 141 and expands at an outside of the bend 143, via deformation of the bladders. The joint assembly 600 may maintain an interior volume of the body 101 between the first end and the second end at a substantially constant volume, via deformation of the bladders. It will be appreciated that all of the corresponding features between the joint assembly 100 and the joint assembly 600 are not repeated here for brevity.

The joint assembly 600 differs from the joint assembly 100 in that first ones of the supports 610-2, 610-4, 610-6, 610-8 have first interlocking regions. Second ones of the supports 610-1, 610-3, 610-5, 610-7, 610-9 have second interlocking regions. Each bladder 620-1 to 620-8 is configured for cooperation with the first and second interlocking regions of the opposing supports, for location of the bladder between said opposing supports. Each first interlocking region can include a first lip that runs around the aperture of the support and extends over an external surface of the support. Each second interlocking region can include a second lip that runs around the aperture of the support and extends over an internal surface of the support.

The joint assembly 600 further differs in that each of the support elements 610-1 to 610-9 have a substantially tubular shape. The support elements 610-1 to 610-9 may be considered as tubular shells. Each of the support elements 610-1 to 610-9 have openings on either side, which may be considered as apertures. Each support element 610-1 to 610-9 has an interlocking region that runs around each opening or aperture. Each bladder 620-1 to 620-8 is arranged in between the interlocking regions of opposing support elements, such that the openings form part of the passage 131.

The joint assembly 600 further differs from the joint assembly 100 in that in use, each bladder has a cross-section defining first and second grooves or recesses. Each first lip is located in the first groove or recess and each second lip is located in the second groove or recess. Each bladder may have a H shaped cross section in use. The bladders 620-1 to 620-8 may substantially correspond to the bladder 420 shown in FIGS. 4A-4D and described above, and their features are not repeated here for brevity.

Figure 7A:
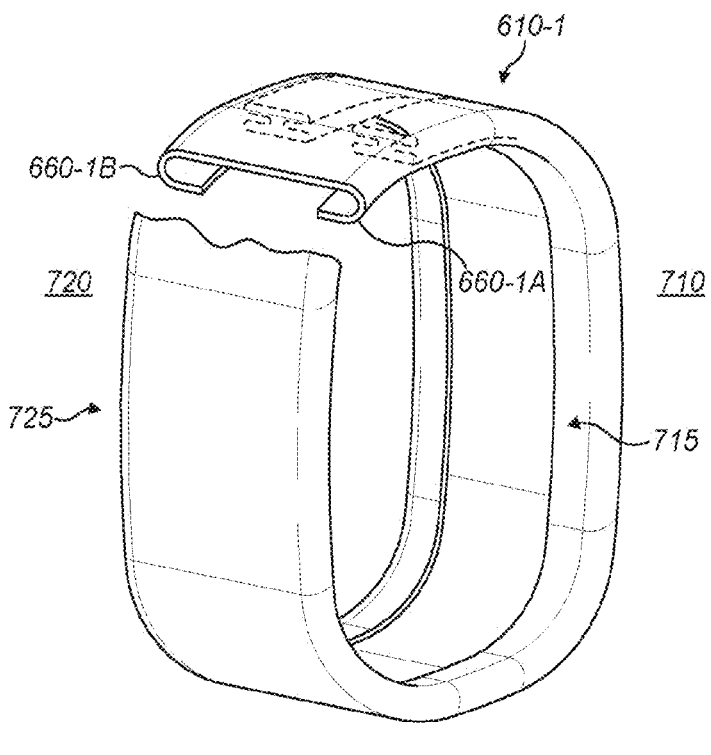
FIGS. 7A-7B show views of a support element according to embodiments of the present disclosure.
Figure 7B:
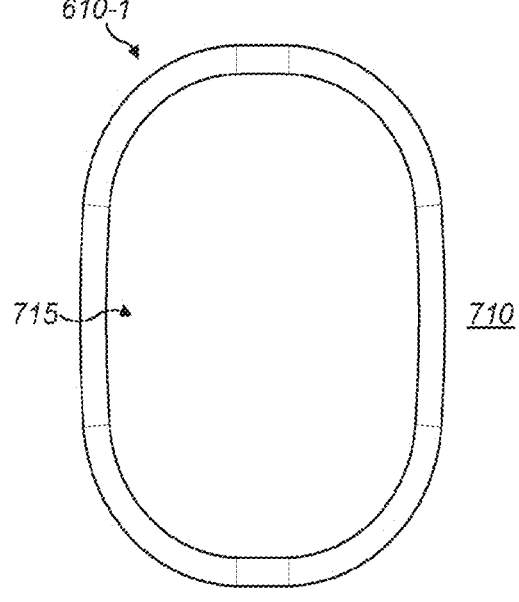

Reference is made to FIG. 6B in combination with FIG. 7A which shows a perspective view of the support element 610-1 and FIG. 7B which shows a front view of the support element 610-1. The support element 610-1 has a first side 710 and a second side 720. The support element 610-1 has a first opening 715 at the first side 710 and a second opening 725 at the second side 720. The support element 610-1 further has a lip 660-1A on the first side 710 that runs along the periphery of the first opening 715. The lip 660-1A forms an interlocking region on the first side 710/at the first opening 715. The support element 610-1 further has a lip 660-1B on the second side 720 that runs along the periphery of the second opening 725. The lip 660-1B forms another interlocking on the second side 720/at the second opening 725. The lip 660-1A extends over an internal surface of the support element 610-1, e.g. towards a central cross sectional plane of the support element 610-1. Similarly, the lip 660-1B extends over the internal surface of the support element 610-1, e.g. towards the central cross sectional plane of the support element 610-1. As such, the lip 660-1A and 660-1B extend towards one another through an interior of the support element 610-1. Preferably, the lips 660-1A and 660-1B have a thickness in a radial direction of the tubular support element 610-1 or the tubular body 101, which is less than the radial thickness of the adjacent bladder, to allow the bladder to adopt a "H" shaped cross section when compressed by the lips. The lips 660-1A and 660-1B may be considered as edges of the support 610-1.

It will be appreciated that each of the support elements 610-3, 610-5, 610-7, 610-9 may substantially correspond to the support element 610-1 described above. The support elements 610-1, 610-3, 610-5, 610-7, 610-9 need not be identical, and may differ by one or more of size, dimension, material, etc. For example as shown in FIGS. 6A and 6B, the support elements 610-1, 610-3, 610-5, 610-7, 610-9 may have a decreasing diameter from left to right. Alternatively, each of the support elements 610-1, 610-3, 610-5, 610-7, 610-9 may be identical.

Reference is made to FIG. 6B in combination with FIG. 6E. The support element 610-2 has a first side 6010 and a second side 6020. The support element 610-2 has a first opening 6015 at the first side 6010 and a second opening 6025 at the second side 6020. The support element 620-1 further has a lip 660-2A on the first side 6010 that runs along the periphery of the first opening 6015. The lip 660-2A forms an interlocking region on the first side 6010/at the first opening 6015. The support element 610-2 further has a lip 660-2B on the second side 6020 that runs along the periphery of the second opening 6025. The lip 660-2B forms another interlocking region on the second side 6020 and at the second opening 6025. The lip 660-2A extends over an external surface of the support element 610-2, e.g. towards a central cross sectional plane of the support element 610-2. Similarly, the lip 660-2B extends over the internal surface of the support element 610-2, e.g. towards the central cross sectional plane of the support element 610-2. As such, the lips 660-2A and 660-2B extend towards each other across the exterior of the support element 610-2. Preferably, the lips 660-2A and 660-2B have a thickness in a radial direction relative to the tubular support element 610-2 or the tubular body 101, that is less than the radial thickness of the adjacent bladder, to allow the bladders to adopt a "H" shaped cross section when compressed by the lips. The lips 660-2A and 660-2B may be considered as edges.

It will be appreciated that each of the support elements 610-4, 610-6, 610-8 may substantially correspond to the support element 610-2 described above. The support elements 610-2, 610-4, 610-6, 610-8 need not be identical, and may differ by one or more of size, dimension, material, etc. For example as shown in FIGS. 6A-6E, the support elements 610-2, 610-4, 610-6, 610-8 may have a decreasing diameter from left to right. Alternatively, each of the support elements 610-2, 610-4, 610-6, 610-8 may be identical. Moreover, as shown in FIG. 6B, the diameters of the support elements 610-2, 610-4, 610-6, 610-8 are generally less than the diameters of the support elements 610-1, 610-3, 610-5, 610-7, 610-9. This is so that the support elements 610-2, 610-4, 610-6, 610-8 can be received in the openings of the support elements 610-1, 610-3, 610-5, 610-7, 610-9, as shown in FIG. 6B.

With reference to FIG. 6B, each bladder 620-1 to 620-8 is arranged between the lips of adjacent support elements. Consequently, the passage extends through the openings of each of the support elements 610-1 to 610-9 and the central apertures of the bladders 620-1 to 620-8.

In particular, the first side of the support element 610-2 is received in the second opening of the support element 610-1, such that the lip 660-1B is adjacent to the lip 660-2A. The bladder 620-1 is arranged between the lips 660-1B and 660-2A. The second side of the support element 610-2 is received in the first opening of the support element 610-3, such that the lip 660-2B is adjacent to the lip 660-3A. The bladder 620-2 is arranged between the lips 660-2B and 660-3A. The first side of the support element 610-4 is received in the second opening of the support element 610-3, such that the lip 660-3B is adjacent to the lip 660-4A. The bladder 620-3 is arranged between the lips 660-3B and 660-4A. The second side of the support element 610-4 is received in the first opening of the support element 610-5, such that the lip 660-4B is adjacent to the lip 660-5A. The bladder 620-4 is arranged between the lips 660-4B and 660-5A. The first side of the support element 610-6 is received in the second opening of the support element 610-5, such that the lip 660-5B is adjacent to the lip 660-6A. The bladder 620-5 is arranged between the lips 660-5B and 660-6A. The second side of the support element 610-6 is received in the first opening of the support element 610-7, such that the lip 660-6B is adjacent to the lip 660-7A. The bladder 620-6 is arranged between the lips 660-6B and 660-7A. The first side of the support element 610-8 is received in the second opening of the support element 610-7, such that the lip 660-7B is adjacent to the lip 660-8A. The bladder 620-7 is arranged between the lips 660-7B and 660-8A. The second side of the support element 610-8 is received in the first opening of the support element 610-9, such that the lip 660-8B is adjacent to the lip 660-9A. The bladder 620-8 is arranged between the lips 660-8B and 660-9A. Each of the adjacent lips mentioned above extend towards one another. Preferably the bladders is sealingly coupled to the respective lips.

In the resting position of the joint assembly 600 shown in FIGS. 6A-6B, the bladders 620-1 to 620-8 are shown to be under compression from the support elements 610-1 to 610-9, more particularly from their lips. This is because when the joint assembly 600 is used in a pressurised system (e.g. an EVA suit) in a low pressure environment (e.g. in a vacuum), the pressure in the interior volume 133 of the assembly 600 may be greater than an external pressure, causing the support elements 610-1 to 610-9 to move apart from each other.

Reference is now made to FIGS. 6C and 6D which illustrates the joint assembly 600 in a bent position. When the joint assembly 600 articulates from a resting state to a bent state, the first end 103 moves relative to the second end 105. Reference is made to a section 691 of the body 101 which includes the supports 610-1, 610-2 and the bladder 620-1. The support element 610-1 moves relative to the support element 610-2, e.g. in the direction D, as a result of the articulation. In particular, the support 610-1 and the support 610-2 move from being in an orientation in which they are substantially coaxial, to an orientation where they are not coaxial. As a result, the fluid in the bladder 620-1 is displaced within its chamber. In particular, as the joint assembly 600 is bent, the support element 610-1 will attempt to move apart from the support element 610-2 at the outside of the bend 143 (i.e. proximal to the line 144). Therefore the lip 660-1B will attempt to move closer to the 660-2A at the outside of the bend 143. The support element 610-1 will attempt to move closer to the support element 610-2 at the inside of the bend 141 (i.e. proximal to the line 142). The lip 660-1B will therefore attempt to move apart from the lip 660-2A at the inside of the bend 141. The support elements 610-1 and 610-2, more particularly the lips 660-1B and 660-2A, exert pressure on the bladder 620-1 at the outside of the bend 143. The support elements 610-1 and 610-2 2 also relieve pressure on the bladder 620-1 at the inside of the bend 141. The bladder 620-1 will be compressed by the lips 660-1B and 660-2A at the outside of the bend 143. The bladder 620-1 will be decompressed by the lips 660-1B and 660-2A, or pressure is relieved on the bladder by the lips, at the inside of the bend 141. The fluid inside the bladder 620-1 will therefore displace around the chamber of the bladder 620-1, from the outside of the bend 143 towards the inside of the bend 141. Consequently, the distance between the lips 660-1B and 660-2A decreases at the outside of the bend 143. The distance between the lips 660-1B and 660-2A increases at the inside of the bend 141. Consequently, the section 691 of the body 101 contracts at an inside of the bend 141 and expends or lengthens at an outside of the bend 143. The section 691 of the body 101 is therefore enabled to articulate between resting and bent states. The interior volume of the section 691 between the supports 610-1 and 610-2 may also maintain a substantially constant volume as the joint assembly 600 is articulated.

The other bladders 620-2 to 620-8 and their adjacent support elements/lips may behave similarly to the bladder 620-1 and the support elements 610-1/610-2 or lips 660-1B/ 660-2A as described above. Therefore the body 101 will increase in length at the outside of the bend 143 and decrease in length on the inside of the bend 141. As such, the joint assembly 600 is enabled to articulate between resting and bent states. The entire interior volume 133 of the joint assembly 600 may maintain a substantially constant volume as the joint assembly 600 is bent.

As the joint assembly 600 moves from the resting state to the bent state, each bladder can be considered as deforming or transforming from a first deformed state to a second deformed state. The cross section of the bladder changes or deforms between the first deformed state and the second deformed state. In particular, in the resting state of the assembly 600 shown in FIGS. 6A-6B, the bladders are in a first deformed state. In the first deformed state, each bladder may have a H shaped cross section (i.e. a square or rectangular cross section with grooves on either side) e.g. as also shown in FIGS. 4B-4D. This may be because the opposing supports (in particular their lips) exert pressure on the bladders in the resting state. For example, when the inner volume 133 is pressurised, the supports may move apart from one another and their lips may exert pressure on the bladders. In the bent state of the assembly 600 as shown in FIGS. 6C-6D, the bladders deform into the second deformed state. In the second deformed state, the bladders may have a more defined H shape cross section at the outside 143 of the bend (i.e. the grooves may deepen). This is because the lips of the opposing supports exert additional pressure on the bladders at the outside 143 of the bend. Furthermore, in the second deformed state, the bladders may have a less defined H shape cross section at the inside 141 of the bend (i.e. the grooves may become more shallow). This is because the lips of the opposing supports relieve pressure on the bladders at the inside 141 of the bend. The body 101 is therefore enabled to articulate between the resting and bent states.

The joint assembly 600 illustrates support elements with interlocking regions in the form of lips around the periphery of the openings. However it will be appreciated that other forms of interlocking regions are possible.

It will be appreciated that the joint assembly 600 is shown as being deflected or bent in the direction D for illustrative purposes only, and that the joint assembly 600 may deflect in any direction from the rest position.

The joint assembly 600 can optionally include a cap 680 at the second end 105 of the body 101, which may allow the joint assembly 600 to be used as a joint for extremities of an EVA suit, such as fingers.

It will be understood that when the joint assembly 600 of FIGS. 6A-6E is used in a pressurised EVA suit, the first and second interlocking regions of the respective supports 610-1 to 610-9 will be urged towards each other by pressure inside the joint assembly 600. This provides a failsafe arrangement in the event of a tear in one or more of the bladders 620-1 to 620-8. In particular, if one of the bladders 620-1 to 620-8 becomes torn then it will not be able to contain the fluid inside. The first and second interlocking regions of the respective supports 610-1 to 610-9 will therefore be urged closer together and this inhibits de-pressurisation of the EVA suit. In such a situation, the torn bladder 620-1 to 620-8 will act as a conformable seal between the first and second interlocking regions of the respective supports 610-1 to 610-9, which further inhibits de-pressurisation of the EVA suit.

Figure 8A:
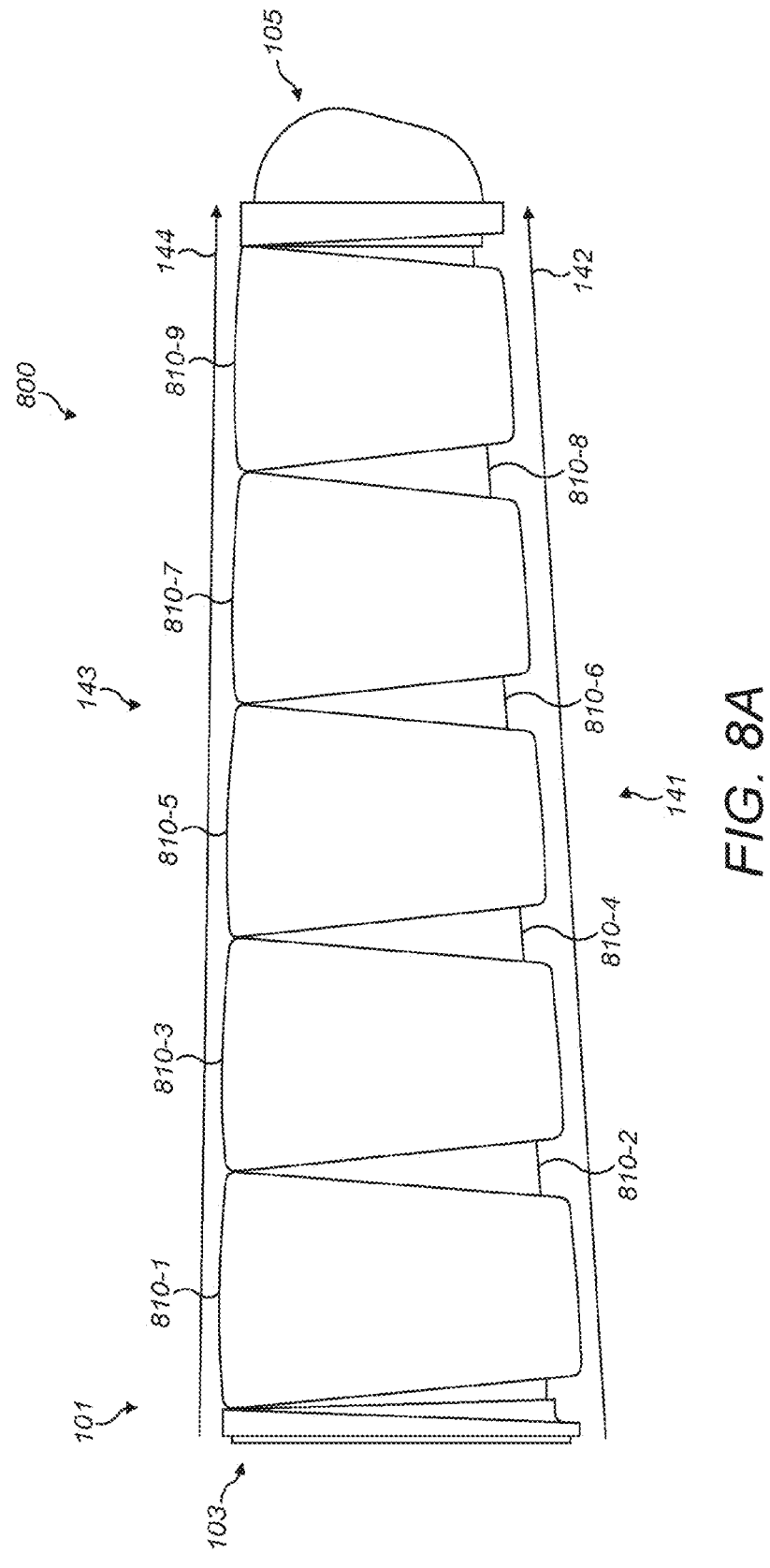
FIGS. 8A-8F show views of another joint assembly according to embodiments of the present disclosure.
Figure 8B:
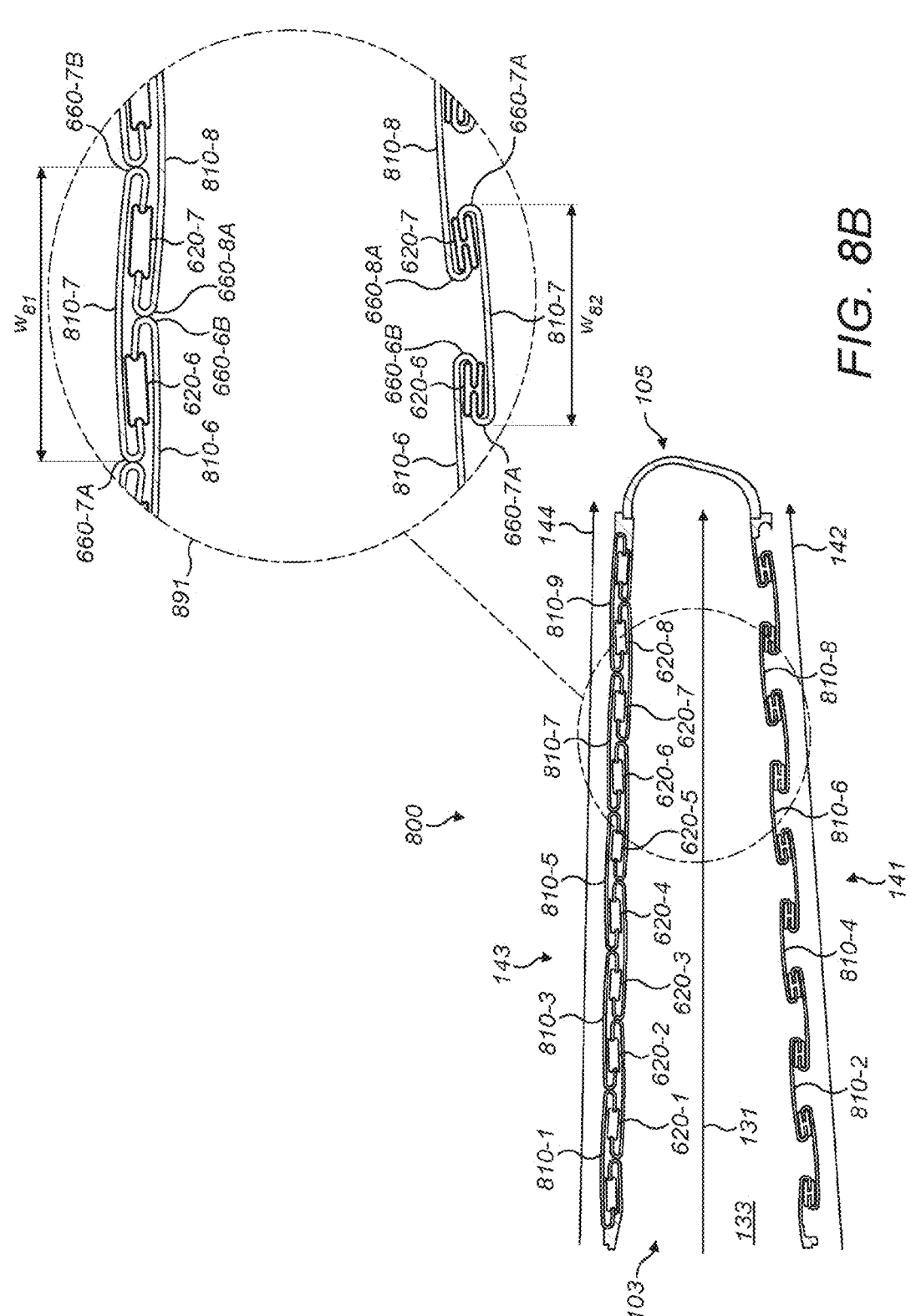
Figure 8C:
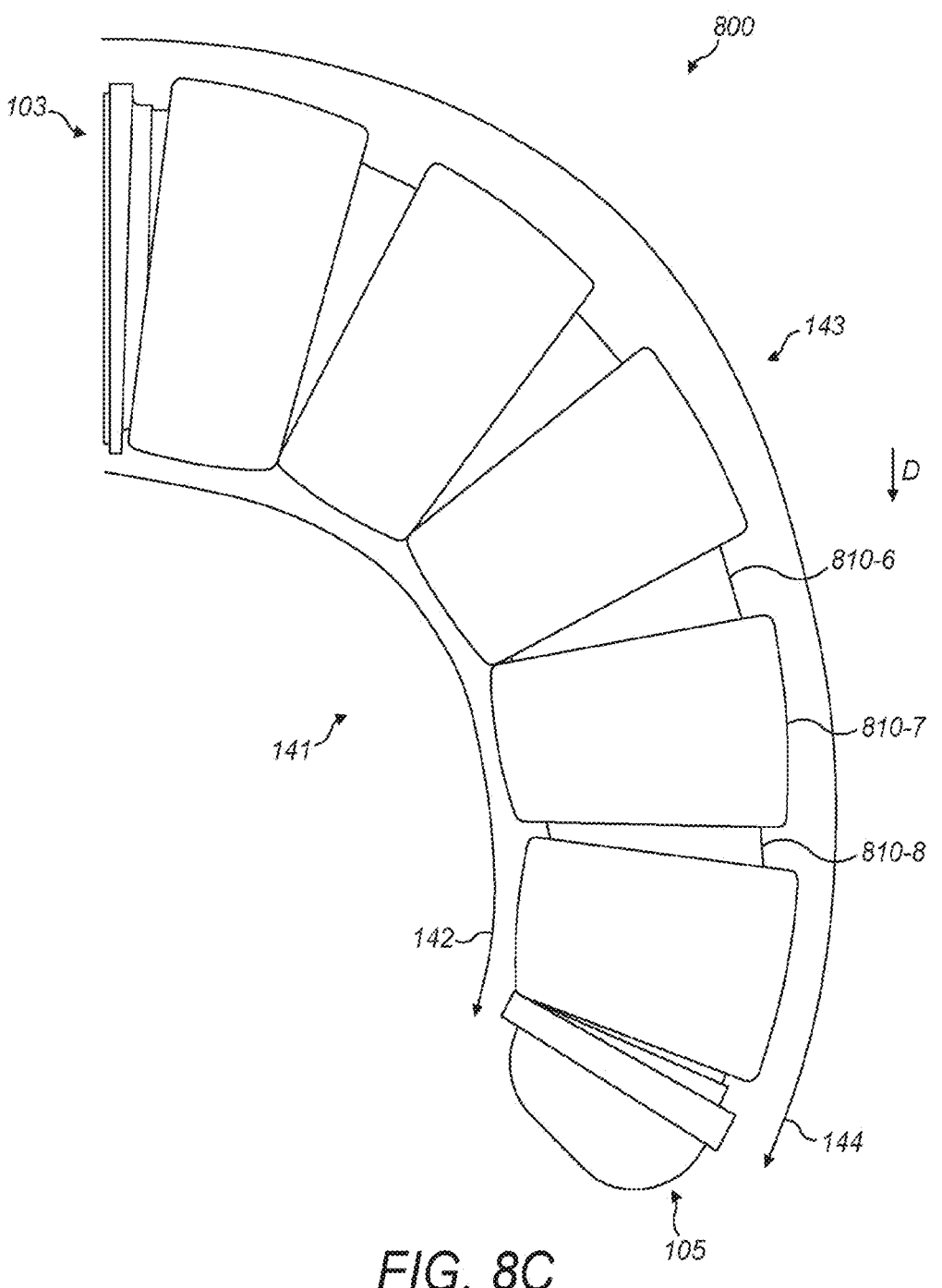
Figure 8D:
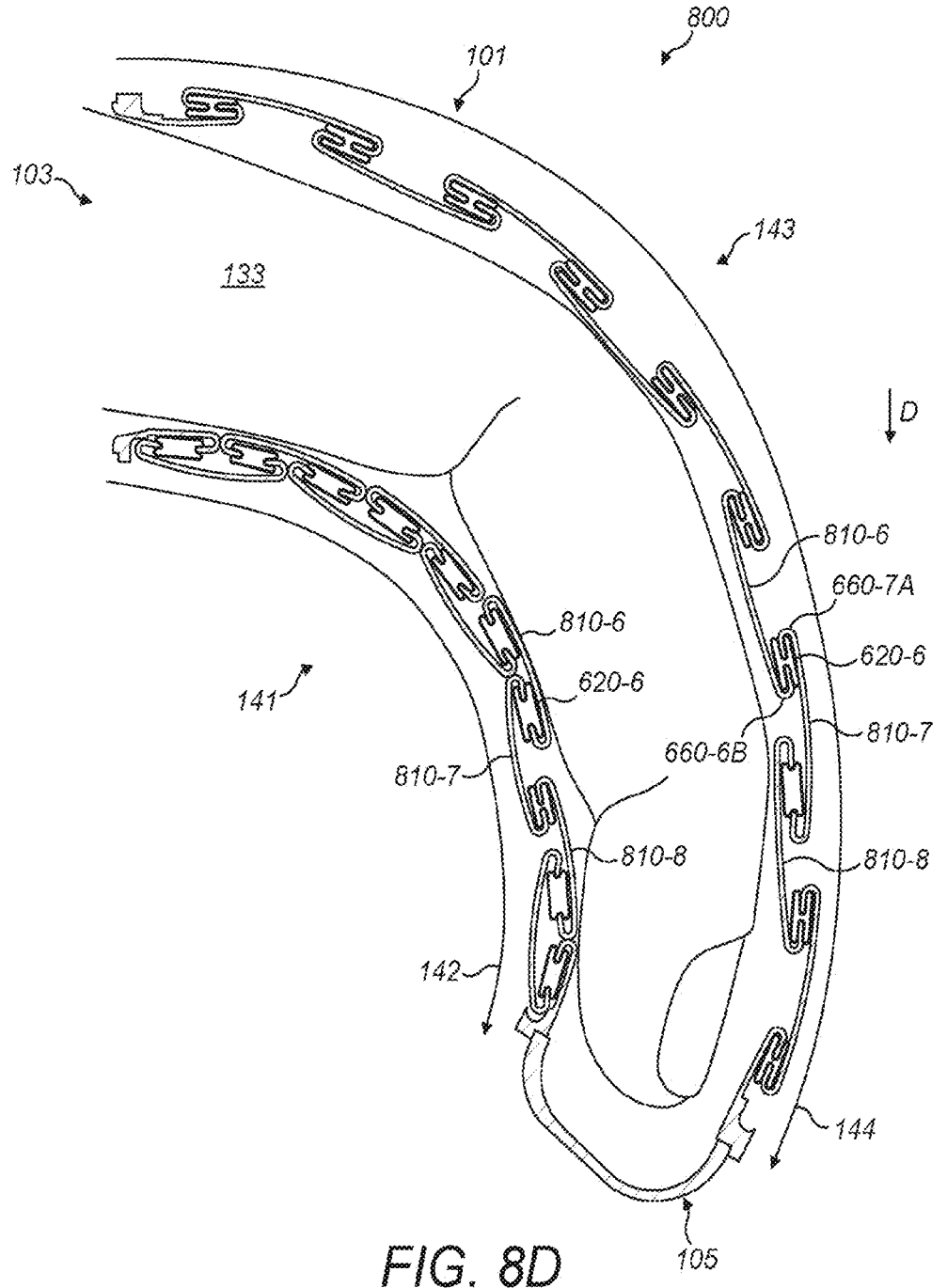

FIGS. 8A-8D illustrate a joint assembly 800 according to another embodiment of the present disclosure. FIG. 8A shows an external side view of the joint assembly 800 in a resting state (e.g. unbent, extended or straight). FIG. 8B shows a cross sectional side view of the joint assembly 600 in the resting state. FIG. 8C shows an external side view of the joint assembly 800 in a bent or deflected state. FIG. 8D shows a cross sectional side view of the joint assembly 800 in the bent state.

The joint assembly 800 substantially corresponds to the joint assembly 600. For example, the joint assembly 800 has a body 101. The body 101 is substantially tubular. The body has a first end 103 and a second end 105. The body 101 has a passage 131 that extends between the first end 103 and the second end 105. The passage 131 defines an interior volume 133 of the body 101. The body 101 is configured for articulation between the first (e.g. resting) state in which the first end 103 and the second end 105 are in the first orientation with respect to one another, and the second (e.g. bent) state in which e first end 103 and the second end 105 are in the second orientation with respect to one another. The body 101 comprises flexible bladders 820-1, 820-2, 820-3, 820-4, 820-5, 820-6, 820-7, 820-8, each being arranged between opposing support elements 810-1, 810-2, 810-3, 810-4, 810-5, 810-6, 810-7, 810-8, 810-9. Each of the flexible bladders and the support elements are ring shaped so as to define a central aperture, the respective apertures forming part of the passage 131. The passage 131 is configured for receiving a human body part (e.g. the passage 131 defines a sleeve for said human body part). The joint assembly 800 is configured for articulation between the first and the second states upon movement of the body part. Each of the bladders 820-1 to 820-8 have a chamber that is partially filled with a fluid that can move within the chamber during articulation of the body 101 between the first and the second states. Each bladder comprises a membrane that defines the chamber, the membrane being flexible and substantially inextensible. The membrane comprises a plurality of reinforcing fibres arranged to prevent the membrane from expanding or stretching. At least some of the reinforcing fibres extend in a toroidal or circumferential direction around the bladder. At least one of the fibres is arranged to define a coil or coiled configuration around the chamber (e.g. extending in a poloidal and toroidal manner). The fluid in the chamber is a liquid, gel, paste or cream. The partially-filled chamber may be devoid of gas. The fluid may have a vapour pressure such that the fluid will not vaporise or expand when the joint assembly is placed in a vacuum. The vapour pressure of the fluid may be, in some embodiments, 10-10 to 10-7 torr at a temperature of 20 degrees Celsius. Each bladder is sealingly coupled with the opposing supports. For each bladder, a first one of the opposing supports has a first interlocking region and a second one of the opposing supports has a second interlocking region. The bladder is configured for cooperation with said first and second interlocking regions, for location of the bladder between the first and second supports. The first interlocking region is a first lip that runs around the aperture of the first support and extends over an external surface of the first support. The second interlocking region is a second lip that runs around the aperture of the second support and extends over an internal surface of the second support. Each bladder has a cross-section defining first and second grooves or recesses. The first lip is located in said first groove or recess and said second lip is located in said second groove or recess in use. Each bladder has a H shaped cross section in use. The joint assembly 800 is configured such that the body 101 contracts at an inside of the bend 141 and expands at an outside of the bend 143, via deformation of the bladders. The joint assembly 800 may maintain an interior volume of the body 101 between the first end and the second end at a substantially constant volume, via deformation of the bladders. It will be appreciated that all of the corresponding features between the joint assembly 600 and the joint assembly 800 are not repeated here for brevity.

The support elements 810-1 to 810-9 substantially correspond to the support elements 610-1 to 610-9. For example, the support elements 810-1 to 810-9 have a substantially tubular shape (e.g. tubular shells). Each of the support elements 810-1 to 810-9 have openings on either side. Each support element 810-1 to 810-9 has an interlocking region located around the periphery each opening, in the form of lips as described above. Each bladder 620-1 to 620-8 is arranged in between the interlocking regions of adjacent support elements, such that the passage 131 extends through the openings of the support elements and the central apertures of the bladders. It will be appreciated that all corresponding features are not repeated here for brevity.

The support elements 810-1 to 810-9 differ from the support elements 610-1 to 610-9 in that the support elements 810-1 to 810-9 have a non-uniform width. Similarly to the supports of the assembly 300, each support 810-1 to 810-9 has a circumference or perimeter. A first section of the support is proximal to the line 142 (i.e. proximal to the inside of the bend 141 or the internal curvature of the body 101 in the bent state). A second section of the support is proximal to the line 144 (i.e. proximal to the outside of the bend 143 or the external curvature of the body 101 in the bent state). Each support element 810-1 to 810-9 has a width in a longitudinal direction of the body 101 (i.e. in the direction of the passage 131). The width of each support is non-uniform. In particular, the second section has a width that is greater than a width of the second section. The width may taper from the width at the second section to the width at the first section of the support.

As shown in FIGS. 8A-8B, a section 891 of the body 101 includes the support elements 810-6, 810-7 and the bladder 620-6. As shown, the support 810-7 has a greater width W81 proximal to the line 144 and a relatively smaller width W82 proximal to the line 142. The widths of the supports may taper from the line 144 to the line 142. The support 810-6 may also have similar widths to the support 810-7. Consequently, the distance between the lips 660-7A and 660-6B proximal to the line 144 is greater than the distance between the lips 660-7A and 660-6B proximal to the line 141. In the resting state, the bladder 620-6 is relatively more expanded proximal to the line 144 and the bladder 620-6 is relatively more compressed proximal to the line 142. As such, in the joint assembly 800, the bladder 620-6 is biased in the resting state, since the bladder experiences different levels of compression between the lines 144 and 142. Meanwhile, in the joint assembly 600, the bladders may be considered neutral in the resting state, since the bladders experience a consistent level of compression between the lines 144 and 142 in the resting state.

With reference to the section 891 of the assembly 800, when the joint assembly 800 is bent, the bladder 620-6 will be compressed by the lips 660-7A and 660-6B at the outside of the bend 143. The bladder 620-1 will be decompressed by the lips 660-7A and 660-6B, or pressure is relieved on the bladder by the lips, at the inside of the bend 141. The fluid inside the bladder 620-6 will therefore displace around the chamber of the bladder 620-6, from the outside of the bend 143 towards the inside of the bend 141. Consequently, the distance between the lips 660-7A and 660-6B decreases at the outside of the bend 143. The distance between the lips 660-7A and 660-6B increases at the inside of the bend 141. Consequently, the section 891 of the body 101 contracts at an inside of the bend 141 and expends or lengthens at an outside of the bend 143. The section 891 of the body 101 is therefore enabled to articulate between resting and bent states. The interior volume of the section 891 between the supports 810-6 and 810-7 may also maintain a substantially constant volume as the joint assembly 600 is articulated.

Due to the tapered widths of the support elements 810-6 and 810-7, there is a greater amount of fluid in the bladder 620-6 proximal to the line 144 in the resting state. Furthermore, the lips 660-7A and 660-6B start off at a relatively greater distance apart at the line 144, and a relatively smaller distance apart at the line 142, in the resting state. This allows the support elements 810-6 and 810-7 to be deflected from one another by a greater degree, thereby allowing for a greater degree of bending or deflection between the support elements 810-6 and 810-7.

The other bladders and adjacent support elements of the joint assembly 800 may behave similarly to the section 891 described above. Therefore, the joint assembly 800 can achieve a greater degree of bending in comparison to the joint assembly 600. Moreover, the joint assembly 800 may only bend in the direction of the tapering, e.g. in the "down" direction D in FIGS. 8C-8D, which can be useful in some applications. For example, this can be useful for implementing joints of an EVA suit that naturally will only bend in one direction, such as finger joints.

In some examples, the support elements 810-1 to 810-9 have the same widths w81 and w82 and therefore the same level of tapering. However, it will be appreciated that the support elements 810-1 to 810-9 may have different widths and differential levels of tapering. As such, the support elements 810-1 to 810-9 need not be identical.

It will be understood that when the joint assembly 800 of FIGS. 8A-8D is used in a pressurised EVA suit, the first and second interlocking regions of the respective supports 810-1 to 810-9 will be urged towards each other by pressure inside the joint assembly 800. This provides a failsafe arrangement in the event of a tear in one or more of the bladders 820-1 to 820-8. In particular, if one of the bladders 820-1 to 820-8 becomes torn then it will not be able to contain the fluid inside. The first and second interlocking regions of the respective supports 810-1 to 810-9 will therefore be urged closer together and this inhibits de-pressurisation of the EVA suit. In such a situation, the torn bladder 820-1 to 820-8 will act as a conformable seal between the first and second interlocking regions of the respective supports 810-1 to 810-9, which further inhibits de-pressurisation of the EVA suit.

Figure 8E:
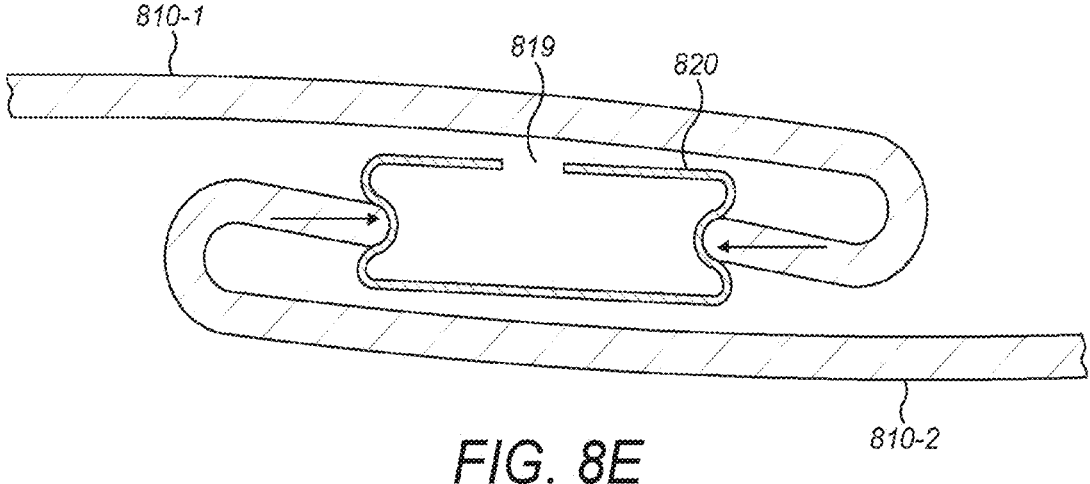
Figure 8F:
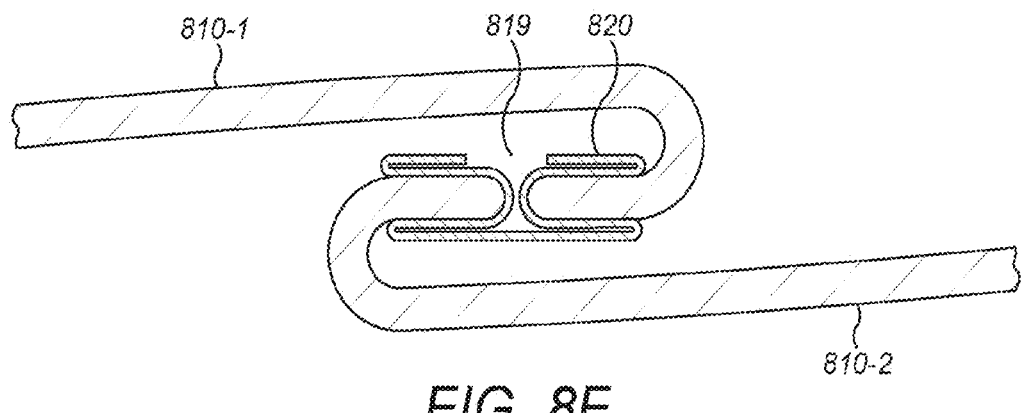

Such a failsafe arrangement is illustrated in more detail in FIGS. 8E-8F. In particular, FIG. 8E shows first and second interlocking supports 810-1 and 810-2 engaging a bladder 820. A tear 819 is illustrated in the bladder 820. Once the bladder 820 is torn, the supports 810-1 to 810-2 are urged closer together by the internal pressure inside the joint assembly 800. In other words, the first and second supports 810-1 and 810-2 move towards each other in the direction of the arrows from the position shown in FIG. 8E to the position shown in FIG. 8F. As the first and second supports 810-1, 810-2 move towards each other, the torn bladder 820 is clamped between them. In this way, the torn bladder 820 acts as a conformable seal and the joint assembly 800 is not de-pressurised.

Figure 16A:
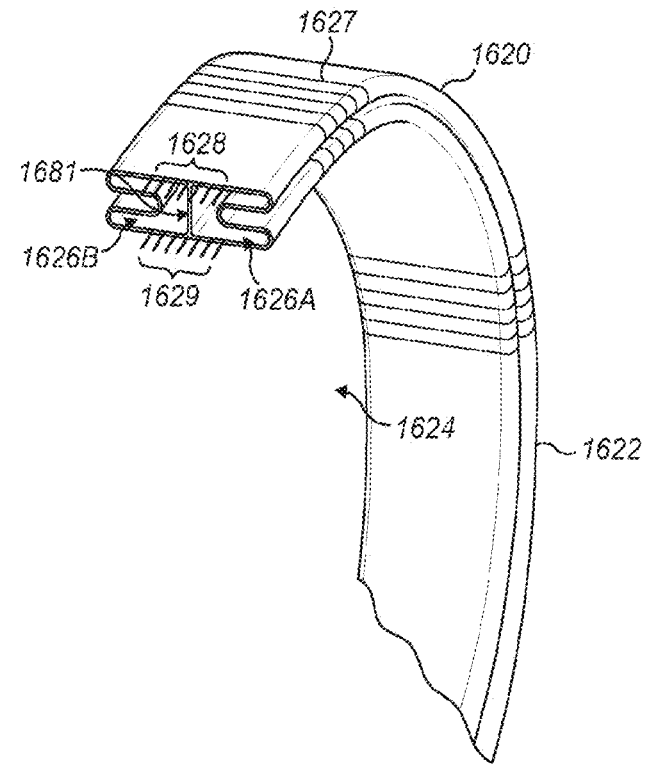
FIGS. 16A-16B show views of another ring-shaped or torus bladder according to embodiments of the present disclosure.
Figure 16B:
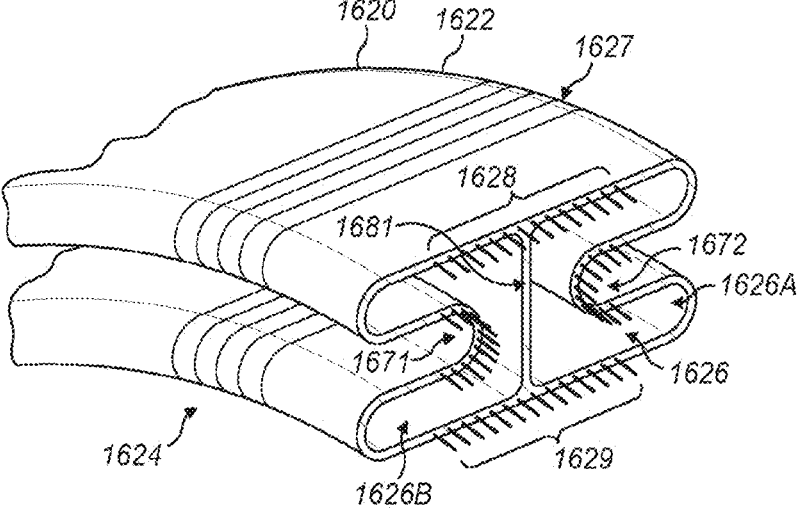

FIGS. 16A-16B illustrate cross sectional views of a bladder 1620 according to another embodiment of the present disclosure. Previously described features are given the same reference numerals with the prefix "16".

The bladder 1620 differs from the previously described bladder(s) in that an annular septum 1681 is arranged within the bladder 1620 to separate an interior of the bladder 1620 into first and second chambers 1626A, 1626B. Each of the first and second chambers 1626A and 1626B is devoid of gas and partially filled with a non-gaseous fluid which moves within the respective chamber during articulation of the tubular body from said first state to said second state.

The annular septum 1681 extends from opposing inner surfaces of the bladder 1620, around the bladder 1620, so that the first and second chambers 1626A, 1626B run in parallel around the bladder 1620.

The annular septum 1681 helps to control deformation of the bladder 1620.

Figure 17A:
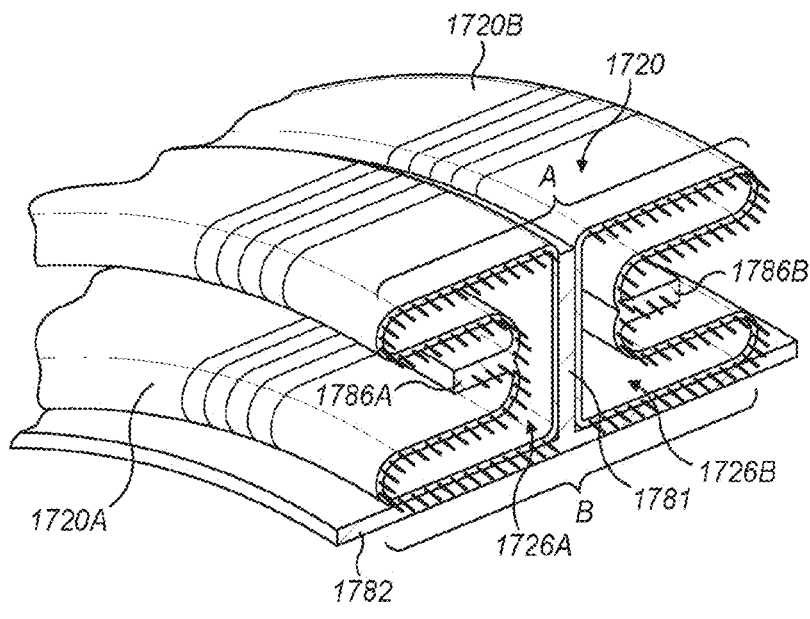
FIGS. 17A-17B show views of a ring-shaped or torus bladder arrangement according to embodiments of the present disclosure.
Figure 17B:
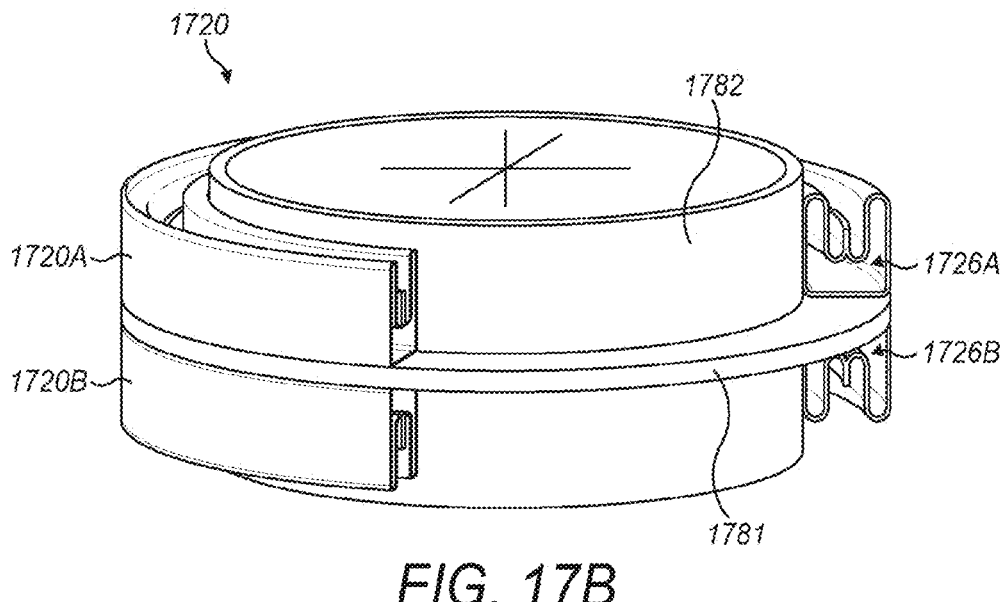

FIGS. 17A-17B illustrate cross sectional and partial-sectional views of a flexible bladder arrangement 1720 according to another embodiment of the present disclosure. Previously described features are given the same reference numerals with the prefix "17".

The bladder arrangement 1720 has a first bladder 1720A which defines a first chamber 1726A and a second bladder 1720B which defines a second chamber 1726B. Each of the first and second chambers 1726A and 1726B is devoid of gas and partially filled with a non-gaseous fluid which moves within the respective chamber during articulation of the tubular body from said first state to said second state.

In the embodiment of FIGS. 17A-17B, an annular septum 1781 is arranged between the first and second bladders 1720A, 1720B. In the illustrated embodiment, the annular septum 1781 is a separate element (e.g. separable and not integrally coupled with the first and second bladders 1720A, 1720B).

It will be understood that the bladder arrangement 1720 of FIGS. 17A-17B could be used instead of any of the bladder(s) of the previous embodiments. For example, in the embodiments of FIGS. 5B to 8D, any of the individual bladders could be replaced by bladder arrangement 1720 (i.e. by the first and second bladders 1720A, 1720B and septum 1781). In other words, the bladder arrangement 1720 is configured for locating between opposing supports with a first support engaging the first bladder 1720A and a second opposing support engaging the second bladder 1720B, in order to form a joint assembly.

In the embodiment of FIGS. 17A-17B, an annular brace 1782 is arranged radially inside the flexible bladder arrangement 1720 to limit inward radial deformation of the flexible bladder arrangement 1720. In the illustrated embodiment, the annular septum 1781 and annular brace 1782 are integrally coupled (e.g. formed as a single piece or fixedly connected directly to each other). A similar annular brace 1782 may be provided in other embodiments which do not have an annular septum, or in embodiments which have a single bladder between each pair of opposing supports instead of a bladder arrangement 1720 with first and second bladders 1720A, 1720B. In other words, it will be understood that the annular brace 1782 is not inherently linked to the annular septum 1781 and double bladder features of FIGS. 17A-17B.

In the embodiment of FIGS. 17A-17B, each of the first and second bladders 1720A, 1720B has an annular joint line 1786A, 1786B. The annular joint lines 1786A, 1786B are formed during manufacture of the bladders. In particular, the bladders are initially formed as an annular curved sheet of material (e.g. by dipping a mandrel in a liquid solution and solidifying the liquid solution over an end of the mandrel). This curved sheet of material is then "closed" by joining edges of the sheet together, which forms the corresponding joint line 1786A, 1786B.

In some embodiments where an annular septum is provided (e.g. an "internal" annular septum 1681 as in FIGS.

16A-16B, or an "external" annular septum 1781 as in FIGS. 17A-17B), the annular septum may have a circumference or perimeter with a first section intended to be proximal an internal curvature of the respective joint assembly and a second section opposite the first section intended to be proximal an external curvature of the respective joint assembly. The annular septum may be of non-uniform width in a longitudinal direction, with a width of said first section being smaller than a width of said second section. For example, the width of the annular septum may taper from said first section to said second section.

Figure 18:
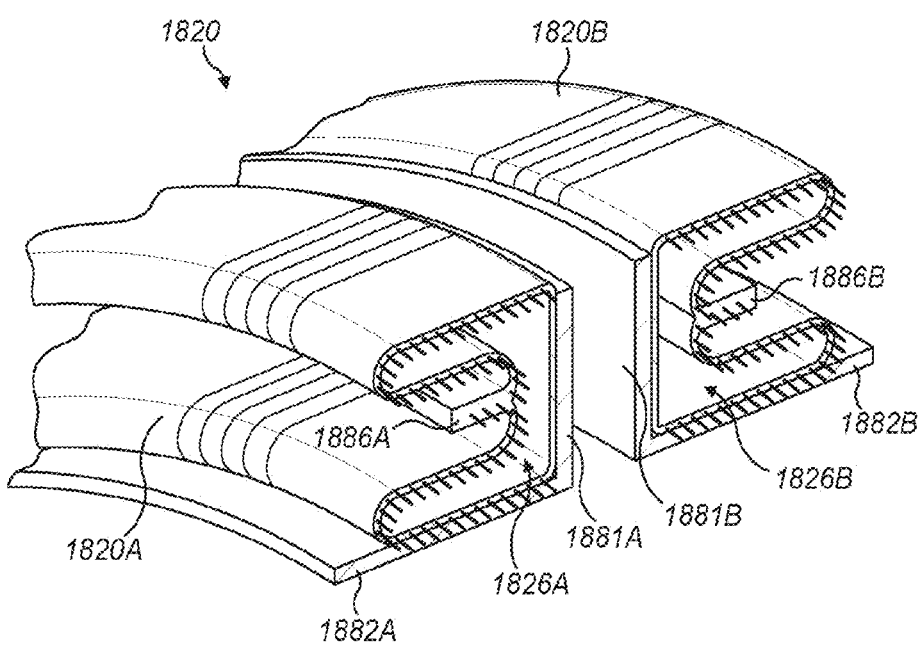
FIG. 18 shows a view of a ring-shaped or torus bladder arrangement according to embodiments of the present disclosure.

FIG. 18 illustrates a cross sectional view of a flexible bladder arrangement 1820 according to another embodiment of the present disclosure. Previously described features are given the same reference numerals with the prefix "18".

The bladder arrangement 1820 of FIG. 18 is similar to the bladder arrangement 1720 of FIGS. 17A-17B. In particular, the bladder arrangement 1820 has first and second bladders 1820A, 1820B defining first and second chambers 1826A, 1826B respectively. Each of the first and second chambers 1826A and 1826B is devoid of gas and partially filled with a non-gaseous fluid which moves within the respective chamber during articulation of the tubular body from said first state to said second state.

In the embodiment of FIG. 18, the annular septum arranged between the first and second bladders 1820A, 1820B is split into a first septum portion 1881A and a second septum portion 1881B. The first and second septum portions 1881A, 1881B are separate elements which are spaced apart. The first septum portion 1881A is arranged adjacent the first bladder 1820A, and the second septum portion 1881B is arranged adjacent the second bladder 1820B. Such an arrangement facilitates altering the separation between the first and second bladders 1820A, 1820B around their circumference (e.g. by altering the spacing between the first and second septum portions 1881A, 1881B), which may help to bias the associated joint assembly to bend in a predetermined direction.

Figure 20A:
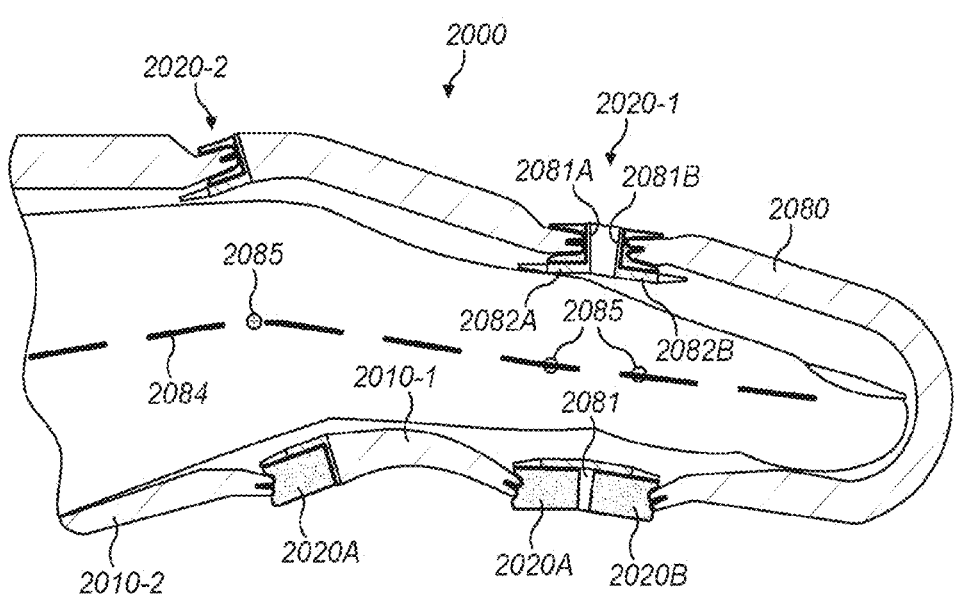
FIGS. 20A-20D show views of a joint assembly according to embodiments of the present disclosure.

In some embodiments, the first and second septum portions 1881A, 118B are spaced apart by a first amount at a first point on the circumference of the bladder arrangement 1820 (as shown in FIG. 18) and by a second amount at a second point on the circumference. In some embodiments, the second amount is zero (i.e. no spacing) at the second point on the circumference (as illustrated in FIGS. 20A and 20C).

It will be understood that the bladder arrangement 1820 of FIG. 18 could be used instead of any of the bladder(s) of the previous embodiments. For example, in the embodiments of FIGS. 5B to 8D, any of the individual bladders could be replaced by bladder arrangement 1820 (i.e. by the first and second bladders 1820A, 1820B and septum portions 1881A, 1881B). In other words, the bladder arrangement 1820 is configured for locating between opposing supports with a first support engaging the first bladder 1820A and a second opposing support engaging the second bladder 1820B, in order to form a joint assembly.

In the embodiment of FIG. 18, the annular brace arranged radially inside the flexible bladder arrangement 1820 is also split in two. In particular, there is a first brace portion 1882A coupled (e.g. integrally coupled) to the first septum portion 1881A, and a second brace portion 1882B coupled (e.g. integrally coupled) to the second septum portion 1881B. It will be understood that in such embodiments the spacing between the first and second brace portions 1882A, 1882B may correspond to the spacing between the first and second septum portions 1881A, 1881B. In other words, when the septum portions 1881A, 1881B get closer together, the first and second brace portions 1882A, 1882B may also get closer together (as illustrated in FIGS. 20A and 20C).

Figure 19:
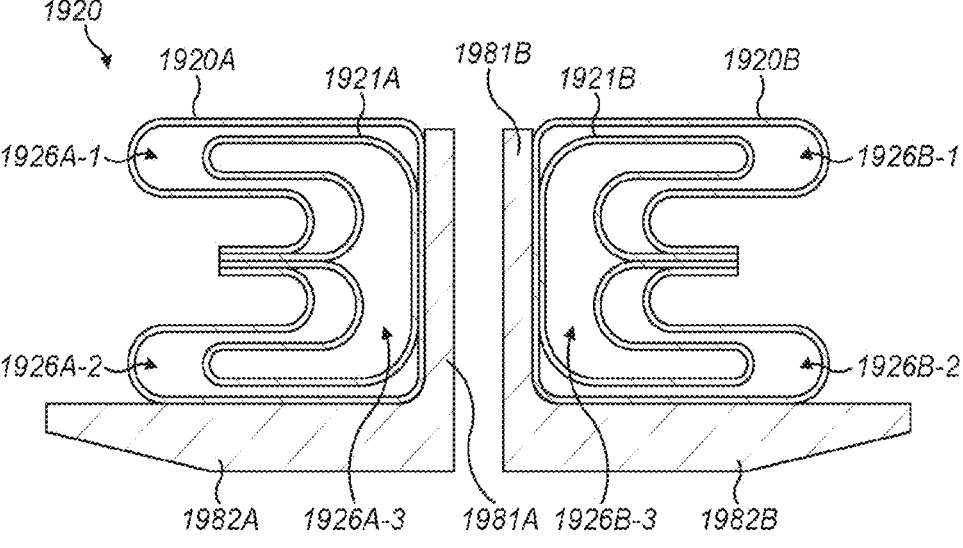
FIG. 19 shows a view of a ring-shaped or torus bladder arrangement according to embodiments of the present disclosure.

FIG. 19 illustrates a cross sectional view of a flexible bladder arrangement 1920 according to another embodiment of the present disclosure. Previously described features are given the same reference numerals with the prefix "19".

The bladder arrangement 1920 of FIG. 19 is similar to the bladder arrangement 1820 of FIG. 18. In particular, the bladder arrangement 1920 has first and second bladders 1920A, 1920B separated by first and second septum portion 1981A, 1981B.

In the embodiment of FIG. 19, the first bladder 1920A includes a first internal membrane 1921A and the second bladder 1920B includes a second internal membrane 1921B. The first and second internal membranes 1921A, 1921B are annular and run parallel to the inner and outer circumferences of the respective bladders 1920A, 1920B. In this way, the internal membranes 1921A, 1921B split the first and second chambers 1926A, 1926B into sub-chambers 1926A-1, 1926A-2, 1926A-3, 1926B-1, 1926B-2, 1926B-3.

In the illustrated embodiment, the internal membranes 1921A, 1921B are sealed against two internal sides of the respective bladders 1920A 1920B in order to provide three separate sub-chambers within each bladder. In particular: a first sub-chamber 1926A-1, 1926B-1 is provided between an outer circumference of the respective internal membrane 1921A, 1921B and an outer circumference of the respective bladder 1920A, 1920B; a second sub-chamber 1926A-2, 1926B-2 is provided between an inner circumference of the respective internal membrane 1921A, 1921B and an inner circumference of the respective bladder 1920A, 1920B; and a third sub-chamber 1926A-3, 1926B-3 is provided inside the respective internal membrane 1921A, 1921B.

Each of the sub-chambers is devoid of gas and partially filled with a non-gaseous fluid which moves within the respective sub-chamber during articulation of the tubular body from said first state to said second state.

Such an arrangement provides multiple benefits. For example, the internal membranes 1921A, 1921B provide a back-up layer in the event of a cut or tear in the respective bladder 1920A, 1920B, which provides even greater safety from a single point of failure. In other words, when the bladder arrangement 1920 is used in a joint assembly for an EVA suit, there can be no catastrophic single point of failure if a bladder 1920A, 1920B is torn. In particular, there are four redundant membranes (i.e. a radially outer surface of the bladder 1920A, 1920B, a radially outer surface of the internal membrane 1921A, 1921B, a radially inner surface of the internal membrane 1921A, 1921B, and a radially inner surface of the bladder 1920A, 1920B). Furthermore, the sub-chambers 1926A-1, 1926A-2, 1926A-3, 1926B-1, 1926B-2, 1926B-3 may contain different fluids which react when mixed together to form a self-healing fluid. In this way, if a bladder and its internal membrane are both torn, the tear may be "self-healed" by the reaction resulting from the mixing fluids in the respective sub-chambers, which re-seals the bladder.

The internal membranes 1921A, 1921B may be formed in a similar way to the bladders 1920A, 1920B (e.g. the internal membranes 1921A, 1921B may be reinforced in a similar way), as described above.

In other embodiments (not shown), multiple bladders and/or bladder arrangements may be radially stacked (i.e. with one radially inside the other) in order to provide similar effects of having redundant layers and/or containing different types of fluid which react in the event of a tear to "self-heal" the bladder(s).

Figure 20B:
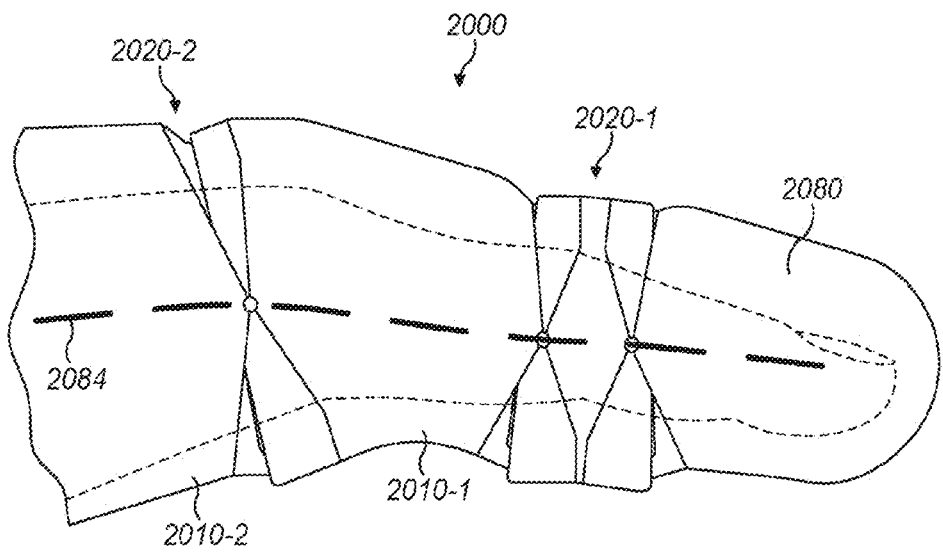
Figure 20C:
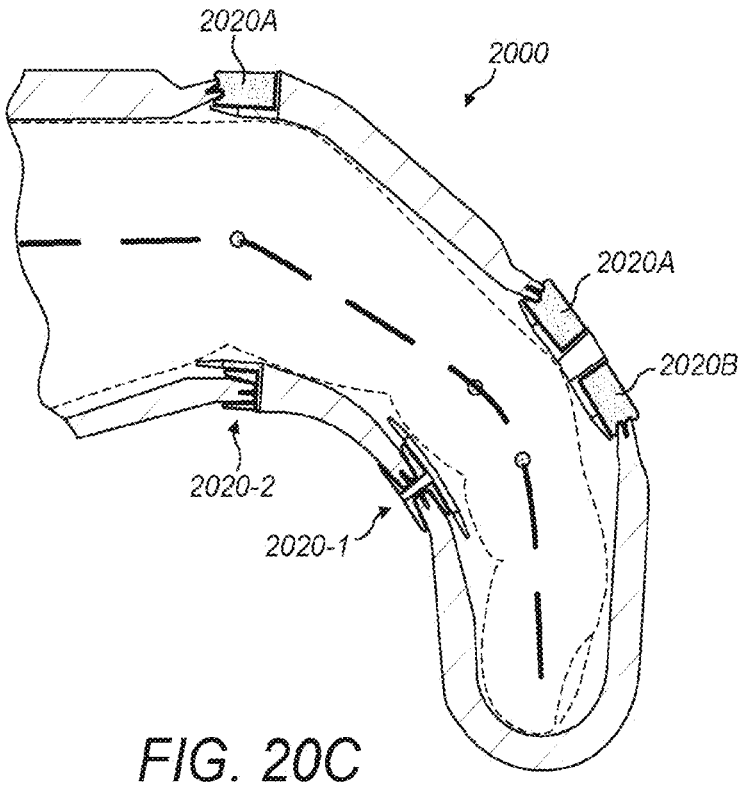
Figure 20D:
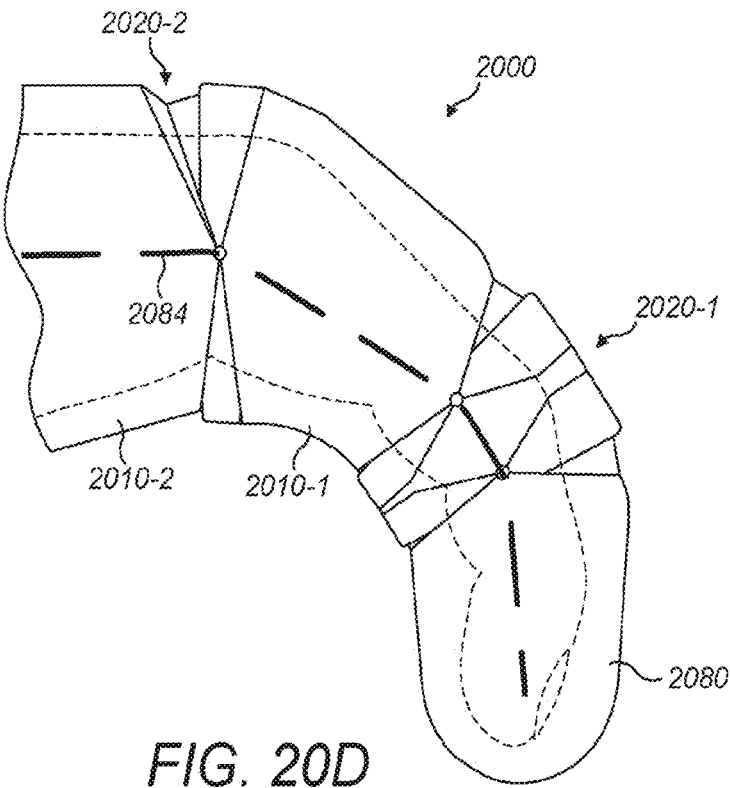

FIGS. 20A-20D illustrate a joint assembly 2000 according to another embodiment of the present disclosure. In particular: FIGS. 20A-20B show a side sectional and side views of the joint assembly 2000 in a resting state (e.g. unbent, extended or straight), and FIGS. 20C-20D show side sectional and side views of the joint assembly 2000 in a bent or deflected state. Previously described features are given the same reference numerals with the prefix "20".

The joint assembly 2000 includes a first flexible bladder arrangement 2020-1 of the kind illustrated in FIG. 18 and described above. In this embodiment, the first and second septum portions 2081A, 2081B are spaced apart by a greater distance at an upper side of the joint assembly 2000 than at a lower side of the joint assembly 2000. In particular, the first and second septum portions 2081A, 2081B converge to a single septum portion 2081 at the lower side of the joint assembly 2000. This helps to bias the bending of the joint towards the direction shown in FIGS. 20C-20D, which is the normal way that a human finger received within the joint assembly 2000 would bend.

When the joint assembly 2000 is in the resting state of FIG. 20A, more of the fluid located within the first and second bladders 2020A, 2020B is distributed at the lower side of the joint assembly 2000 than the upper side of the joint assembly 2000. When the joint assembly 2000 is moved to the bent or deflected state of FIG. 20C, the fluid moves within the first and second bladders 2020A, 2020B so that more of the fluid is distributed at the upper side of the joint assembly 2000. In this way a constant internal volume is maintained within the joint assembly 2000.

First and second supports 2010-1, 2080 are provided on opposing sides of the first flexible bladder arrangement 2020-1. In particular, a first support 2010-1 engages the first bladder 2020A and a second support in the form of a cap 2080 engages the second bladder 2020B.

In the embodiment of FIGS. 20A-20D, a second flexible bladder arrangement 2020-2 is provided. The second flexible bladder arrangement 2020-2 is similar to half of the bladder arrangement of FIG. 18. In other words, the second flexible bladder arrangement 2020-2 includes a single bladder 2020A, a single septum portion 2081A and a single brace portion 2082A. The single septum portion 2081A and single brace portion 2082A are connected to the first support 2010-1 at an opposite end of the first support 2010-1 to the first bladder arrangement 2020-2. A third support 2010-3 is provided on an opposing side of the second bladder arrangement 2020-2 and engages the single bladder 2020A.

Fluid moves within the single bladder 2020A of the second bladder arrangement 2020-2 in a similar way to the fluid in the first and second bladders 2020A, 2020B of the first bladder arrangement 2020-1 when the joint assembly 2000 moves, as described above.

In the illustrated embodiment, the first, second and third supports 2010-1, 2010-2, 2080 have a groove in the ends which directly engage the bladders 2020A, 2020B. The grooves receive the joint lines of the bladders 2020A, 2020B which are formed during manufacturing of the bladders 2020A, 2020B (as described above).

In the embodiment of FIGS. 20A-20D, one or more longitudinal strengthening elements 2084 (shown schematically as a dashed lines) are provided. The one or more longitudinal strengthening elements 2084 are connected to and extend at least partially over and/or through the respective bladders and/or supports. In particular, the one or more longitudinal strengthening elements 2084 extend along substantially the full length of the respective tubular bodies.

Such one or more longitudinal strengthening elements 2084 help to stabilise the joint assembly 2000 (e.g. by inhibiting separation of the respective bladders and supports and/or limiting flexing of the respective joint assembly in one or more directions). As illustrated in FIGS. 20A-20C, the one or more longitudinal strengthening elements 2084 define pseudo-pivots 2085 at the joints of the joint assembly 2000 (e.g. in line with the bladders 2020A, 2020B).

Similar longitudinal strengthening elements 184, 584 1184 are provided in the embodiments of FIGS. 1A-1D, 2A-2C, 5C-5D and 11.

In exemplary embodiments, a pair of longitudinal strengthening elements 184, 584, 1184, 2084 are provided on opposing sides of the respective joint assembly. The pair of longitudinal strengthening elements 184, 584, 1184 are positioned centrally and parallel to the angle of bend of the joint assembly 2000.

In exemplary embodiments, the respective supports have through-holes 185, 285 (as illustrated in FIGS. 1C-2A) for receiving the longitudinal strengthening elements 184, 584, 1184, 2084. In the illustrated embodiments of FIGS. 1C-2A, the through-holes 185, 285 are located on portions of the supports which overlap with the apertures of the bladders, so that the longitudinal strengthening elements 184, 584, 1184, 2084 extend through the apertures of the bladders (i.e. through the passageway of the joint assembly). Alternatively, the through-holes 185, 285 may be located on portions of the supports which project radially outwards beyond the bladders, so that the longitudinal strengthening elements extend over an outer circumference of the joint assembly.

Figure 9:
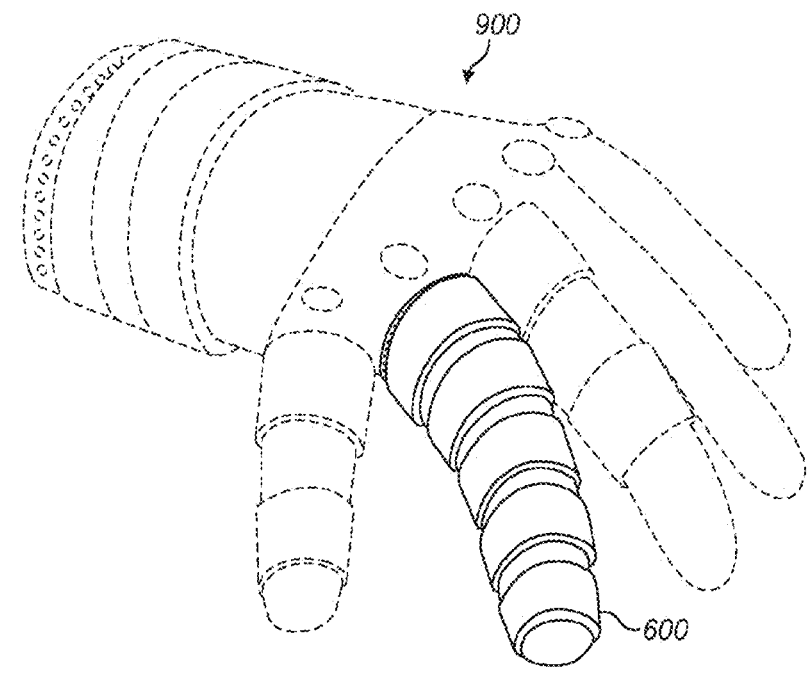
FIG. 9 shows a glove of an EVA suit according to embodiments of the present disclosure.
Figure 10:
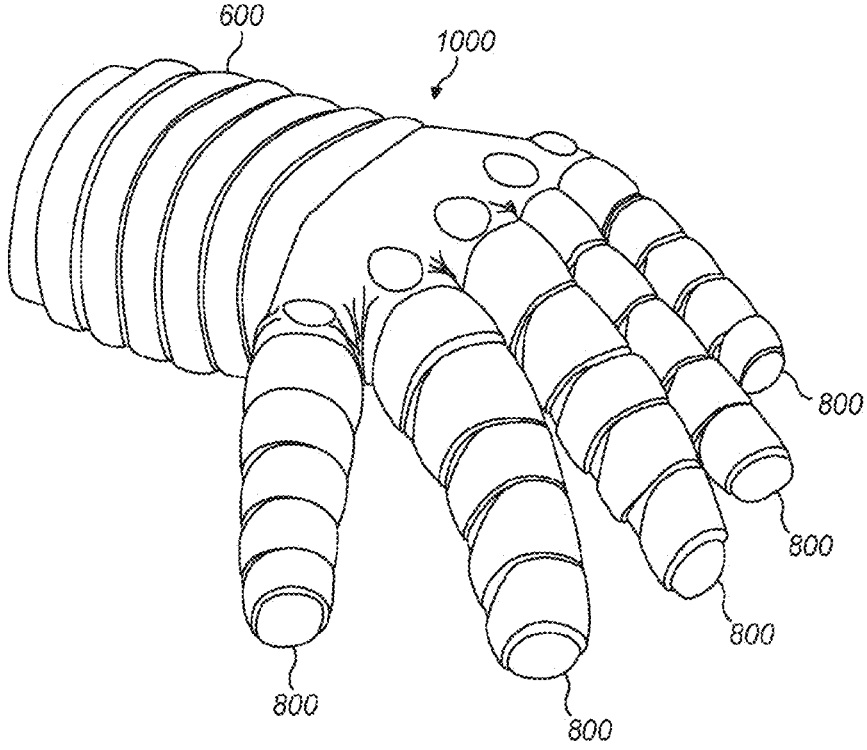
FIG. 10 shows a glove of an EVA suit according to embodiments of the present disclosure.
Figure 11:
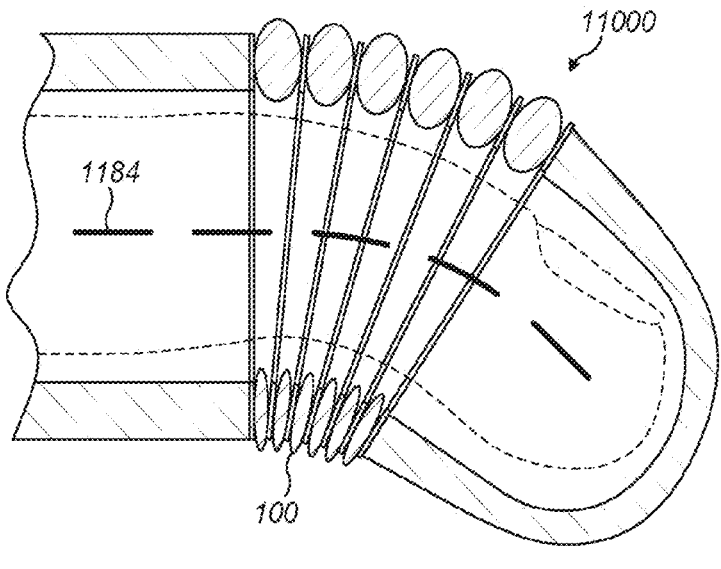
FIG. 11 shows a finger joint of an EVA suit according to embodiments of the present disclosure.
Figure 12:
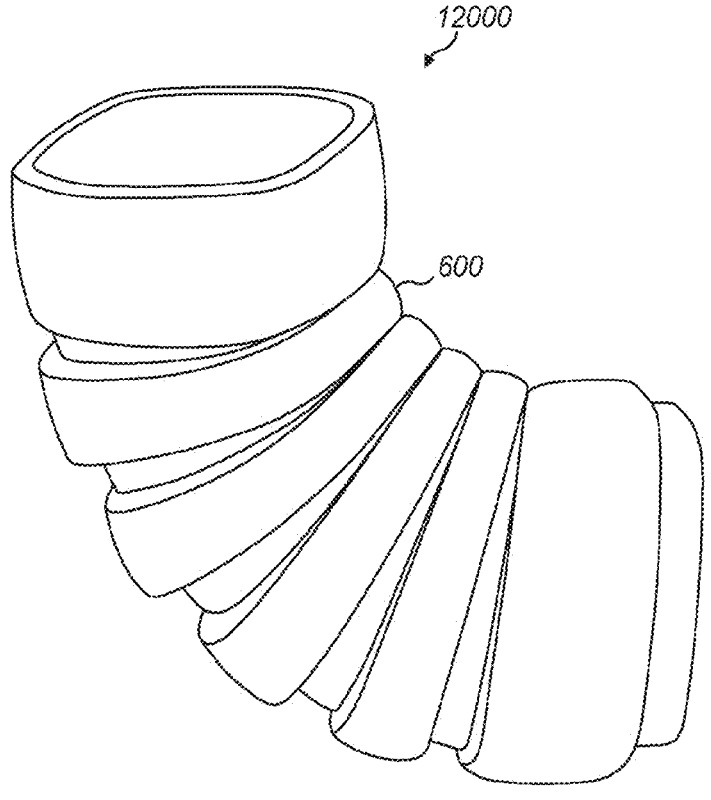
FIG. 12 shows a knee or elbow joint of an EVA suit according to embodiments of the present disclosure.
Figure 13:
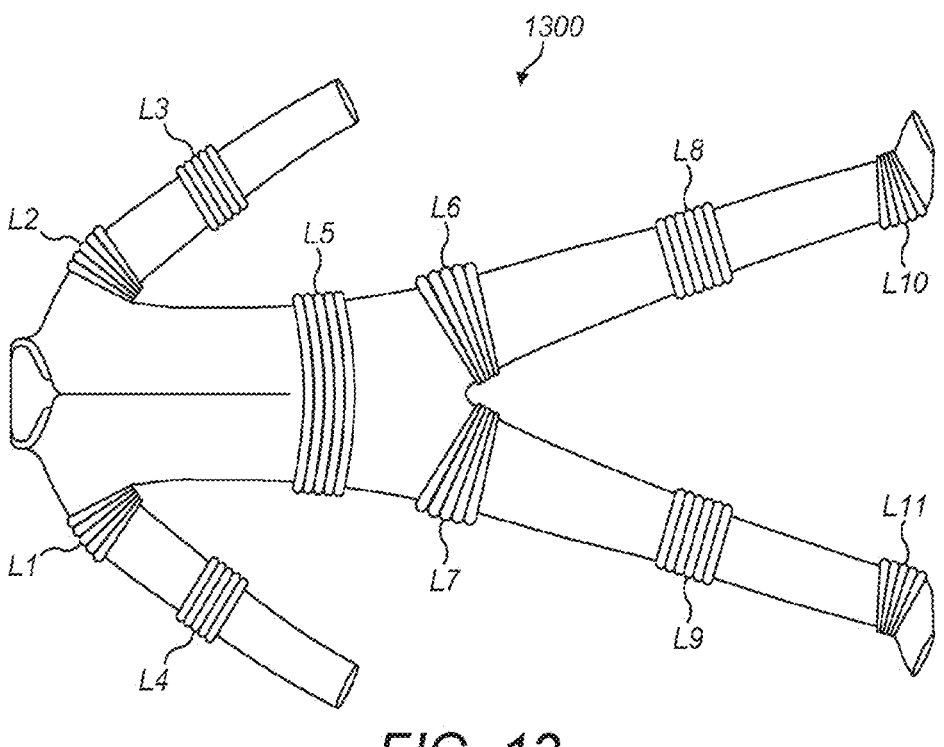
FIG. 13 shows an EVA suit according to embodiments of the present disclosure.
Figure 14:
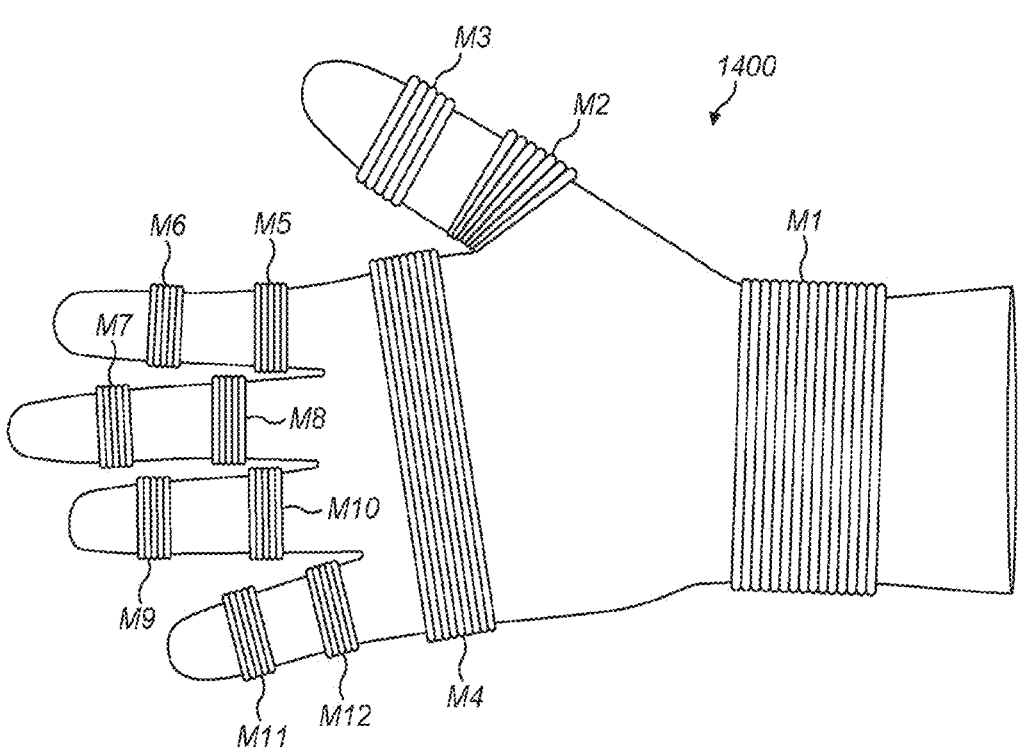
FIG. 14 shows a glove of an EVA suit according to embodiments of the present disclosure.

Advantageously, the joint assemblies of the present disclosure can be used in joints of an EVA suit. For example, FIG. 9 shows the use of the joint assembly 600 as a finger in a pressurised glove 900 of an EVA suit. FIG. 10 shows the use of the assembly 800 as fingers and the assembly 600 as a wrist joint in a pressurised glove 1000 of an EVA suit. FIG. 11 shows a cross sectional view of use of the assembly 100 in a finger joint of a glove of a pressurised EVA suit. FIG. 12 shows the use of the assembly 600 as a knee or elbow joint 12000 of a pressurised EVA suit. FIG. 13 shows locations L1-L11 of an EVA suit 1300 where the joint assemblies of the present disclosure may be used, including shoulder joints L1-L2, elbow joints L3-L4, waist L5, hips L6-L7, knees L8-L9 and ankles L10-L11. FIG. 14 illustrates additional locations M1-M12 of a glove where the joint assemblies of the present disclosure may be used.

As such, it will be appreciated that the joint assemblies of the present disclosure are configured for articulation upon movement of the body part received in the joint assembly (e.g. limbs such as arms, legs, or digits such as fingers, thumbs etc.). Where a joint assembly is used as a finger portion of an EVA suit, the passageway of the joint assembly may be configured for receiving the finger (e.g. may define a sleeve for said finger), and the joint assembly may be configured for articulation upon movement of the finger. Where a joint assembly is used as an elbow joint e.g. in an arm portion of an EVA suit, the passageway of the joint assembly may be configured for receiving the arm and/or elbow (e.g. may define a sleeve for said arm and/or elbow), and the joint assembly may be configured for articulation upon movement of the arm and/or elbow. Where a joint assembly is used as a knee joint e.g. in leg portion of an EVA suit, the passageway of the joint assembly may be configured for receiving the leg and/or knee (e.g. may define a sleeve for said leg and/or knee), and the joint assembly may be configured for articulation upon movement of the leg and/or knee. It will be appreciated that any of the joint assemblies of the present disclosure may be used in the EVA suit portions shown in FIGS. 9-14.

It will also be appreciated that the dimensions of the joint assemblies described herein, and the dimensions of their components (e.g. the support elements and the bladders) may vary depending on the intended use. For example, the internal volume and/the passage may be any suitable size and/or shape to accommodate any human joint of an EVA suit. The support elements and the bladders may be shaped and/or sized accordingly. For example the central apertures/ openings of the support elements and the central apertures of the bladders may be sized and/or shaped accordingly.

It has been described above how the joint assemblies of the present disclosure may be used in low pressure environments, such as in a vacuum. In a low pressure environment, the pressure in the internal volume of the joint assembly may be greater than the environmental pressure external to the joint assembly. The pressure differential between the inside and the outside of the joint assembly may be up 14.7 PSI (1 atmosphere of pressure) to achieve 1 atmosphere of pressure within the EVA suit. However, it will be appreciated that the joint assemblies of the present disclosure may be used in high pressure environments, for example where the external environmental pressure is greater than the pressure in the internal volume of the joint assembly. The joint assemblies 100, 300, 500 may be particularly suited for use in high pressure environments.

It has been described above that the bladders and supports are ring shaped. It will be appreciated that said ring shape can take many forms, including but not limited to circular, elliptical, square, rectangle, triangle, pentagonal, hexagonal, or any other polygon.

It will be understood that the term "bladder arrangement" is used in this specification to refer to one or more bladders which can be located between opposing supports. In other words, the phrase "bladder arrangement" may cover a single bladder (e.g. as in the embodiments of FIGS. 1A-16B) or multiple bladders (e.g. as in the embodiment of FIGS. 17A-20D).

The invention claimed is:

1. An extravehicular activity (EVA) suit joint assembly for a limb or digit, the EVA suit joint assembly comprising a tubular body having a first end, a second end and a passage therebetween, the passage being configured for receiving said limb or digit;

the tubular body comprising a flexible bladder arrangement positioned between opposing supports, the flexible bladder arrangement and the opposing supports being ring-shaped so as to each define an aperture, wherein the respective apertures form part of the passage being configured for receiving said limb or digit;

wherein the tubular body is configured for articulation upon movement of said limb or digit between a first state in which the first end and the second end are in a first orientation with respect to one another, and a second state in which the first end and the second end are in a second orientation with respect to one another; and wherein the flexible bladder arrangement comprises a bladder which defines a chamber, wherein the chamber is only partially filled with a non-gaseous fluid which moves within the chamber during articulation of the tubular body from said first state to said second state upon movement of said limb or digit.

2. The EVA suit joint assembly of claim 1, wherein the non-gaseous fluid comprises a liquid, gel, paste or cream.

3. The EVA suit joint assembly of claim 1, wherein the EVA suit joint assembly is configured so as to maintain an interior volume of the tubular body between the first end and the second end at a substantially constant volume during articulation of the tubular body from said first state to said second state, via deformation of the flexible bladder arrangement.

4. The EVA suit joint assembly of claim 1, wherein the bladder of the flexible bladder arrangement comprises a membrane that defines the chamber, the membrane being flexible and inextensible.

5. The EVA suit joint assembly of claim 4, wherein the membrane comprises a plurality of reinforcing fibres arranged to prevent the membrane from expanding or stretching.

6. The EVA suit joint assembly of claim 1, wherein the non-gaseous fluid has a vapour pressure, wherein the vapour pressure of the non-gaseous fluid is $10^{-10}$ to $10^{-7}$ torr at a temperature of 20 degrees Celsius.

7. The EVA suit joint assembly of claim 1, wherein the flexible bladder arrangement is sealingly coupled with the opposing supports.

8. The EVA suit joint assembly of claim 1, wherein the tubular body has a longitudinal axis; wherein, during articulation from said first state to said second state, the tubular body bends to define an internal curvature and an external curvature;

wherein each support has a circumference or perimeter, wherein a first section of the circumference or perimeter is intended to be proximal the internal curvature and a second section of the circumference or perimeter opposite the first section of the circumference or perimeter is intended to be proximal the external curvature;

wherein each support is of non-uniform width in a longitudinal direction of the tubular body, wherein a width of each support at said first section is smaller than a width of each support at said second section.

9. The EVA suit joint assembly of claim 1, wherein the EVA suit joint assembly is configured such that when the first end is moved relatively to the second end to bend the EVA suit joint assembly, the tubular body contracts at an inside of the bend and expands at an outside of the bend, via deformation of the flexible bladder arrangement.

10. The EVA suit joint assembly of claim 1, wherein the EVA suit joint assembly is configured such that when the first end is moved relative to the second end to bend the EVA suit joint assembly, the flexible bladder arrangement is compressed by the opposing supports at an inside of the bend, and the flexible bladder arrangement is decompressed at the outside of the bend, wherein the flexible bladder arrangement has a H-shaped cross-section in use, the H-shaped cross-section being defined by first and second grooves or recesses on opposing sides of the flexible bladder arrangement, the first and the second grooves or recesses each facing one of the opposing supports.

11. The EVA suit joint assembly of claim 1, wherein:

a first one of the opposing supports comprises a first interlocking region;

a second one of the opposing supports comprises a second interlocking region; and the flexible bladder arrangement is configured for cooperation with said first and said second interlocking regions, for location of the flexible bladder arrangement between the first one of the opposing supports and the second one of the opposing supports.

12. The EVA suit joint assembly of claim 11, wherein:

the first interlocking region comprises a first lip that runs around the aperture of the first support and extends over an external surface of the first support;

the second interlocking region comprises a second lip that runs around the aperture of the second support and extends over an internal surface of the second support.

13. The EVA suit joint assembly of claim 1, wherein: the bladder of the flexible bladder arrangement is a first bladder which defines a first chamber and wherein the flexible bladder arrangement comprises a second bladder which defines a second chamber, wherein an annular septum is arranged between the first and the second bladders, and wherein each of the first and the second chambers is partially filled with the non-gaseous fluid which moves within the respective chamber during articulation of the tubular body from said first state to said second state.

14. The EVA suit joint assembly of claim 13, wherein the tubular body has a longitudinal axis; wherein, during articulation from said first state to said second state, the tubular body bends to define an internal curvature and an external curvature;

wherein the annular septum has a circumference or perimeter, wherein a first section of the circumference or perimeter is intended to be proximal the internal curvature and a second section of the circumference or perimeter opposite the first section of the circumference or perimeter is intended to be proximal the external curvature;

wherein the annular septum is of non-uniform width in a longitudinal direction, with a width of said first section being smaller than a width of said second section.

15. The EVA suit joint assembly of claim 1, further comprising an annular brace arranged radially inside the flexible bladder arrangement to limit inward radial deformation of the flexible bladder arrangement during articulation of the tubular body from said first state to said second state, the annular brace having first and second brace portions wherein the bladder of the flexible bladder arrangement is a first bladder which defines a first chamber and wherein the flexible bladder arrangement comprises a second bladder which defines a second chamber, wherein an annular septum is arranged between the first and the second bladders, the annular septum having first and second septum portions, and wherein the first and the second septum portions of the annular septum and the first and the second brace portions of the annular brace are integrally coupled, respectively.

16. The EVA suit joint assembly of claim 1, further comprising one or more longitudinal strengthening elements which are connected to and extend at least partially over and/or through the flexible bladder arrangement and/or the opposing supports wherein the one or more longitudinal strengthening elements are configured to inhibit separation of the flexible bladder arrangement and the opposing supports and/or to limit flexing of the EVA suit joint assembly in one or more directions.

17. The EVA suit joint assembly of claim 1, wherein the tubular body comprises a plurality of said flexible bladder arrangements arranged in series.

18. The EVA suit joint assembly of claim 1, wherein the bladder of the flexible bladder arrangement comprises an internal membrane which is annular and runs parallel to inner and outer circumferences of the bladder to split the chamber into a plurality of sub-chambers.

19. The EVA suit joint assembly of claim 1, wherein the flexible bladder arrangement is configured for self-healing if the bladder of the flexible bladder arrangement becomes torn.

20. The EVA suit joint assembly of claim 1 wherein the tubular body forms a glove of an extravehicular activity (EVA) suit, the tubular body of the glove of the EVA suit comprising a plurality of flexible bladder arrangements, each flexible bladder arrangement positioned between opposing supports, the plurality of flexible bladder arrangements and opposing supports of the glove of the EVA suit forming a passageway which is configured for receiving a finger or thumb and being configured for articulation between the first state and the second state upon movement of the finger or thumb.

\* \* \* \* \*